US012791744B2

(12) United States Patent
Borg et al.

(10) Patent No.: US 12,791,744 B2
(45) Date of Patent: Nov. 10, 2026

(54) SEISMIC DATA ACQUISITION UNIT, METHOD, AND SYSTEM EMPLOYING THE SAME

(71) Applicant: FLEET SPACE TECHNOLOGIES PTY LTD, Beverley (AU)

(72) Inventors: Braeden James Borg, Beverley (AU); Matthew James Pearson, Beverley (AU); Flavia Tata Nardini, Beverley (AU); Alaa Rzk, Beverley (AU)

(73) Assignee: FLEET SPACE TECHNOLOGIES PTY LTD, Beverley (AU)

( * ) Notice: Subject to any disclaimer, the term of this patent is extended or adjusted under 35 U.S.C. 154(b) by 234 days.

(21) Appl. No.: 18/560,435

(22) PCT Filed: Jan. 31, 2022

(86) PCT No.: PCT/AU2022/050047

§ 371 (c)(1),
(2) Date: Nov. 13, 2023

(87) PCT Pub. No.: WO2022/236357

PCT Pub. Date: Nov. 17, 2022

(65) Prior Publication Data

US 2024/0248225 A1 Jul. 25, 2024

(30) Foreign Application Priority Data

May 14, 2021 (AU) ................................ 2021901451

(51) Int. Cl.
*G01V 1/18* (2006.01)
*G01V 1/00* (2006.01)
(Continued)

(52) U.S. Cl.
CPC .............. *G01V 1/223* (2013.01); *G01V 1/003* (2013.01); *G01V 1/164* (2013.01); *G01V 1/181* (2013.01); *G01V 1/288* (2013.01); *G01V 2200/12* (2013.01)

(58) Field of Classification Search
CPC ........ G01V 1/223; G01V 1/003; G01V 1/164; G01V 1/181; G01V 1/288; G01V 2200/12
See application file for complete search history.

(56) References Cited

U.S. PATENT DOCUMENTS 5,724,241 A * 3/1998 Wood ........................ G01V 1/20
702/14
6,078,283 A 6/2000 Bednar
(Continued)

FOREIGN PATENT DOCUMENTS

CA 2746753 A1 2/2012
CA 2670876 C * 1/2016 ............... G01V 1/22
(Continued)

OTHER PUBLICATIONS

Jamali-Rad, H., et al., 'Continuous Subsurface Tomography Over Cellular Internet of Things (IoT)', 2020, IEEE Sensors Journal, vol. 20, No. 17, pp. 10079-10091.
(Continued)

*Primary Examiner* — Krystine E Breier
(74) *Attorney, Agent, or Firm* — Nelson Mullins Riley & Scarborough LLP

(57) ABSTRACT

A System including multiple data acquisition units. A data acquisition unit includes a housing whose interior volume is defined by an outer wall, a top part and a bottom part; the housing includes a geolocation unit for processing a time synchronisation signal, a data communication unit for enabling wireless data communication with an external gateway device, a processing unit, a geophone assembly in the housing to sense vibration received via a sensing probe,
(Continued)

extending from the bottom part of the housing, and/or the housing and to generate output signals to the processing unit, and a power supply unit to supply power to the geolocation unit, the data communication unit and the processing unit; a geolocation antenna and a data communication antenna extending from the top part of the housing; the processing unit processes the output signals from the geophone assembly to determine an occurrence of a seismic event.

36 Claims, 29 Drawing Sheets

(51) Int. Cl.
*G01V 1/16* (2006.01)
*G01V 1/22* (2006.01)
*G01V 1/28* (2006.01)

(56) References Cited

U.S. PATENT DOCUMENTS

| | | | | |
|---|---|---|---|---|
| 2005/0114033 | A1 | 5/2005 | Ray et al. | |
| 2005/0276162 | A1 | 12/2005 | Brinkmann et al. | |
| 2007/0230278 | A1 | 10/2007 | Mulgaria | |
| 2008/0137484 | A1 | 6/2008 | Scott | |
| 2009/0234585 | A1 | 9/2009 | Ross et al. | |
| 2011/0098079 | A1* | 4/2011 | Pennec | G01D 21/00 455/550.1 |
| 2012/0082002 | A1* | 4/2012 | Iseli | G01V 1/223 367/76 |
| 2014/0169252 | A1 | 6/2014 | Banerjee et al. | |
| 2014/0219051 | A1 | 8/2014 | Dabouineau et al. | |
| 2015/0260864 | A1 | 9/2015 | Guichard et al. | |
| 2016/0374226 | A1 | 12/2016 | Ray et al. | |
| 2019/0383958 | A1* | 12/2019 | Jamali Rad | G01V 1/223 |
| 2021/0080603 | A1* | 3/2021 | Dabouineau | G01V 1/223 |
| 2024/0288598 | A1* | 8/2024 | Busuttil | G01V 1/003 |

FOREIGN PATENT DOCUMENTS

| | | | | |
|---|---|---|---|---|
| CA | 2958230 C | * 4/2019 | | E21B 47/01 |
| CN | 208297749 U | 12/2018 | | |
| CN | 110942610 A | 3/2020 | | |
| CN | 112987083 A | 6/2021 | | |
| WO | WO 2021/178286 A1 | 9/2021 | | |
| WO | WO-2021216711 A1 | * 10/2021 | | G01V 1/223 |

OTHER PUBLICATIONS

Goldswain, G. 2020, “Advances in seismic monitoring technologies”, Proceedings of the Second International Conference on Underground Mining Technology, Australian Centre for Geomechanics, Perth, pp. 173-188.

Gao, P. et al.; “Design of Distributed Three Component Seismic Data Acquisition System Based on LoRa Wireless Communication Technology;” $37^{th}$ Chinese Control Conference (CCC), July 25-27; 2018; pp. 10285-10288.

Lysogor, I. et al.; “Study of Data Transfer in a Heterogeneous LoRa-Satellite Network for the Internet of Remote Things;” Sensors 2019; vol. 19; Issue No. 15; Aug. 1, 2019; Article No. 3384.

Apr. 5, 2022 Search Report issued in International Application No. PCT/AU2022/050047; 13 pp.

Apr. 5, 2022 Written Opinion of the International Searching Authority issued in International Application No. PCT/AU2022/050047; 14 pp.

* cited by examiner

SEISMIC DATA ACQUISITION UNIT, METHOD, AND SYSTEM EMPLOYING THE SAME

CROSS-REFERENCE TO RELATED APPLICATIONS

This application claims priority to and is a 35 U.S.C. § 371 U.S. National Stage Application of International Application No. PCT/AU2022/050047, entitled "SEISMIC DATA ACQUISITION UNIT. METHOD, AND SYSTEM EMPLOYING THE SAME", filed Jan. 31, 2022, which claims priority to Australian Application No. 2021901451, entitled "SEISMIC DATA ACQUISITION UNIT, METHOD, AND SYSTEM EMPLOYING THE SAME", filed May 14, 2021, the contents of each being incorporated by reference herein in its entirety.

TECHNICAL FIELD

Embodiments relate to data acquisition units and more specifically to seismic data acquisition units. Some embodiments relate to a method for data acquisition, and systems employing one or more data acquisition units. Some embodiments relate to systems comprising one or more gateway devices in communication with one or more data acquisition units for high-latency data backhaul communication to a server, for remote storage and processing.

BACKGROUND

Data acquisition in remote and/or harsh environments can present various challenges. In remote and harsh environments without a power supply, there may be data storage and power constraints associated with data acquisition, such as for seismic data acquisition. Such environments may also possess hazards and/or be difficult, time-consuming, and costly to access.

Equipment for seismic data acquisition can be bulky and time-consuming to set up. Such equipment may lack connectivity and may therefore need to have significant memory capacity for data logging until the data can be retrieved.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a data acquisition unit, including: a housing including an outer wall, a top part and a bottom part, wherein the outer wall, the top part and the bottom part together define an interior volume of the housing; a geolocation unit in the housing for processing a time synchronisation signal; a geolocation antenna communicatively coupled to the geolocation unit and extending from the top part of the housing; a data communication unit in the housing for enabling wireless data communication with an external gateway device; a data communication antenna communicatively coupled to the data communication unit and extending from the top part of the housing; a sensing probe extending from the bottom part of the housing; a processing unit in the housing and communicatively coupled to the geolocation unit and the data communication unit; a geophone assembly in the housing to sense vibration received via the sensing probe and housing, and to generate output signals to the processing unit; a power source in the housing to supply power to the geolocation unit, the data communication unit and the processing unit; wherein the processing unit is configured to process the output signals from the geophone assembly to determine an occurrence of a seismic event.

The geolocation unit may be a GNSS unit, such as a GPS unit, and the geolocation antenna may be a GNSS antenna, such as a GPS antenna, for example. The data communication unit may be a low power wide area network (LPWAN) unit and the data communication antenna may be a LPWAN antenna, for example.

In some embodiments, the processing unit includes: non-volatile memory storing program code executable by a processor of the processing unit to control operation of the data acquisition unit; and volatile memory to store buffered output signals and output data generated from processed output signals; wherein the processing unit is configured to generate data payloads for transmission to the external gateway device based on the processed output signals in response to determination of a seismic event.

In some embodiments, the processing unit is configured to provide the generated data payloads to the LPWAN unit for queued transmission to the external gateway device over a long range low data rate transmission link.

In some embodiments, the data acquisition unit is self-contained, such that an external power supply is not required to supplement the power source.

In some embodiments, the data acquisition unit comprises a plurality of secondary projections extending from the bottom part and spaced from the sensing probe.

In some embodiments, the secondary projections are formed as spikes.

In some embodiments, the sensing probe is formed as a spike with a narrowed tip.

In some embodiments, the outer wall is generally cylindrical and the top part and the bottom part are threadedly engaged with respective top and bottom portions of the outer wall. The top part may include an engagement ring and a top plate coupled to the engagement ring.

In some embodiments, the power source is positioned between the processing unit and the top part of the housing.

In some embodiments, the geophone assembly is positioned between the processing unit and the bottom part of the housing.

In some embodiments, the geophone assembly is tightly fastened to the bottom part of the housing to allow vibrations received by the sensing probe to be effectively transmitted to the geophone assembly via the bottom part of the housing. The processing unit may include a printed circuit board and the power source may be mounted to the printed circuit board (PCB).

In some embodiments, a top end of the sensing probe is received in the bottom part of the housing but does not extend through the bottom end of the housing.

In some embodiments, the geophone assembly includes first, second and third geophones to sense vibration in three orthogonal directions.

In some embodiments, the data acquisition unit further includes a geophone sub-housing to retain the first, second and third geophones in a fixed position within the housing, the geophone sub-housing including clamping parts formed of a material having a low modulus of elasticity.

In some embodiments, the clamping parts are formed by 3D printing.

In some embodiments, the material is a polyethylene material.

In some embodiments, the housing is formed of Aluminium or an Aluminium alloy, for example. and one or both of the secondary spike and sensing probe may be formed of Stainless Steel or a structurally similar metal.

In some embodiments, the data acquisition unit has a mass of between about 1 kg and about 2 kg. Optionally, the mass of the data acquisition unit is around 1.3 kg to around 1.7 kg.

In some embodiments, the top part comprises first engagement formations radially spaced from a centre of the top part for engaging with a force transmission tool to drive engagement of the top part with the outer wall.

In some embodiments, the first engagement formation include a plurality of recesses or projections formed in a top surface of the top part.

In some embodiments, the bottom part comprises second engagement formations radially spaced from a centre of the bottom part for engaging with a force transmission tool to drive engagement of the bottom part with the outer wall.

In some embodiments, the second engagement formation include a plurality of recesses or projections formed in a bottom surface of the bottom part.

Some embodiments relate to a kit, including the data acquisition unit and the force transmission tool.

In some embodiments, the force transmission tool has complementary engagement formations for engaging the first and/or second engagement formations.

Some embodiments relate to a data acquisition system, including: a plurality of the data acquisition units; and a data gateway device configured to communicate with each of the data acquisition units. The data gateway device may also be configured to communicate with a low earth orbit satellite to transmit data received from the data acquisition units to a remote computing system.

Some embodiments relate to a data acquisition unit, including:

- a housing including an outer wall, a top part and a bottom part, wherein the outer wall, the top part and the bottom part together define an interior volume of the housing;
- a geolocation unit in the housing for processing a time synchronisation signal;
- a geolocation antenna port to couple a geolocation antenna to the geolocation unit and accessible from the top part of the housing;
- a data communication unit in the housing for enabling wireless data communication with an external gateway device;
- a data communication antenna port to couple a data communication antenna to the data communication unit and accessible from the top part of the housing;
- a processing unit in the housing and communicatively coupled to the geolocation unit and the data communication unit;
- a geophone assembly in the housing to sense vibration received via a sensing probe and/or the housing, and to generate output signals to the processing unit; and
- a power supply unit in the housing to supply power from a power source to the geolocation unit, the data communication unit and the processing unit;
- wherein the processing unit is supported by a top of the geophone assembly and, in use of the data acquisition unit, the power source is positioned on top of the processing unit, wherein the processing unit is configured to process the output signals from the geophone assembly to determine an occurrence of a seismic event.

The processing unit may include a printed circuit board (PCB) and the power supply unit may be mounted to or carried by the PCB. The geolocation unit and the data communication unit may be mounted on the PCB. The geolocation unit and the data communication unit may be mounted on a same side edge portion of the PCB.

The outer wall may be generally cylindrical and the top part and the bottom part may be threadedly engaged with respective top and bottom portions of the outer wall. The power source may be positioned between the processing unit and the top part of the housing. The geophone assembly may be positioned between the processing unit and the bottom part of the housing. The geophone assembly may be tightly fastened to the bottom part of the housing to allow vibrations received by the sensing probe to be effectively transmitted to the geophone assembly via the bottom part of the housing.

The top part may include an upper engagement portion extending from an upper surface of the top part to allow the data acquisition unit to be pulled upwardly. The upper engagement portion may include a loop or hook extending upwardly from the upper surface.

The processing unit may be configured to generate data payloads for transmission to the external gateway device based on the processed output signals in response to determination of a seismic event. Determination of a seismic event may be based upon a first predetermined number of most recent samples measured from the output signals of a z-axis geophone of the geophone assembly, and a first predetermined threshold.

The first predetermined threshold is periodically recalibrated based on a predetermined number of samples.

The processing unit may be configured to, after determination of the seismic event (i.e. after the beginning of a seismic event has been determined), continuously process output signals of the geophone assembly and generate data payloads based on the processed output signals for transmission to the external gateway device, until an event end condition is determined to be satisfied. The event end condition may be determined based on elapsing of a minimum sampling period and a calculated event end parameter, wherein the event end parameter is calculated based on a set of the processed output signals. The event end parameter may be calculated based on a second predetermined number of most recent samples measured from the output signals of the z-axis geophone of the geophone assembly. The determination of the event end condition may include comparing the event end parameter to a second predetermined threshold.

Each of the data payloads may comprise a header including an event identifier, an event trigger time, and sample measurements of output signals of an x-axis geophone, a y-axis geophone, and a z-axis geophone.

The processing unit may be configured to provide the generated data payloads to the data communication (or LPWAN) unit for queued transmission to the external gateway device over a long range low data rate transmission link.

The processing unit may be free of data storage for geophone sample measurements other than for buffering for seismic event determination and queued transmission to the external gateway device.

The data acquisition unit may further include a serial connector positioned in the top part to enable serial data communication between the processing unit and an external device via a serial bus.

Embodiments may also relate to units, sub-units, assemblies, sub-assemblies, systems, components, structures, processes, steps, features, and/or integers disclosed herein or indicated in the specification of this application individually or collectively, and any and all combinations of two or more of said units, sub-units, assemblies, sub-assemblies, systems, components, structures, processes, steps, features, and/or integers.

DETAILED DESCRIPTION

Embodiments described herein generally relate to data acquisition units and more specifically to seismic data acquisition units. Some embodiments relate to methods of process for data acquisition or operation of a seismic data acquisition unit, and systems employing one or more data acquisition units. Some embodiments relate to systems comprising one or more gateway devices in communication with one or more data acquisition units for high-latency data backhaul communication of acquired data, such as data relating to detected seismic events, to a server, for remote storage and processing.

Embodiments of data acquisition units described herein may be generally designed for ease of field deployment and retrieval. Such units may be relatively light weight, compact and easily manually manipulated. Further, when used as a seismic data acquisition unit, embodiments may employ an internal component assembly or arrangement that is compact and facilitates accurate seismic measurement, while also allowing ready replacement of a power source, such as one or more batteries. For example, the power source may be accessible for replacement by removal of a top part of a housing of the data acquisition unit.

Embodiments of data acquisition units described herein may be designed to transmit low-overhead payloads intermittently (e.g. in response to seismic event detection) to a nearby data gateway device, so they can be generally low on data storage capacity. In other words, such embodiments do not act as data loggers that store seismic data gathered over time. Instead, embodiments process and transmit the acquired data to an external device once an event is detected, without committing transmitted data to persistent data storage in the unit. Embodiments store operating system code and operation parameters in persistent storage and include non-persistent storage in the form of buffers for processing sensed measurements and generating and queueing payloads, but the embodiments are otherwise generally free of persistent data storage for storing geophone sample measurements.

Figure 1:
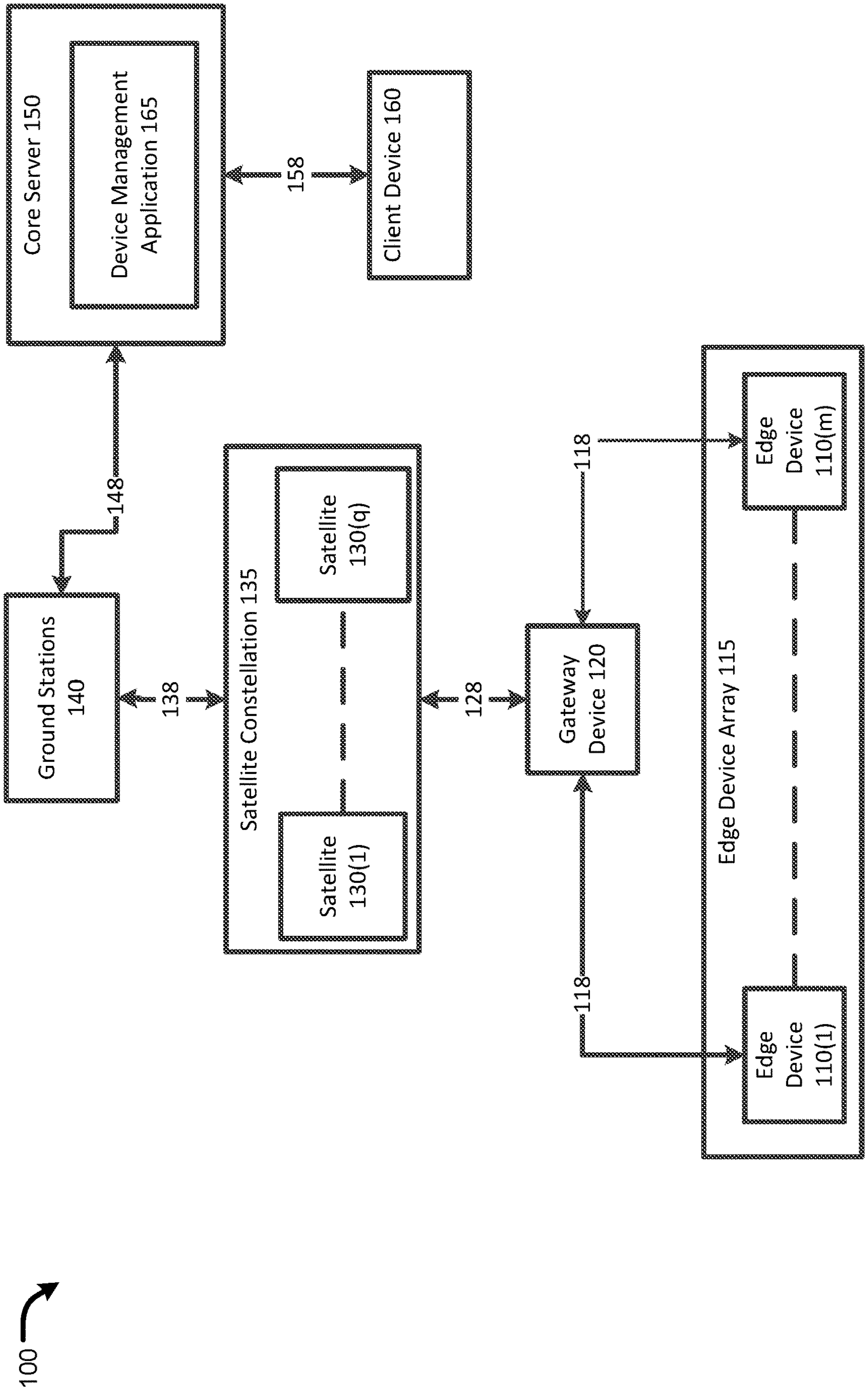
FIG. 1 is a block diagram of a remote backhaul system 100 according to some embodiments.

FIG. 1 is a block diagram of a remote backhaul system 100 according to some embodiments. The remote backhaul system 100 comprises an edge device array 115. The edge device array 115 comprises one or more edge devices 110. The edge device 110 may also be referred to as a seismic data acquisition unit, vibration sensing apparatus, seismometer module, geophone apparatus, geologic instrument, node, end-node, node device or a sensor node. The seismic data acquisition unit 110 is positioned at a distance from a gateway device 120 such that wireless communication between the seismic data acquisition unit 110 and the gateway device 120 is feasible. In some embodiments, the farthest position of the seismic data acquisition unit 110 from the gateway device 120 may be a distance of 10 to 20 km. In some embodiments, the farthest position of the seismic data acquisition unit 110 from the gateway device 120 may be a distance of 10, 11, 12, 13, 14, 15 or 20 km, for example.

Communication link 118 comprises wireless communication links between the seismic data acquisition unit 110 and the gateway device 120. The wireless communication link 118 may be a low power wide area network (LPWAN) communication link. For example, the communication link may be in the form of a LoRaWAN wireless link or a Narrowband Internet of Things wireless link or Sigfox LPWAN wireless link or any other wireless communication link suitable for a low power wide area network communication. Communication over the wireless communication link 118 may be made resilient to interference by utilizing spread spectrum techniques, such as Direct Sequence Spread Spectrum (DSSS) or Chirp Spread Spectrum (CSS), Random Phase Multiple Access (RPMA) and Listen-Before-Talk (LBT), for example.

The remote backhaul system 100 also comprises a satellite constellation 135. The satellite constellation 135 comprises one or more satellites 130. The satellite 130 is capable of communicating with gateway device 120 over a communication link 128. In embodiments with more than one satellite 130, the communication link 128 may extend to the more than one satellite 130. The communication link 128 may not be a persistent communication link and if satellite 130 is not accessible to the gateway device 120, the gateway device 120 may await the resumption of the radio communication link 128 to continue communication of information.

Radio Communication link 128 uses radio links to satellites 130 orbiting the earth to communicate data received at a gateway device 120 from the edge device array 115 and receive instructions or configuration information or firmware updates for seismic data acquisition unit 110 or gateway device 120. The remote backhaul system 100 also comprises one or more ground stations 140. The ground stations 140 receive communication from one or more satellites 130 of the satellite constellation 135 over a communication link 138. The communication link 138 may be facilitated by radio waves of suitable frequency according to the region where the ground station 140 is located.

The satellite 130 may be a low earth orbit satellite that circles the earth approximately every 90-110 minutes, for example. With such orbiting satellites, a relatively smaller number of satellite ground stations 140 may be used to receive downlinks from satellite 130, or all the data transmitted by gateway device 120.

In some embodiments, satellites 130 in a near polar orbit may be used and ground stations 140 may be located near each of the Earth's poles. This arrangement allows each satellite 130 to connect to a ground station 140 on almost every orbit, leaving the throughput latency no higher than 45 minutes (half the time required to complete an orbit), for example. In some embodiments, ground stations may be located at lower latitudes with less harsh weather and transport, and easier access to power and communication links to the ground station 140. The ground station 140 may comprise radio communication equipment necessary to communicate with the satellite 130 and a communication interface to relay received information to a core server 150 over a communications link 148. The communication link 148 may be a wired or wireless communication link to the internet available to the ground station 140 and to the core server 150. The core server 150 may be accessible over the internet through an application or platform on a client device 160 over a conventional internet connection over the communication link 158. The client device 160 may be an end user computing device such as a desktop, laptop, mobile device, tablet, for example.

The core server 150 may be configured to decode, decrypt and/or decompress communication originating from a gateway device 120 and received over the communication links 128, 138 and 148.

The remote backhaul system 100 enables high-latency communication of data between the edge device array 115 and the client device 160. High-latency communication may be inherently suitable for transmitting small messages to and from the edge device array 115 deployed in remote locations and the client device 160. High-latency communication may comprise latency of greater than about 1 second, 2 seconds, 15 seconds, 30 seconds, or 1, 2, 3, 4 or 5 minutes, for example. Two high-latency communication methods are store and forward communication and short burst data communication.

Store and forward communication may be implemented by the satellite constellation 135 that periodically passes into a range where communication may be received from a gateway device 120 positioned in a remote location. Satellite 130 may gather data from the gateway device 120 and deliver it back to ground stations 140 that are connected to a network backbone or a network generally accessible over the internet. In some embodiments, the store and forward communication could be implemented by satellites or any type of air, ground or sea vehicles (carrying suitable communication and storage equipment) that intermittently travel within communications range of the gateway device 120. The transfers of data by the store and forward method may be bi-directional. The vehicles or satellites used to implement store and forward communication can be far less numerous than the number of gateway devices 120 that would be needed to cover a designated remote area. Further, vehicles or satellites used to implement store and forward communication can be more rapidly deployed, which can save time during the implementation of the remote backhaul system 100, reduce the duration of blackouts resulting from failure of gateway devices 120 and permit maintenance operations and system upgrades to be carried out using the core server 150 rather than on site in the field.

Short Burst Data (SBD) is another technique for communicating short data messages between seismic data acquisition unit 110 and a centralized host computing system such as the core server 150. SBD satellite messaging systems work by waiting for a suitable slot in a satellite network that has voice as its primary application. Examples include Orbcomm™, Jridiu™ and Globalstar™. The voice traffic in such systems is prioritized and requires latencies typically less than 500 ms, for example. However, due to the fluctuating demands for voice traffic, there are windows in which shorter messages can be sent. This is analogous to the Short Messaging System (SMS) technique/standard used in terrestrial communications networks design for mobile telephony. The typical latencies of the SBD traffic in such systems can be in the range of 5 seconds to 10 minutes or greater, for example.

In some embodiments, the gateway device 120 comprises LPWAN antennas that are configured to communicate over 8 or 16 radio channels. The gateway device 120 may communicate with seismic data acquisition units 110 within a range of 20 km, for example. The LPWAN antenna of gateway device 120 may be configured to communicate using the LoRa™ technology over the frequency bands 902-928 MHz, 863-870 MHz, 433-434 MHz, for example. The gateway device 120 may also be configured to communicate over Bluetooth (or other short-range) technology or over WiFi™ with devices located in its immediate vicinity, for example within a range of 15 m. The gateway device 120 may be configured to communicate with a maximum number of edge devices, such as at most 500 or 1000 edge devices, for example.

Figure 2C:
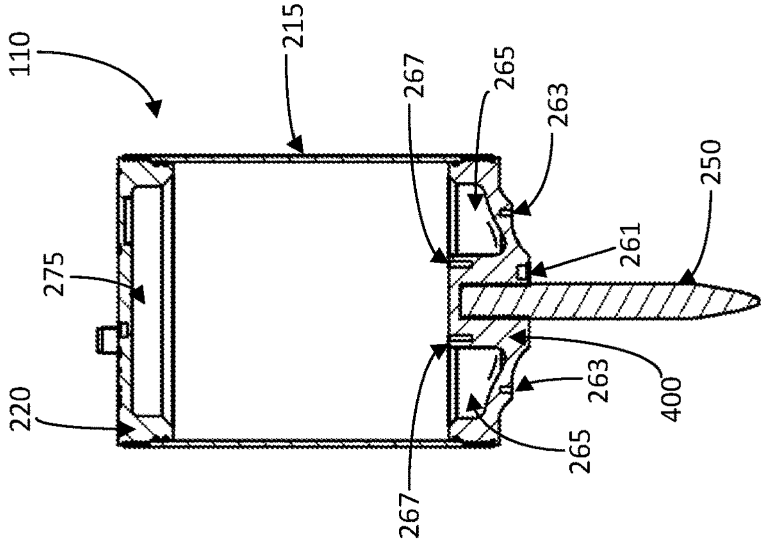
FIG. 2*c* is a cross sectional view of a seismic data acquisition unit 110 according to some embodiments.
Figure 2B:
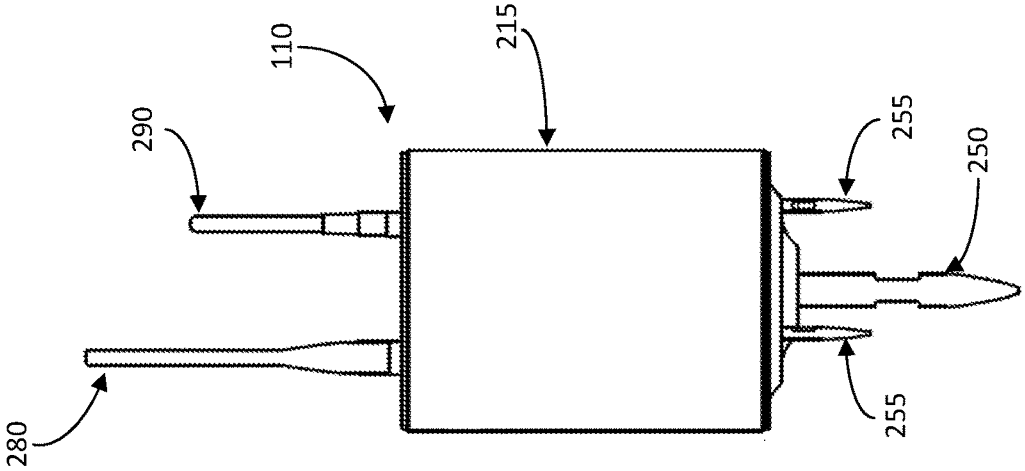
FIG. 2*b* is a side elevation view of a seismic data acquisition unit 110 according to some embodiments.
Figure 2A:
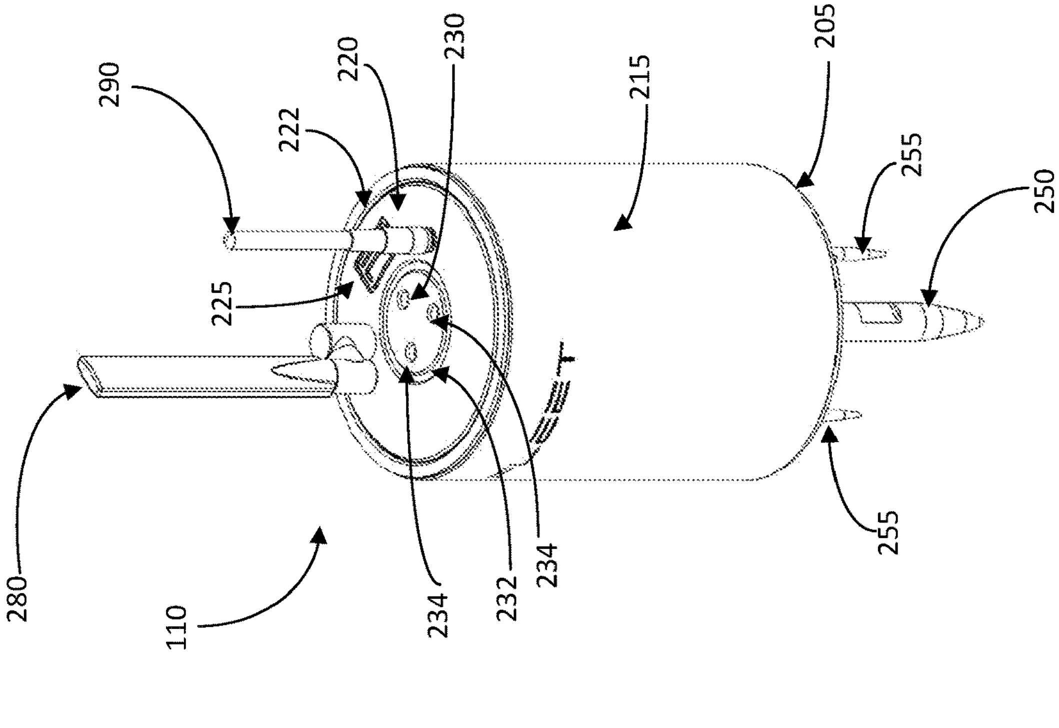
FIG. 2*a* is a perspective view of a seismic data acquisition unit 110 according to some embodiments.

FIG. 2*a* shows an external perspective view of seismic data acquisition unit 110 according to some embodiments. Seismic data acquisition unit 110 comprises a housing 205 that includes an enclosure 215, top part 220, bottom part 400 (shown further in FIGS. 4*a* to 4*d*). The seismic data acquisition unit 110 may further comprise a GPS antenna 290, LPWAN antenna 280 and/or electromechanical connectors for the antennae. The seismic data acquisition unit 110 may further comprise one or more secondary projections 255, and a sensing probe 250. Seismic data acquisition unit 110 also comprises a top part seal 222 between the top part 220 and the enclosure 215. Enclosure 215 may also be referred to herein as an outer wall. Enclosure 215 may be cylindrically shaped. Enclosure 215 may have a thickness of about 1.5 to 3 mm Enclosure 215 may have a thickness of about 1.5 mm, 2 mm, or 2.5 mm, for example. Enclosure 215 has a substantially solid-walled hollow cylindrical shape with opposite ends configured to receive the respective top part 220 and bottom part 400 to form a sealed chamber to house components of the data acquisition unit 110.

Enclosure 215 may have a length of about 135 mm to 165 mm. Enclosure 215 may have a length of about 140 mm to 155 mm, 147 mm to 157 mm, 150 mm to 160 mm, for example. Enclosure 215 may have a length of about 145 mm, 146 mm, 147 mm, 148 mm, 149 mm, 150 mm, 151 mm, 152 mm, 153 mm, 154 mm, 155 mm, or 156 mm for example.

Enclosure 215 may have an outer diameter of about 105 mm to 140 mm. Enclosure 215 may have an outer diameter of about 105 mm to 125 mm, 115 mm to 130 mm, or 120 mm to 135 mm, for example. Enclosure 215 may have an outer diameter of 120 mm, 121 mm, 122 mm, 123 mm, 124 mm, 125 mm, 126 mm, 127 mm, 128 mm, 129 mm, or 130 mm, for example.

In some embodiments, the top part 220 comprises a recess hole bearing central section 230, a top part segment separation 232, and a top part recess 225. The recess hole bearing central section 230 may comprise one or more top part recess holes 234. In some embodiments, the recess hole bearing section 230 comprises two three top part recess holes 234. In some embodiments, the recess hole bearing central section 230 is surrounded by a top part segment separation 232 on the top part 220. In some embodiments, the top part segment separation 232 is a recess on top part 220 forming a closed line around recess hole bearing central section 230.

On the top surface of top part 220, the top part recess holes may each have an internal diameter of about 5 to 7 mm. On the top surface of top part 220, the top part recess holes may each have an internal diameter of 5 mm, 6 mm, or 7 mm.

FIG. 2*b* shows an external side elevation view of a seismic data acquisition unit 110 according to some embodiments, comprising features shown in FIG. 2*a*. Components of seismic data acquisition unit 110 shown in FIG. 2*a* are also present in FIG. 2*b* including LPWAN antenna 280, GPS antenna 290, enclosure 215, sensing probe 250, and secondary projections 255.

FIG. 2*c* shows an internal cross sectional view of the housing 205 of seismic data acquisition unit 110 according to some embodiments. Seismic data acquisition unit 110 may also comprise a bottom part 400 having secondary projection recesses 263, bottom part recess holes 261, and bottom part filler space 265. The sensing probe 250 and the secondary projections 255 are coupleable to the bottom part 400. Components of seismic data acquisition unit 110 shown in FIG. 2*a* are also present in FIG. 2*c* including top part 220, enclosure 215, sensing probe 250, and internal components (best seen in FIGS. 18*a*, 18*b* and 18*c*).

Seismic data acquisition unit 110 is intended to be submerged in a ground mass or region up to the top portion, so that only the antennae 280, 290 project above ground level. A top surface of the top portion is preferably visible so that a status indicator (e.g. a coloured LED) is visible for inspection and a line-of-sight (to a gateway and satellite) for the antennae 280, 290 are unobstructed. In embodiments such as are shown and described in relation to FIGS. 21 to 26, 31 and 32, an engagement portion 2130 may extend from an upper surface of the top part 220, for example in the form of a hoist ring, loop or hook, to allow the data acquisition unit 110 to be pulled from the ground. In some embodiments of data acquisition unit 110, the antenna 280, 290 may not be attached at a time of transport of the unit, but are attached prior to or during installation of the unit 110 into a selected ground mass or region. Positioning of the antenna connectors 1480, 1490 (see FIGS. 14*a*, 14*b* and 14*c*) on the top part 220 allows the antennae 280, 290 to be readily connected or disconnected to the data acquisition unit 110, as required. For example, the GPS antenna may be changed between an active antenna and a passive antenna, depending on satellite fixing speed versus power consumption.

Figures 3A, 3B, 3C, 3D, 3E:
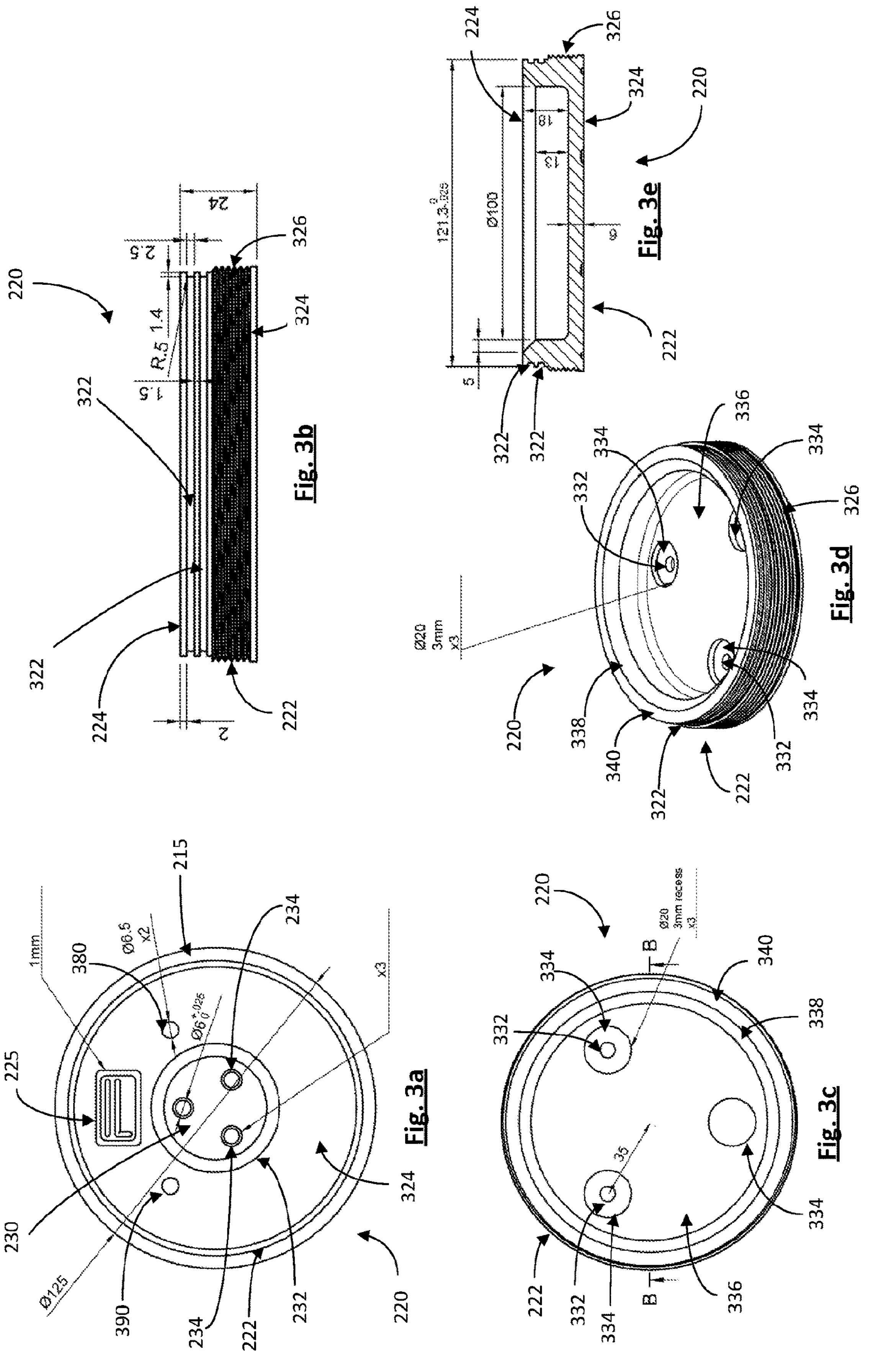
FIG. 3*a* shows an external top view of the top part 220 of the seismic data acquisition unit 110 according to some embodiments.
FIGS. 3*b* and 3*e* shows a side view of the top part 220 of the seismic data acquisition unit 110 according to some embodiments.
FIGS. 3*c* and 3*d* shows an underside view of the top part 220 of the seismic data acquisition unit 110 according to some embodiments.

FIG. 3*a* shows an external top view of the top part 220 of the seismic data acquisition unit 110 according to some embodiments. FIG. 3*a* does not show GPS antenna 290 and LPWAN antenna 280. FIG. 3*a* shows that the top part 220 of the housing 205 (apparatus) comprises GPS antenna recess 390, and LPWAN antenna recess 380. In some embodiments, GPS antenna 290 and LPWAN antenna 280 may be fixed to GPS antenna recess 380 and LPWAN antenna recess 390 respectively.

GPS antenna recess 390 and LPWAN antenna recess 380 may each have a diameter of about 5 to 8 mm. GPS antenna recess 390 and LPWAN antenna recess 380 may have a diameter of about 5.5 mm, 6 mm, 6.5 mm, or 7 mm, for example.

Also, as shown in FIG. 2*a*, the top part segment separation 232 is a recess on top part 220 forming a closed line around recess hole bearing central section 230. As shown in FIG. 3*a*, this closed line forms a torus shape 324 on the top part 220 exterior surface.

FIGS. 3*b* and 3*e* shows a side view of the top part 220 of the seismic data acquisition unit 110 according to some embodiments. As shown in FIGS. 2*a* and 3*a*, the top part 220 comprises the top part seal 222. The top part seal 222 may be located on the annular side around top part 220. The top part seal 222 may comprise grooves 326 joining top part 220 with enclosure 215. In some embodiments, grooves 326 may enable top part 220 to be fastened to enclosure 215 by a rotation motion. The top part seal 222 may also comprise one or more o-ring slots 322, each for placing o-rings. In some embodiments, top part seal 222 comprises two o-ring slots 322.

FIGS. 3*c* and 3*d* shows an underside view of the top part 220 of the seismic data acquisition unit 110 according to some embodiments. On the underside of top part 220, the interior side of the top part seal 222 may be lined with a walling which may be segmented by one or more different angled slopes 340 and 338, in some embodiments the interior walling of the top part seal 222 is not segmented. The interior walling of the top part seal 222 may connect to the underside 336 of the top of the top part 220. The underside may comprise one or more underside recess 334. In some embodiments, there may be three underside recess 334. One or more of the underside recess may have a further underside recess 332.

Figure 4B:
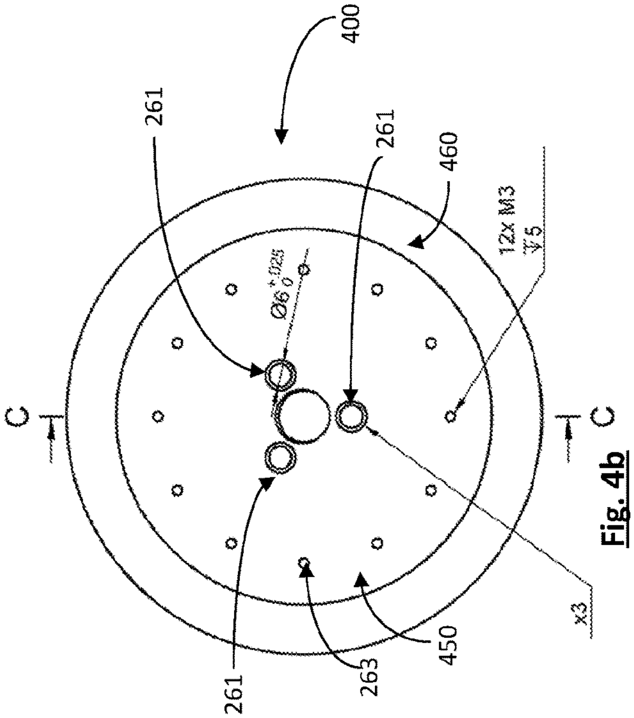
FIGS. 4*a* and 4*b* show an underside view of a bottom part 400 of the seismic data acquisition unit 110 according to some embodiments.
Figure 4D:
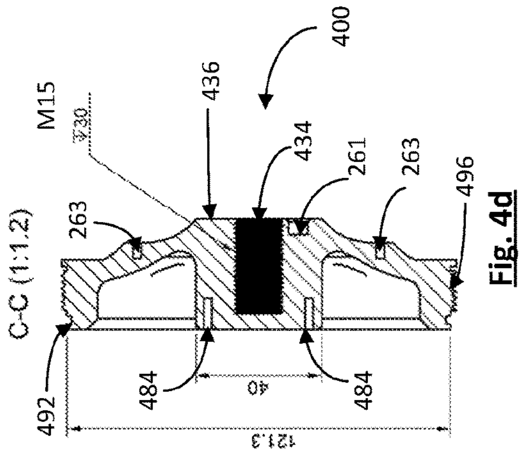
FIG. 4*d* shows a side cross section view of a bottom part 400 of the seismic data acquisition unit 110 according to some embodiments.
Figure 4A:
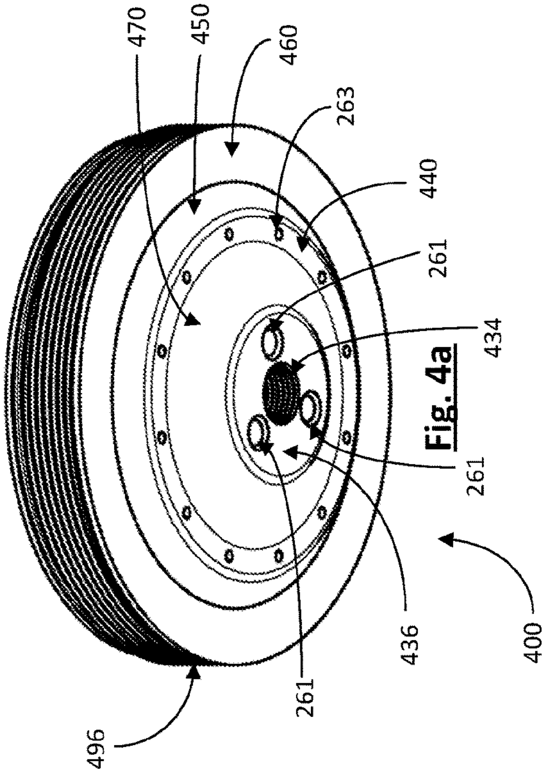

FIGS. 4*a* and 4*b* show an underside view of a bottom part 400 of the seismic data acquisition unit 110 according to some embodiments. The bottom part 400 may comprise an outer flat annular surface area 460, an outer annular inclined region 450, a central ring 440, a central sloped annular region 470, and a central flat annular recess bearing region 436. The central flat annular recess bearing region 436 may be surrounded by the central sloped annular region 470. The central sloped annular region 470 may be surrounded by the central ring 440. The central ring may be surrounded by the outer annular inclined region 450. The outer annular inclined region 450 may be surrounded by the outer flat annular surface area 460. The central flat annular recess bearing region 436 may comprise one or more bottom part recess holes 261. The central flat annular recess bearing region 436 may comprise one or more sensing probe recesses 434. In some embodiments, the central flat annular recess bearing region 436 comprises three bottom part recess holes 261 surrounding a singular sensing probe recess 434, wherein the three bottom part recess holes 261 arranged in a triangular orientation around the sensing probe 434. Central ring 440 may bear one or more secondary projection recesses 263. In some embodiments, central ring 440 may bear twelve secondary projection recesses 263. In some embodiments, secondary projection recesses 263 may receive M3 threaded screws and/or protrusions.

Figure 4C:
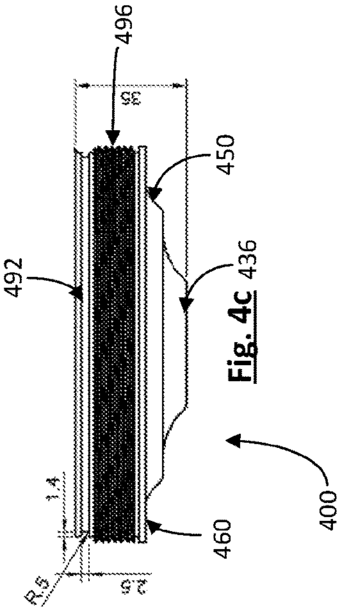
FIG. 4*c* shows a side view of a bottom part 400 of the seismic data acquisition unit 110 according to some embodiments.

FIG. 4*c* shows a side view of bottom part 400 of the seismic data acquisition unit 110 according to some embodiments. Bottom part 400 may be edged with bottom part grooves 496. Bottom part 400 may also be edged with bottom part o-ring slot 492. Bottom part o-ring slot 492 may be filled with an o-ring. Bottom part grooves 496 may allow bottom part 400 to attach to enclosure 215. After attachment of bottom part 400 to enclosure 215, bottom part o-ring slot 492 filled with an o-ring may prevent or substantially mitigate liquids and gases from entering or leaving enclosure 215.

FIG. 4*d* shows a side cross section view of bottom part 400 of the seismic data acquisition unit 110 according to some embodiments. Bottom part 400 may have one or more topside bottom part recesses 484. Recesses 484 may allow for screws to be inserted.

Figure 5B:
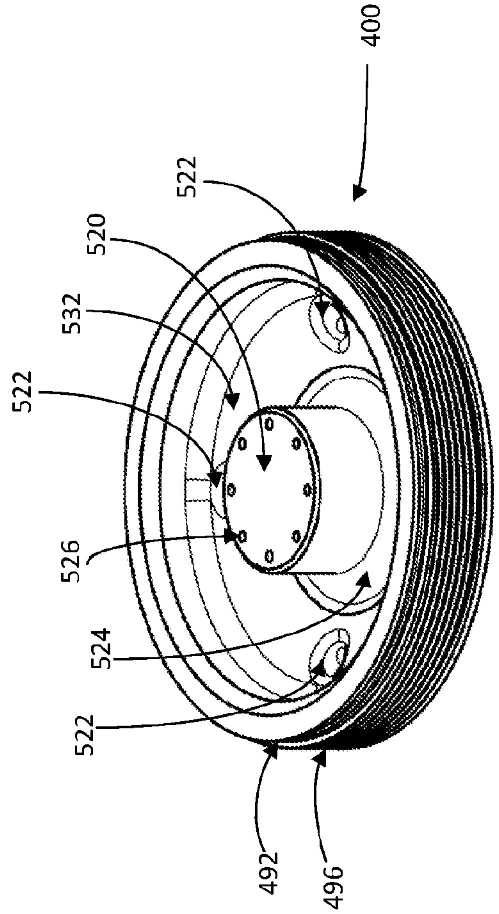
FIGS. 5*a* and 5*b* show a topside view of a bottom part 400 of the seismic data acquisition unit 110 according to some embodiments.
Figure 5A:
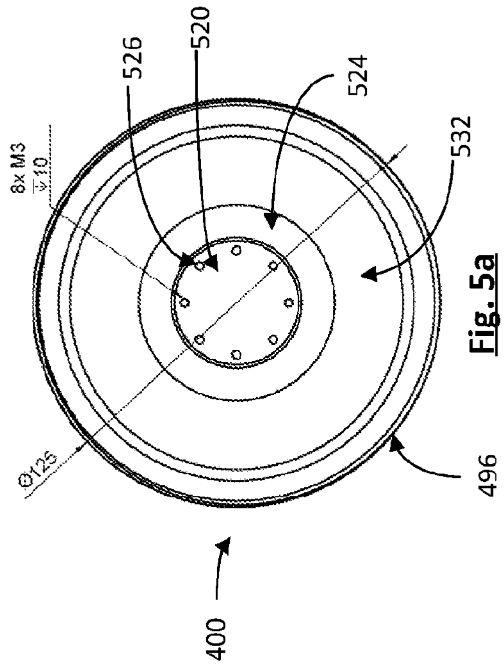

FIGS. 5*a* and 5*b* show a topside view of bottom part 400 of the seismic data acquisition unit 110 according to some embodiments. The top side of Bottom part 400 may have an outer annular area 532, an inner annular area 524, and a cylindrical probe bearing holder 520. As seen in FIG. 5*b* the outer annular area 532 may have bottom part recesses 522. As seen in FIGS. 5*a* and 5*b* the cylindrical probe bearing holder 520 may have holder recesses 526 in order to bear screws.

Figure 6B:
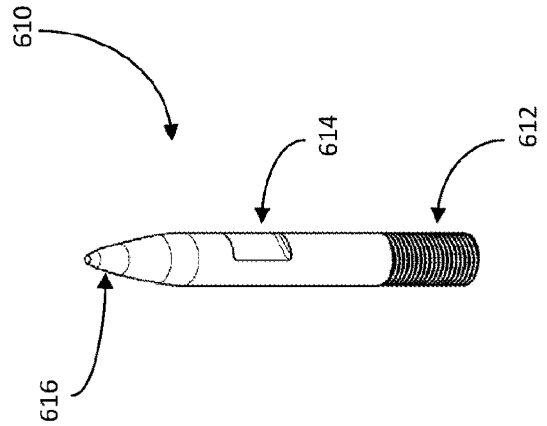
FIGS. 6*a* and 6*b* show a sensing probe 610 according to some embodiments.
Figure 6A:
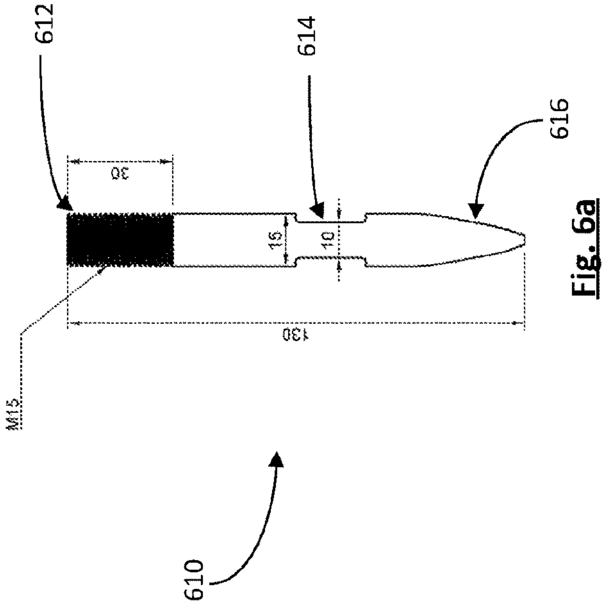

FIGS. 6*a* and 6*b* show a sensing probe 610 according to some embodiments. Sensing probe 610 may be in the form of a spike with a narrow tip. Sensing probe 610 may have sensing probe thread 612. Sensing probe thread 612 may be M15 thread according to some embodiments. In some other embodiments sensing probe thread 612 may be another type of thread. Sensing probe 610 may also comprise a sensing probe installation slot 614 and a sensing probe tip 616. Sensing probe 610 may be comprised of stainless steel. In some embodiments, sensing probe 610 may be comprised of SAE 316L marine grade stainless steel.

Figure 7B:
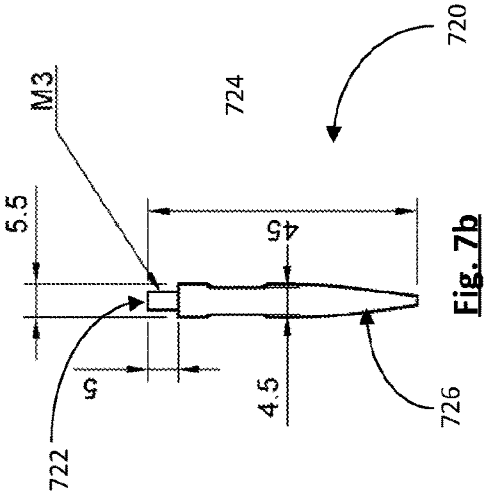
FIGS. 7*a* and 7*b* show a secondary projection 720 according to some embodiments.
Figure 7A:
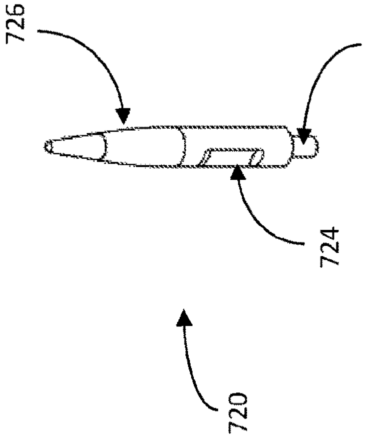

FIGS. 7*a* and 7*b* show a secondary projection 720 according to some embodiments. Secondary projection 620 may be in the form of a spike. Secondary projection 720 may have secondary projection thread 722 on one end. Secondary projection thread 722 may be M3 thread according to some embodiments. In some other embodiments secondary projection thread 722 may be another type of thread. Secondary projection 720 may also comprise a secondary projection installation slot 724 and a secondary projection tip 726 on an opposite end from the thread 722. Secondary projection 620 may be comprised of stainless steel or another metal. In some embodiments, secondary projection 620 may be comprised of SAE 316L marine grade stainless steel.

Figure 8B:
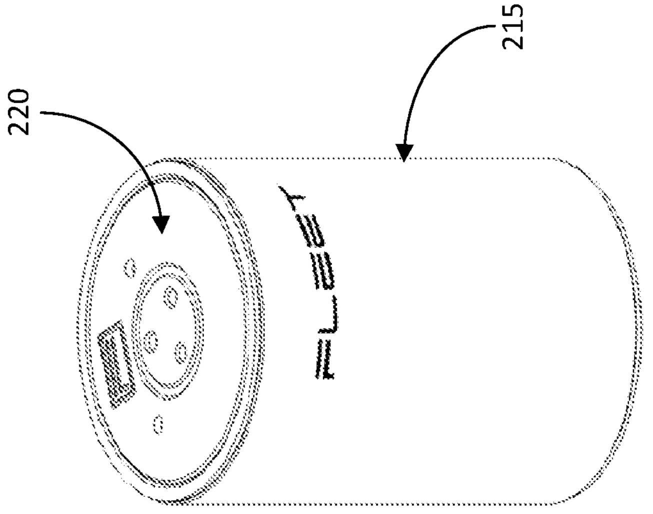
FIGS. 8*a* and 8*b* shows a tool for securing components of seismic data acquisition unit 110 according to some embodiments.
Figure 8A:
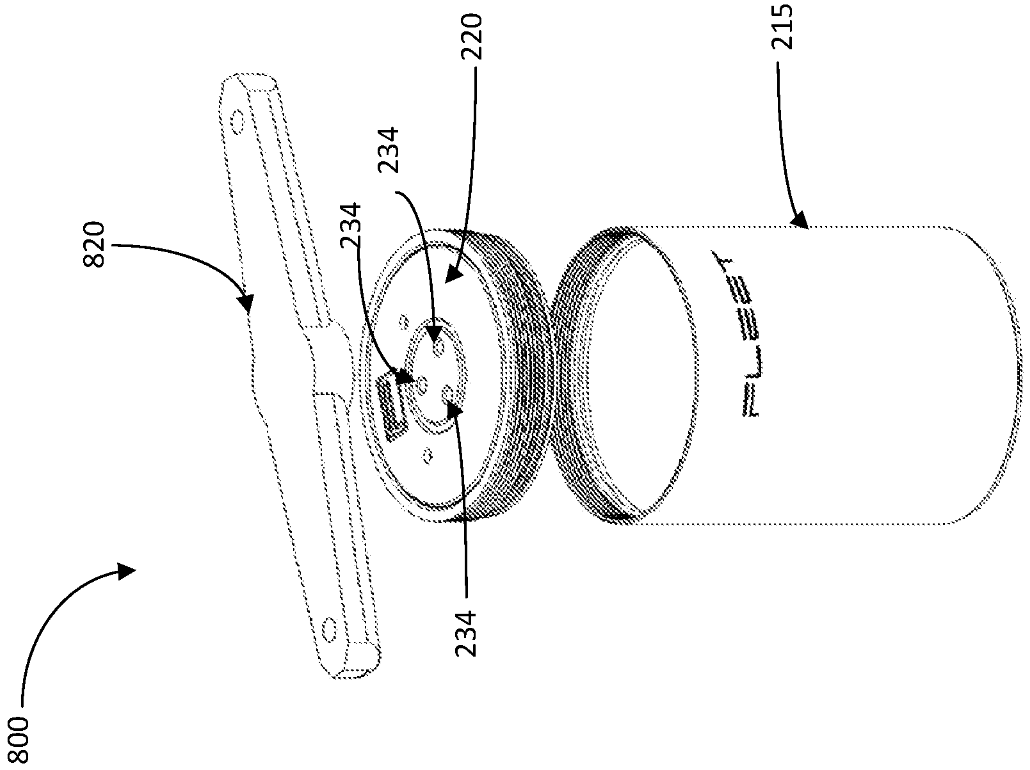
Figure 9B:
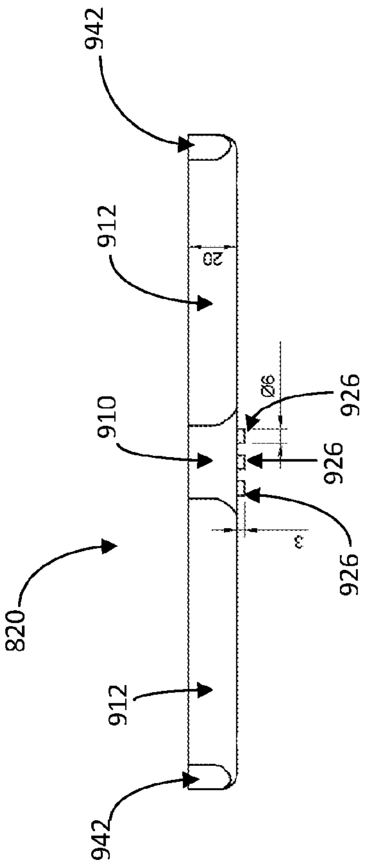
FIGS. 9*a* and 9*b* shows the tool for securing components of seismic data acquisition unit 110 according to some embodiments.
Figure 9A:
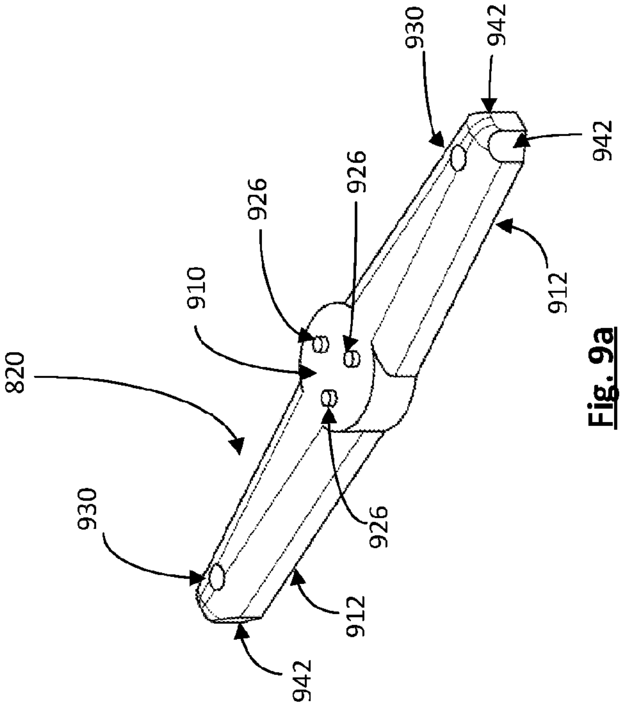

FIG. 8*a* shows a component diagram of a tool and components for securing the top lid 220 to enclosure 215 as shown in FIG. 8*b* according to some embodiments. A fastener tool 820 may be used to secure top lid 220 to enclosure 215. Fastener tool 820 may also be referred to as a force transmission tool, for example. Fastener tool 820 may contact with top part recess holes 234 to secure top lid 220 to enclosure 215. In some embodiments, as shown in FIGS. 9*a* and 9*b*, fastener tool 820 may comprise one or more protrusions 926. The protrusions 926 of fastener tool 820 may contact top part recess holes 234 to secure top lid 220 to enclosure 215. Fastener tool 820 may comprise three protrusions 926. In some other embodiments fastener tool 820 may comprise another number of protrusions 926. In some other embodiments fastener tool 820 may be used to secure bottom lid 400 to enclosure 215 using protrusions 926 to contact bottom part recess holes 426.

In some embodiments, fastener tool 820 is an elongated tubular shaped instrument comprising of two shafts 912 which extend from a central protrusion bearing body 910. Central protrusion bearing body 910 may be a cylinder, and may have protrusions 926 extending from a flat circular face of the cylinder. Shafts 912 may extend at 180 degrees angle from each other upon a plane parallel to the surface of the circular faces of the cylinder of the central protrusion bearing body. Shafts 912 may be rounded or segmented and oriented along their body in order to allow a user to grip the shaft with ease. Shafts 912 may bear recesses 930 on the same side as protrusions 926. Shafts may also bear recesses 942 at their ends. Recesses 930 may allow insertion of a shaft that can aid in manual rotation of the fastener tool 820.

Figure 10B:
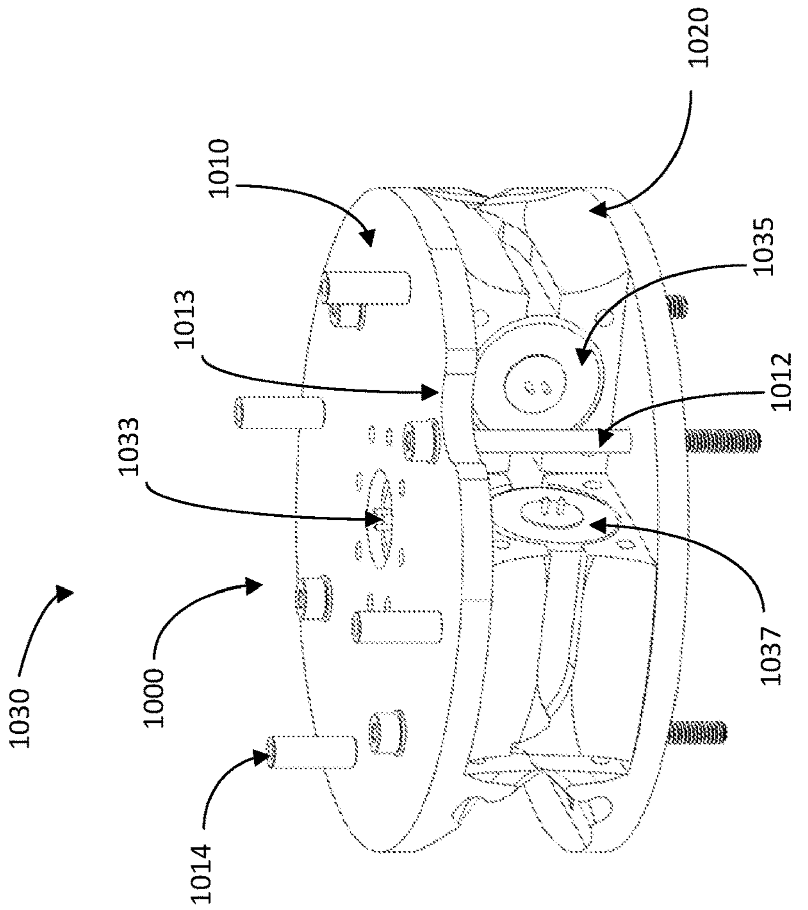
FIGS. 10*a* and 10*b* shows components of the seismic data acquisition unit 110 according to some embodiments.
Figure 10A:
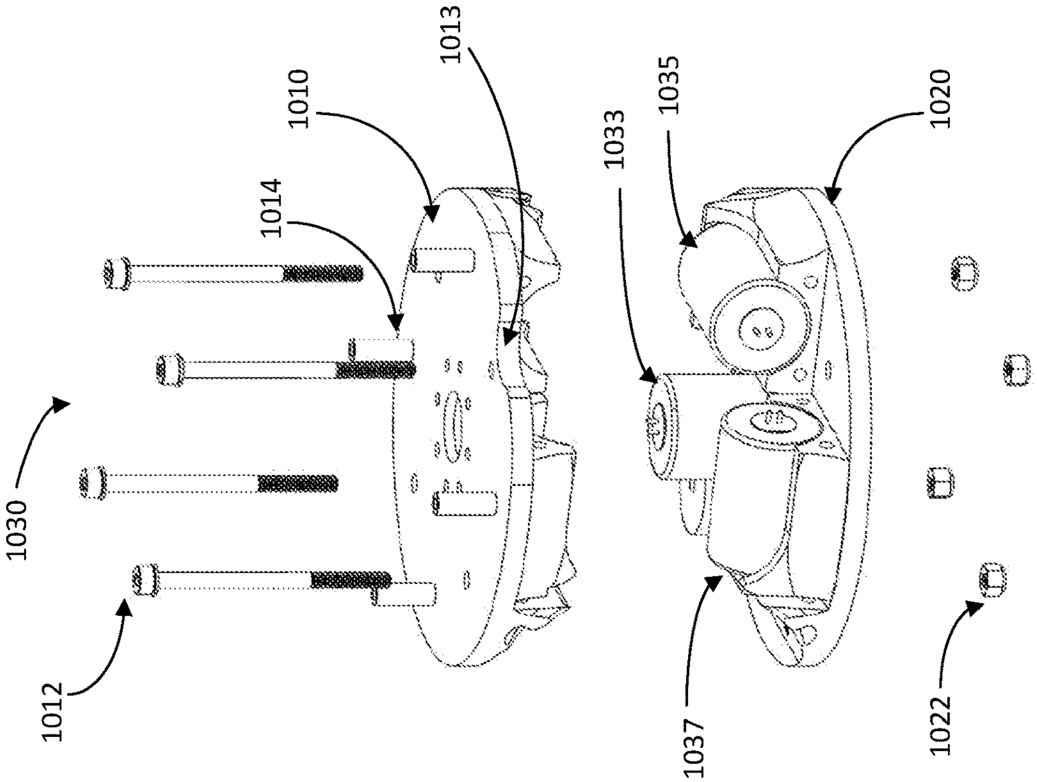

FIGS. 10*a* and 10*b* shows components of the seismic data acquisition unit 110 according to some embodiments. Seismic data acquisition unit 110 may comprise a geophone assembly 1030. Geophone assembly 1030 may comprise geophones 1033, 1035 and 1037. Each geophone 1033, 1035, 1037 may be of a kind the same as or similar to RTC-4.5 Hz-375, which is commercially available from R. T. Clark of Oklahoma City, OK, USA. For example, each geophone 1033, 1035, 1037 may have a natural frequency of up to about 10 Hz and optionally about 4.5 Hz. Geophone assembly 1030 may also comprise top clamping part 1010 and bottom clamping part 1020. Geophone 1033 may be a vertical axis geophone element. Geophones 1035 and 1037 may be horizontal axis geophone elements. Geophones 1033, 1035, and 1037 may have a natural frequency of about 4.5 Hz. In some other embodiments Geophones 1033, 1035, and 1037 may have a natural frequency between about 1 and about 10 Hz or between about 1 Hz and 100 Hz.

Geophones 1033, 1035 and 1037 may be mounted upon a bottom clamping part 1020. The geophones 1033, 1035 and 1037 mounted upon bottom clamping part 1020 may be enclosed by a top clamping part 1010. The joining of top clamping part 1010 and bottom clamping part 1020 creates an inner housing 1000 for the geophones 1033, 1035, and 1037. Therefore geophone assembly 1030 may comprise inner housing 1000. Geophone assembly 1030 may also comprise screws 1012 and nuts 1022. Top clamping part 1010 and bottom clamping part 1020 may be joined by the use of screws 1012 and nuts 1022. Top clamping part 1010 and bottom clamping part 1020 may additionally or alternatively be joined by an adhesive, such as a medium strength thread-locking adhesive.

The top and bottom clamping parts 1010, 1020 are each formed of a material having a low modulus of elasticity. For example, the material of the top and bottom clamping parts 1010, 1020 may be a relatively hard plastic material, such as a polyethylene material. The material of the top and bottom clamping parts 1010, 1020 may also be selected to substantially not change its form (i.e. by expansion) in temperatures above 50 degrees Celsius. The material of the top and bottom clamping parts 1010, 1020 may be a high density polyethylene material, acrylonitrile butadiene styrene (ABS), or polyethylene terephthalate glycol (PETG) or a mechanically similar material. The material of the top and bottom clamping parts 1010, 1020 may be selected to have minimal or negligible expansion or contraction due to expected thermal changes in the environment in which the data acquisition unit 110 is to be installed. The top and bottom clamping parts 1010, 1020 may each be formed by 3D printing, for example. The material of the top and bottom clamping parts 1010, 1020 may be selected to be formable by using a 3D printer, for example.

Geophones 1033, 1035 and 1037 may be mounted and enclosed within top clamping part 1010 and bottom clamping part 1020 so that they are oriented perpendicular to each other. Geophone 1033 may be oriented so that it is perpendicular to a celestial body's surface when seismic data acquisition unit 110 is installed. Geophones 1035 and 1037 may be oriented so that they are parallel to the tangent of the celestial body's surface and perpendicular to each other.

Geophone assembly 1030 may also comprise spacers 1014. Top clamping part 1010 may also bear spacers 1014 which may be secured to top clamping part 1010 by fasteners and/or an adhesive. A circumferential recess 1013 may be formed in an upper plate section of the top clamping part 1010 near where one of the screws 1012 passes through the top clamping plate 1010 to the bottom clamping plate 1020.

Figure 11B:
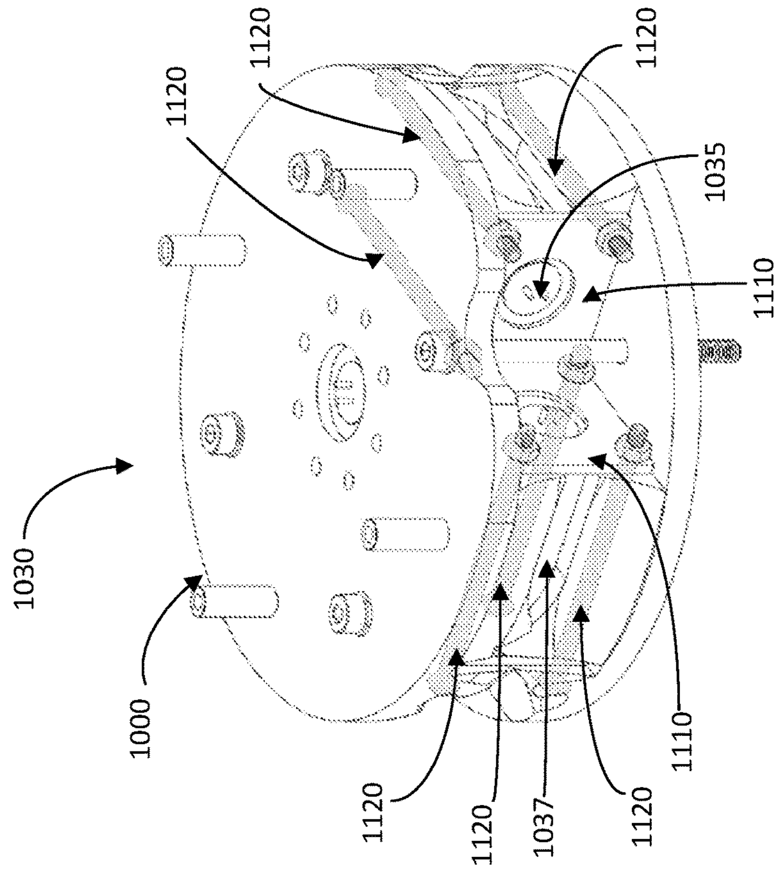
FIGS. 11*a* and 11*b* shows components of the seismic data acquisition unit 110 according to some embodiments.
Figure 11A:
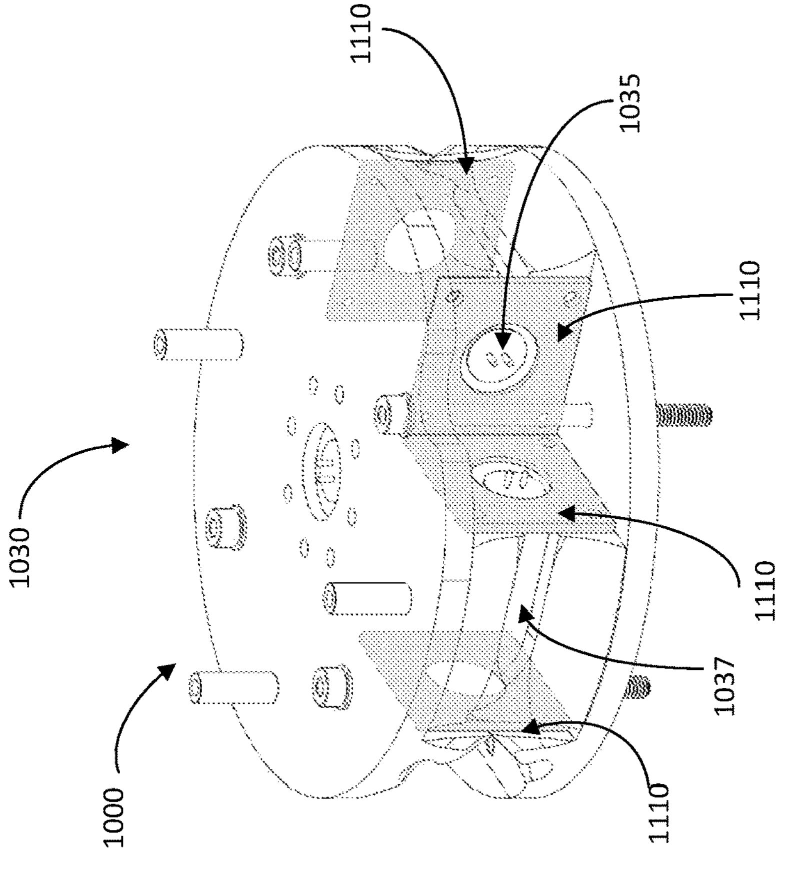

FIGS. 11*a* and 11*b* show components of the seismic data acquisition unit 110 according to some embodiments. Geophone assembly 1030 may also comprise plates 1110 and fasteners 1120. The geophones 1035 and 1037 may have plates 1110 secured with fasteners 1120 in order to assist securely mounting geophones 1035 and 1037 to inner housing 1000 and to better secure top clamping part 1010 to bottom clamping part 1020. In some embodiments, the plates 1110 may be square shaped and two may be placed on each side of the geophones 1035 and 1037 to may better secure geophones 1035 and 1037 to inner housing 1000 and therefore may reduce the effect of dampening of vibration sensing of the geophones 1035 and 1037. In some embodiments, the plates may have holes in order to expose pins of the geophone to wires.

Figure 12C:
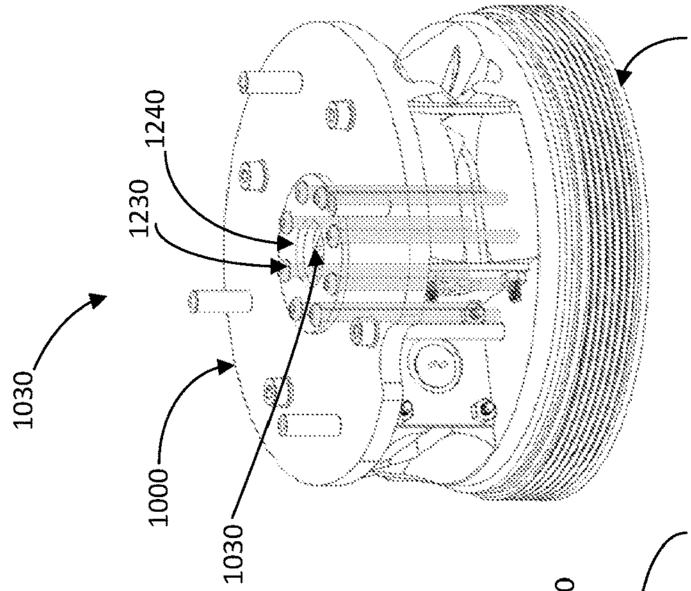
FIGS. 12*a*, 12*b* and 12*c* shows components of the seismic data acquisition unit 110 according to some embodiments.
Figure 12B:
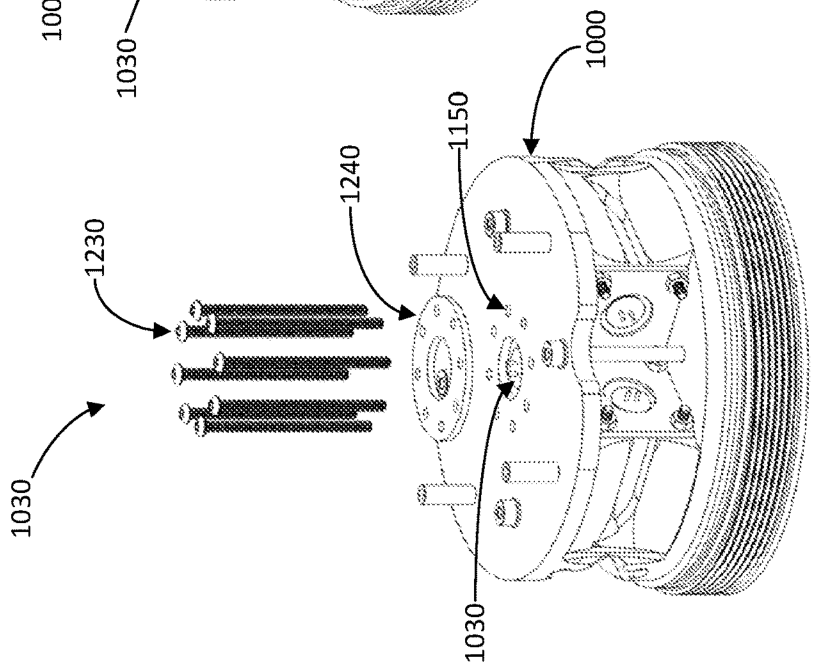
Figure 12A:
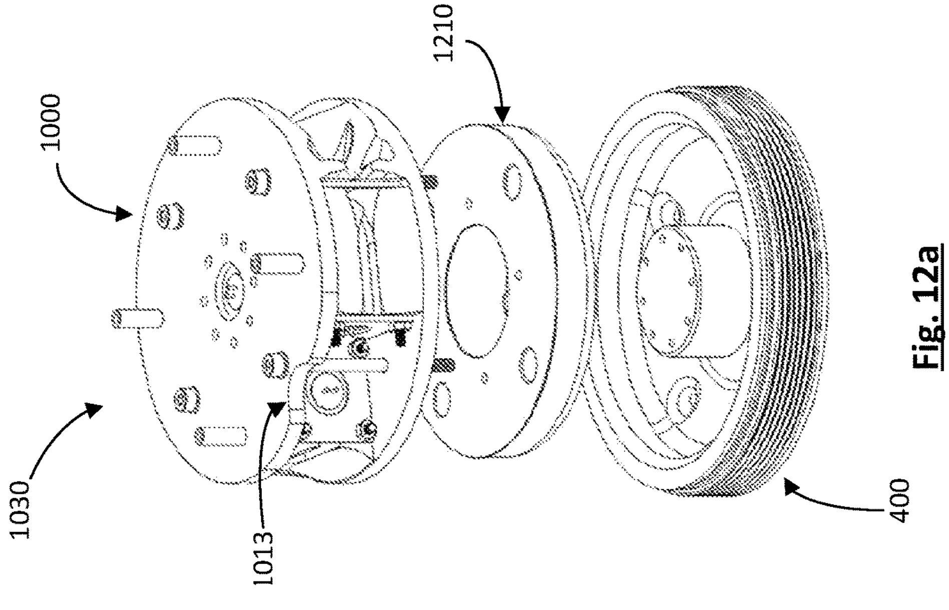

FIG. 12*a* shows components of the seismic data acquisition unit 110 according to some embodiments. Geophone assembly 1030 may comprise filler part 1210. Inner housing 1000 including components of geophone assembly 1030 may be joined with filler part 1210 and bottom part 400. Filler part 1210 may be annular shaped and fit within the top side of bottom part 400 into bottom part filler space 265 as seen in FIG. 2*c*. Inner housing 1000 including geophone assembly 1030 may be joined on top of filler part 1210 so that the bottom of the inner housing 1000 is in contact with the top of the top side of the bottom part 400.

FIGS. 12*b* and 12*c* shows components of the seismic data acquisition unit 110 according to some embodiments. Geophone assembly 1030 may comprise an annular plate 1240, which may also be referred to as an annular clamping ring 1240. Geophone assembly 1030 may also comprise fasteners 1230. The annular ring or plate 1240 may be placed or fitted on top of inner housing 1000 with fasteners 1230 inserted through the annular ring or plate 1240, inner housing 1000 and threadedly engaged into bottom part 400. Referring with reference also to FIGS. 5*a* and 5*b*, the fasteners 1230 may be inserted into bottom part 400 through the holder recesses 526 into the cylindrical probe bearing holder 520 of the bottom part 400. Such an arrangement may serve to better secure inner housing 1000 bearing geophones 1033, 1035, and 1037 to bottom part 400 and therefore may reduce the effect of dampening of vibration sensing of the geophones 1033, 1035, and 1037.

Figure 13B:
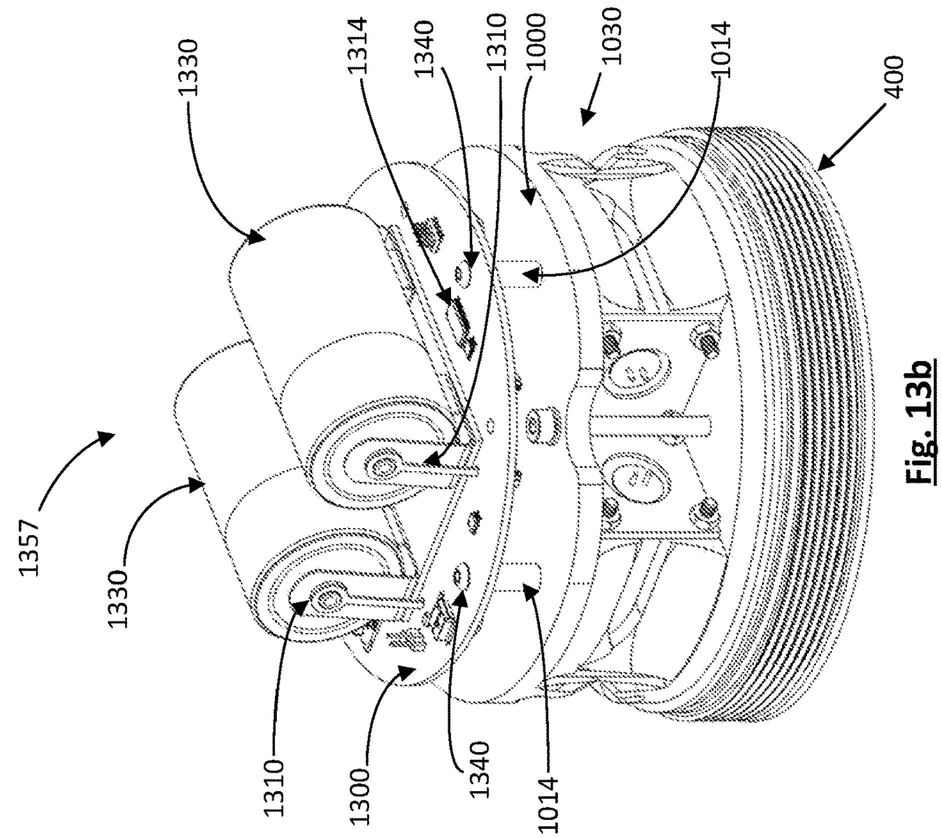
FIGS. 13*a* and 13*b* shows a power source 1330 and a printed circuit board 1300 according to some embodiments.
Figure 13A:
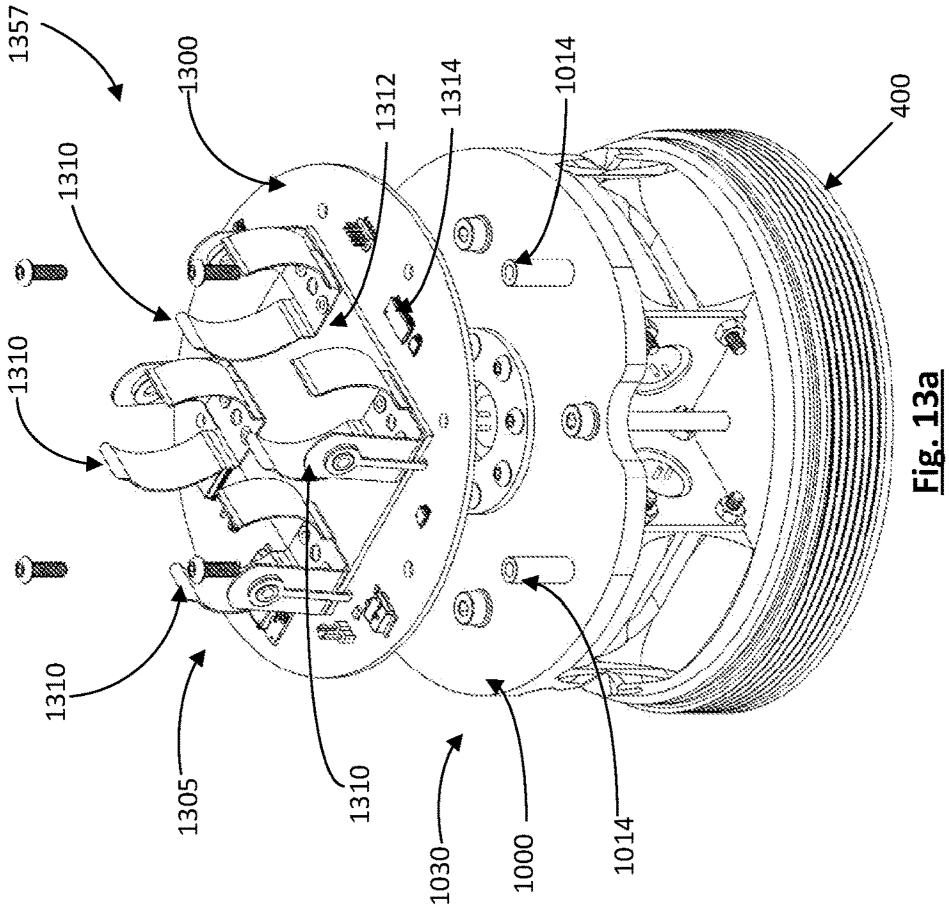

FIGS. 13*a* and 13*b* shows a component assembly 1357 according to some embodiments. Component assembly 1357 may comprise geophone assembly 1030, a power supply unit 1305, power source 1330 and a printed circuit board 1300 according to some embodiments. The printed circuit board 1300, bearing a processor 1484 and forming part of a processing unit 1402, may be mounted upon the top of inner housing 1000 and geophone assembly 1030 by using spacers 1014 and screws 1340 and recesses upon the printed circuit board 1300. Mounted upon printed circuit board 1300 are power source mounts 1310. Power source mounts 1310 may mount power source 1330. According to some embodiments, power source 1330 includes one or multiple batteries, such as commercially available batteries. Such batteries may include D cell batteries, for example. In some embodiments, the batteries are high capacity batteries, such as lithium thionyl chloride batteries. In some other embodiments, the batteries are a rechargeable battery, such as lithium-ion or lithium-polymer batteries. In some embodiments a single one of such batteries or another suitable single battery may be used. Power source 1330 may be selected to have sufficient power to allow seismic data acquisition unit 110 to be self-contained, so that no external power source is required to supplement the power source over an operation period of at least several months and up to a year or two. In some embodiments, the energy stored in power source 1330 is sufficient for data acquisition unit 110 to perform method 1500 continuously in normal operation for approximately two months, or in low power operation for approximately one year.

The following description will be in reference to FIGS. 13*a*, 13*b*, 19, and 20 according to some embodiments.

Figure 19:
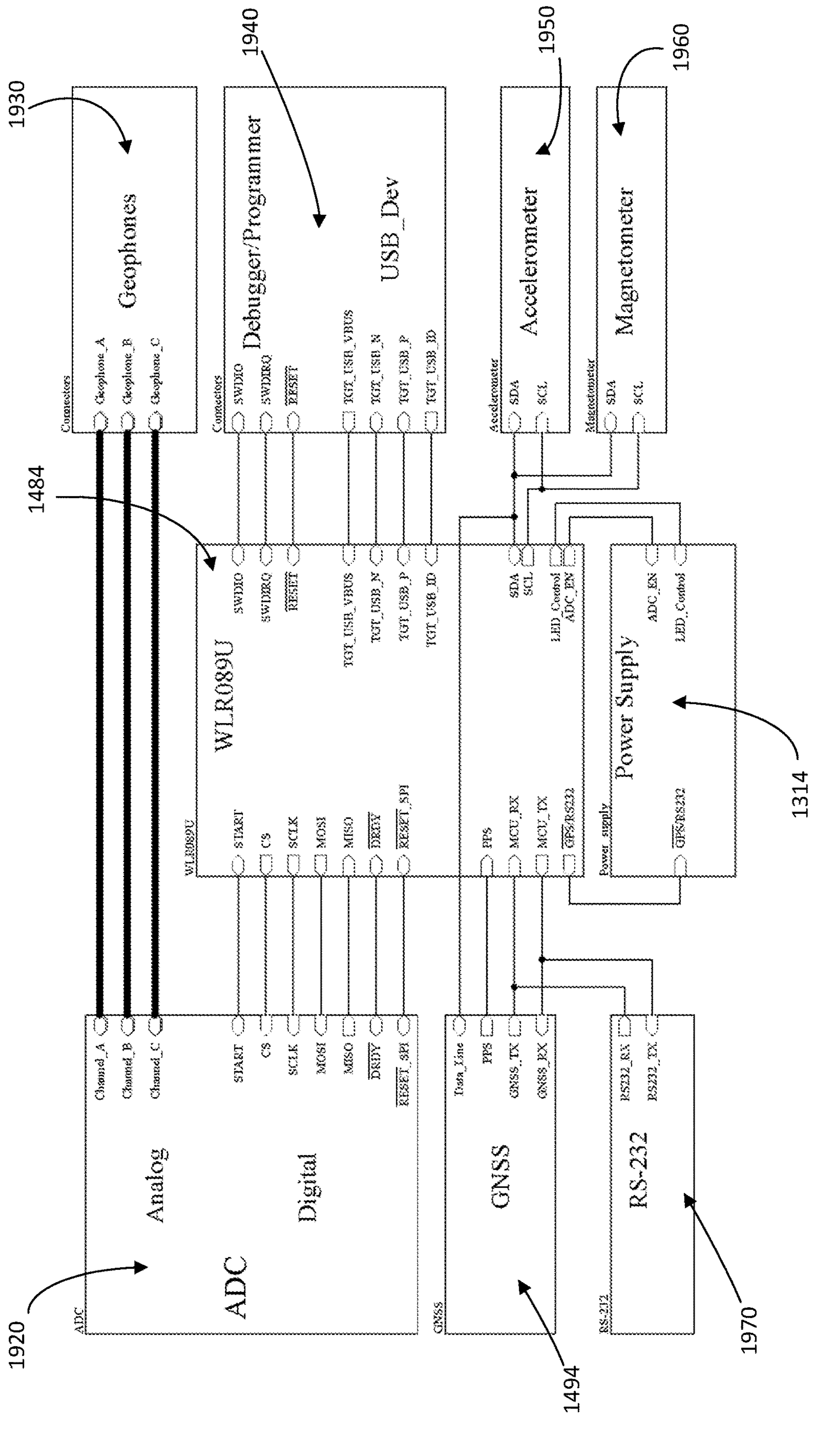
FIG. 19 shows a schematic diagram of electronic components of the seismic data acquisition unit according to some embodiments.
Figure 20:
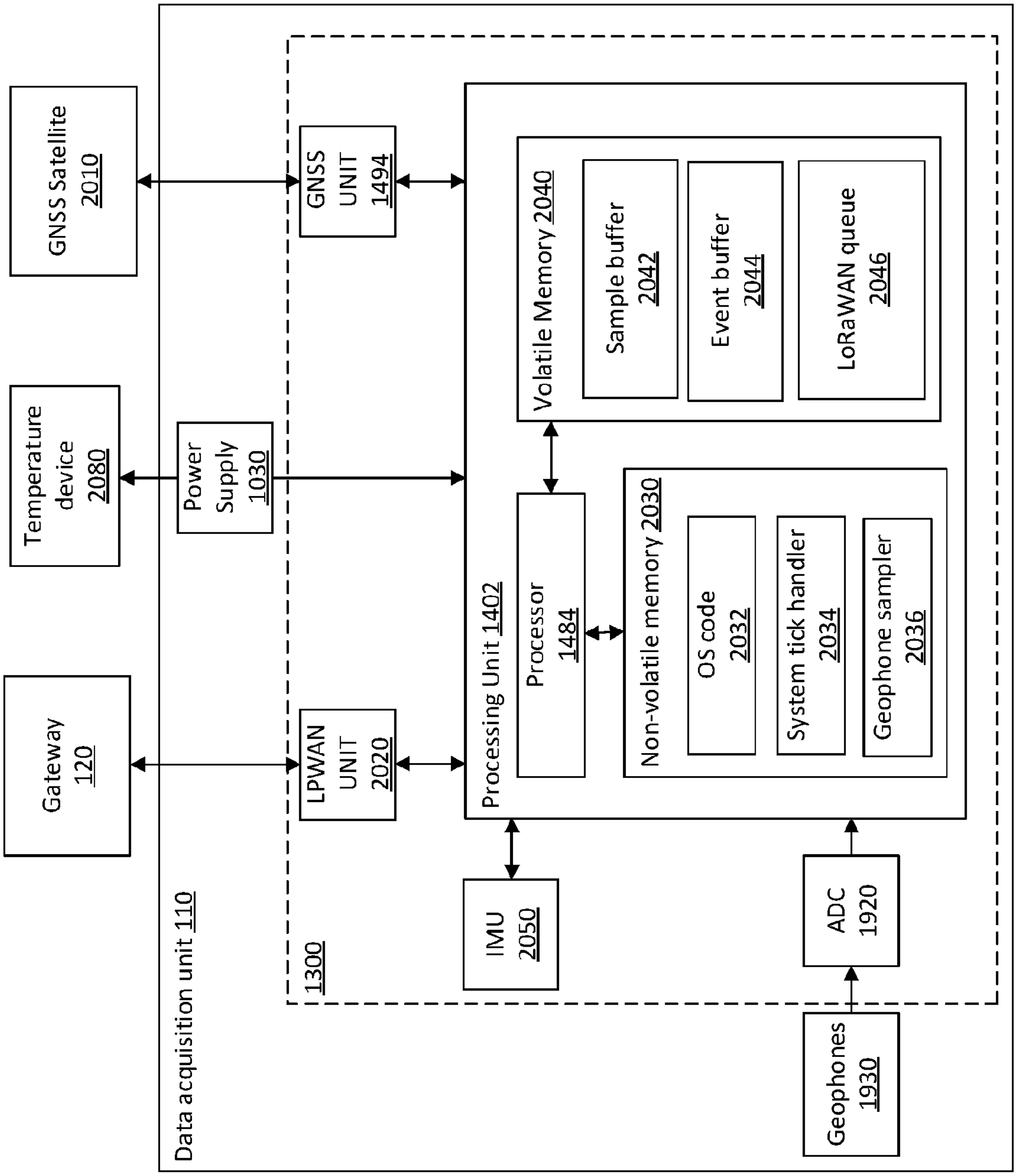
FIG. 20 is an example block diagram of a data acquisition unit according to some embodiments.

Printed circuit board 1300 may bear electronic components shown in FIG. 19 to form a printed circuit board assembly. The electronic components may comprise a processor 1484, an analog to digital converter 1920, a geolocation unit (e.g. including a GNSS module) 1494, power source 1330, accelerometer 1950, magnetometer 1960, components 1930 for connectivity to geophones, terminal module 1970, and USB programmer/debugger unit 1940. Accelerometer 1950 and magnetometer 1960 may be separate units as shown in FIG. 19, or in some other embodiments be comprised in an inertial measurement unit 2050 as shown in FIG. 20. Electronic components may also comprise any other connections or circuit elements, such as diodes, capacitors, inductors, resistors, and transistors.

Power supply unit 1305 may comprise power source mounts 1310, power supply circuitry 1314, and power source support 1312 as shown in FIGS. 13*a* and 13*b*. Power supply unit 1305 may comprise power source 1330. In some embodiments, data acquisition unit 110 may be supplied without power source 1330 installed as part of the power supply unit, for example prior to commissioning and/or installation of the data acquisition unit 110. Power source support 1312 may be in the form of a board. Power supply circuitry 1314 may be circuitry to enable power source 1330 to supply power to other electronic components in the housing 205 such as processor 1484, or other devices interfacing with seismic data acquisition unit 110. In some embodiments, the power source mounts 1310 are fixed to a power source support 1312, as shown in FIG. 13*a*. The power source board 1312 may be fixed to the printed circuit board 1300. The electronic components on the printed circuit board 1300 may be positioned around the power source board 1312, so that the power source board 1312, power source mounts 1310, and power source 1330 can be fixed closer to printed circuit board 1300 and other internal components to lower the centre of mass of the seismic data acquisition unit 110.

The arrangement of assembled components in component assembly 1357 in the housing 205 is selected to provide a centre of mass of the device that is approximately or substantially aligned with a vertical axis of the housing 205, which is defined by an axial centre line of the probe 250 and the cylindrical outer wall 215. This allows for the data acquisition unit 110 to maintain inertial balance, which assists to avoid bias to the geophones and to therefore receive accurate measurements from the geophones. Gravity can impact the bias of the geophones at particular natural frequencies (including 4.5 Hz), so it is preferred that the data acquisition units 110, when deployed in the ground, are kept vertically straight (i.e. the vertical axis of the data acquisition unit 110 is vertical relative to the earth's surface). That is, the top part 220 may be coplanar with the ground if the ground around the data acquisition unit 110 is horizontal. It would be a significant challenge to consistently deploy up to hundreds of data acquisition units 110 if they have an imbalanced centre of mass. An imbalanced mass may also impact the vibrational response of the data acquisition unit 110, and the response may be different between the X and Y geophones 1037, 1035.

In some embodiments, processor 1484 is a microcontroller. Processor 1484 forms part of processing unit 1402. Processing unit 1402 may comprise printed circuit board 1300. Processing unit 1402 or processor 1484 may comprise volatile memory 2040 and non-volatile memory 2030 so that memory 2040 and 2030 are accessible to the microcontroller of processor 1484. Processing unit 1402 is responsible for controlling operation of the data acquisition unit 110, most of the work of which is performed by processor 1484.

Non-volatile memory 2030 may comprise operating system code 2032. Non-volatile memory 2030 may also comprise pre-determined or periodically determined operational parameters and device operation management (e.g. executed as a system tick handler) code 2034 as described in relation to FIG. 15. Non-volatile memory 2030 may also comprise geophone sample handler code 2036, as described below in relation to FIG. 30.

Figure 15:
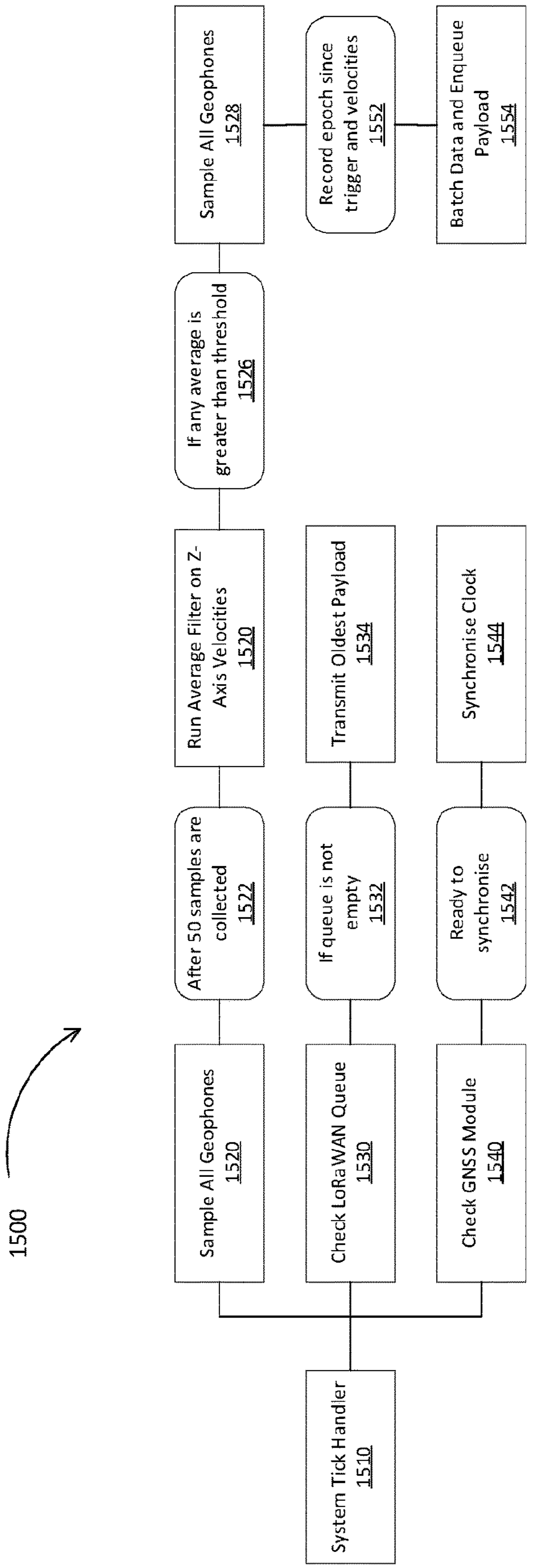
FIG. 15 shows a flow diagram of a method 1500 of data acquisition executed by processor 1484 of the data acquisition unit 110 according to some embodiments.

Volatile memory 2040 may comprise sample buffer 2042, event buffer 2044, and LoRaWAN queue 2046 which are further described in FIG. 15.

In some embodiments, processor 1484 is packaged with a data communications unit 2020 including a chip for long range wireless communications. In some other embodiments, the data communications unit 2020 including the chip for long range wireless communications is not packaged with processor 1484, but instead is another electronic component which interfaces with processor 1484 outside of processor 1484's package. In some embodiments, the data communications unit 2020 is a LPWAN unit and the chip for long range wireless communications is an LPWAN chip. In some embodiments, the LPWAN chip is a LoRaWAN chip which utilizes a LoRaWAN protocol. The LoRaWAN chip may be used for low-power consumption during transmission, as well as utilizing communication range capabilities. The data communications unit 2020 including the chip for long range wireless communications enables processor 1484 to communicate with gateway 120.

GNSS unit 1494 may enable processor 1484 to communicate with a GNSS satellite 2010 for receiving positioning and timing data. The GNSS satellite may be a global positioning system (GPS) satellite, for example.

Terminal module 1970 may enable serial communications between processor 1484 and external devices. Terminal module 1970 may enable RS-232 communications via a serial bus, for example.

Power source 1330 may supply power to processor 1484 and other components on printed circuit board 1300. According to some embodiments, power source 1330 may also be able to supply power to another external device, such as a temperature sensor device 2080 (FIG. 20) or other connected device. For example, the temperature sensor device 2080 or other device may be connected through a serial connection such as serial connector 2140 (FIG. 21).

Analog to digital converter 1920 may be used to convert voltages measured by components such as geophones 1033, 1035 and 1037 and output the digital data to processor 1484.

In some embodiments, the electronic components are chosen for their low-power consumption and capability. Components may be chosen optimal to the design rather than being limited to commercial modules. In addition, the PCBA may be designed to consume as little power as possible to extend its battery life in the field. In some embodiments, no sampled data is stored locally outside of buffering, removing the need to keep a permanent memory component, and this may save additional power.

In some embodiments, bottom part 400, top part 220, enclosure 215, annular ring or plate 1240 and plates 1110 may be comprised of Aluminium or Aluminium alloy. The probe 250 may be formed of stainless steel or another structurally equivalent metal. Materials of the data acquisition unit 110 are selected to allow the data acquisition unit 110 to be suitable for harsh environments and to improve ground coupling. The heavier the data acquisition unit 110 is, the better it will be coupled to the ground to receive transmission of seismically originating vibrations. However, if the data acquisition unit 110 is too heavy, then it can be cumbersome for transportation and deployment. If the data acquisition unit 110 is too light, then vibration sensing may be inadequate. The housing components of data acquisition unit 110, such as housing 205, being made from a light but durable metal (such as Aluminium or an alloy) improves its ruggedness for deployment in harsh and arid environments. In contrast, many IoT (Internet-of-things) devices are made from plastic to reduce manufacturing cost and are usually deployed in urban environments with conditions quite different from remote areas where seismic event detection is desired.

The use of 3D printed parts, such as top and bottom clamping parts 1010, 1020, to construct the geophone holder assembly 1000 advantageously provides ease of manufacture and freedom in the topological design of such parts. Top and bottom clamping parts 1010, 1020 are formed specifically to be suitable for holding the geophones 1033, 1035, 1037 in place once assembled, and provide a robust mechanical coupling to the rest of the housing 205. The top and bottom clamping parts 1010, 1020 are designed in a way that enables easy assembly with a robust fitting. For example, the top and bottom clamping parts 1010, 1020 make use of interlocking features that might otherwise be challenging to design with traditional machining processes. Further, the 3D top and bottom clamping parts 1010, 1020 can provide encapsulation, suitable mechanical coupling of vibration, and a relatively homogenous mass.

Figure 14C:
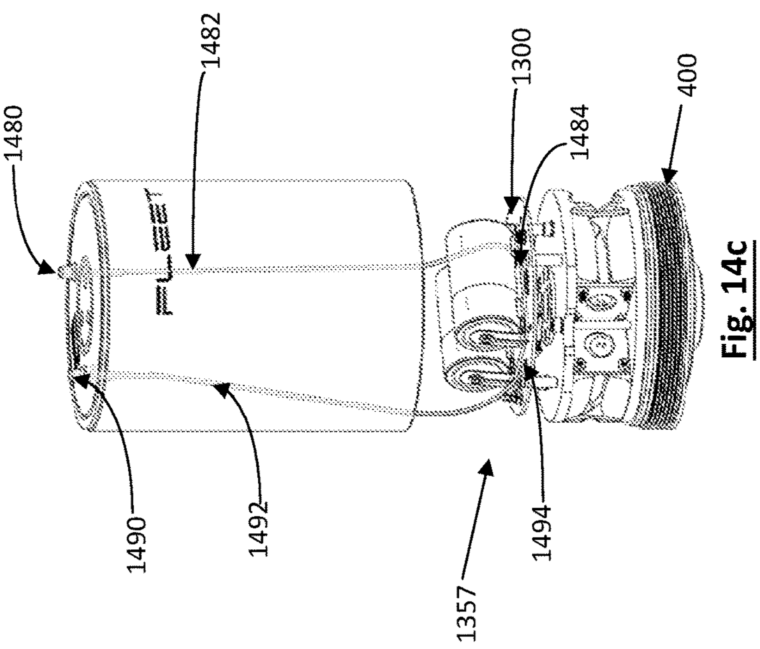
FIGS. 14*a* and 14*b* shows wiring of components of the seismic data acquisition unit 110 according to some embodiments.
Figure 14D:
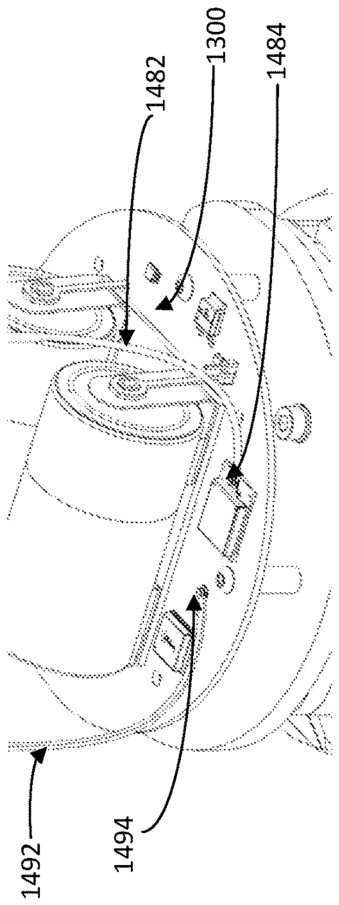
Figure 14A:
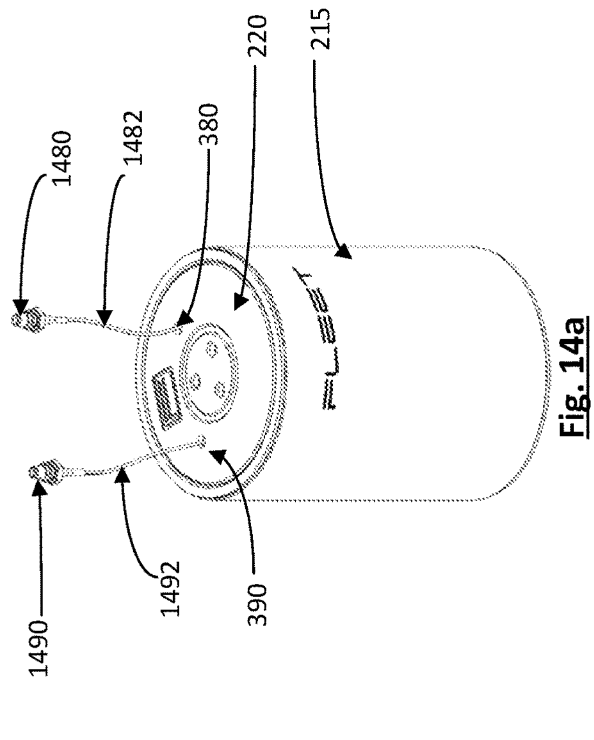
Figure 14B:
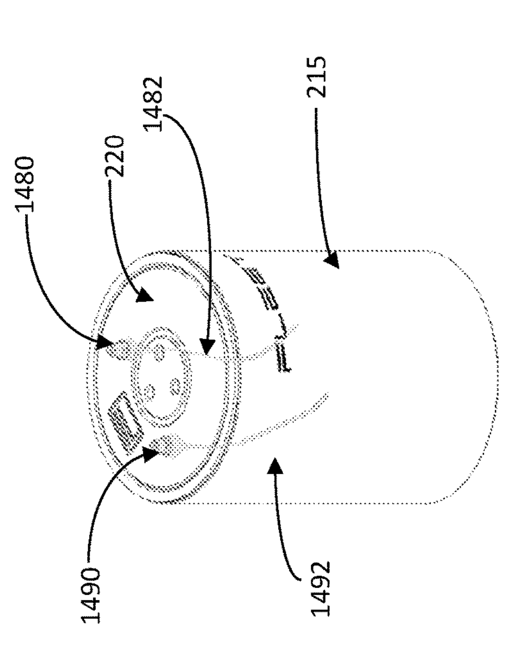

FIGS. 14*a* and 14*b* show enclosure 215 wired between from both GPS antenna recess 390 and LPWAN antenna recess 380 to within enclosure 215. The GPS antenna wire 1492 and LPWAN antenna wire 1482 are threaded through GPS antenna recess 390 and LPWAN antenna recess 380 on top part 220. The top end of GPS antenna wire 1490 and top end of LPWAN antenna wire 1480 may comprise a fitting, wherein the fitting comprises one or more o-ring, washer and nut. A top end of GPS antenna wire 1490 and a top end of LPWAN antenna wire 1480 may each include a radio-frequency (RF) connector. Top end 1490 and top end 1480 may include an SMA bulkhead, for example. Top end 1490 and top end 1480 may be made from brass. Top end 1490 and top end 1480 may enable communications with different kinds of communications antennae and modules. In some other embodiments, top end of GPS antenna wire 1490 may instead connect a passive GNSS antenna and module, or a second LPWAN antenna and module, for example. Top end of GPS antenna wire 1490 and top end of LPWAN antenna wire 1480 may be fitted to GPS antenna recess 390 and LPWAN antenna recess 380 respectively thereafter as shown in FIG. 14*b*. FIGS. 14*c* and 14*d* show the wiring of FIGS. 14*a* and 14*b* connecting to electronic components on printed circuit board 1300. The GPS antenna wire 1492 and LPWAN antenna wire 1982 may connect to GNSS module 1494 and processor 1484 respectively. In some embodiments, processor 1484 is a microcontroller.

FIG. 15 shows a flow diagram of a method 1500 of data acquisition executed by processor 1484 of the data acquisition unit 110 according to some embodiments.

In some embodiments, processor 1484 executes system tick handler code in non-volatile memory at step 1510. System tick handler code may be executed by processor 1484 repeatedly at an execution start time between 0.5 to 3 milliseconds. In some embodiments, the execution start time is about 1 millisecond. In some embodiments, execution of system interrupt handler code by processor 1484 is invoked by an interrupt signal.

At step 1510, processor 1484 determines another process step within method 1500 to commence. In some embodiments, following step 1510, processor 1484 commences one of steps 1520, 1528, 1530, or 1540. In some embodiments, execution of step 1520 may be followed by steps 1522, 1524, 1526 sequentially. In some other embodiments, execution of step 1520, may be followed by steps 1522, 1524, 1526, 1528, 1552 and 1554 sequentially. In some embodiments, execution of step 1528 may be followed by steps 1552 and 1554 sequentially. In some embodiments, execution of step 1530 may be followed by steps 1532 and 1534. In some embodiments, execution of step 1540 may be followed by steps 1542 and 1544. In some embodiments, after executing one sequence, processor 1484 may then execute one or more other sequences before the next execution of system tick handler code at step 1510. For example, processor 1484 may transmit oldest payload 1534 while also sampling all geophones at step 1520. Steps in method 1500 requiring data storage may utilize volatile memory of processor 1484.

At step 1520, processor 1484 executing code in non-volatile memory 2030 samples geophones 1033, 1035, and 1037. In some embodiments, sampled data from geophones at step 1520 may include voltage readings pertaining to instantaneous vibration-induced velocity data. The voltage readings from the geophones 1033, 1035, and 1037 may be processed by ADC 1920 to convert them from analog to digital signals. Before or after processing by the ADC 1920, the voltage readings may be filtered. The filtering may include removing a previously detected DC offset for each geophone. The filtering may include low pass filtering of the voltage readings, for example. The DC offset may be determined at an initial calibration step at commissioning of the data acquisition unit 110 and may then be periodically re-determined at recalibration steps performed by processor 1484. The frequency of the periodic recalibration may be fixed. For example, the frequency of recalibration may be around every 1 to 10 hours, or every 3 to 6 hours. The frequency of the recalibration may be increased by processor 1484 in response to changes in external and/or internal temperature, where such temperature information is available to the processor 1484. This can be helpful if the data acquisition unit 110 is in an environment that has large temperature fluctuation cycles, for example. The processor 1484 may receive temperature information about the internal and/or external temperature from a local temperature sensor in housing 205 or external to housing 205 (e.g. by serial connector 2140 or terminal module 1970), or from an external source, such as gateway device 120, for example.

In some embodiments, the voltage readings of the geophones 1033, 1035, and 1037 are sampled continuously at an interval of a total sample time. In some embodiments, the total sample time is between 15 milliseconds and 70 milliseconds. In some embodiments, the total sample time is every 25 to 30 milliseconds for a normal operation. In some embodiments, the total sample time is as often as possible. In some embodiments, the total sample time may be limited by the processor 1484 and analog to digital converter 1920. In some embodiments, system tick handler code is executed by processor 1484 at a higher frequency than the frequency of sampling at step 1520, therefore may then execute another method step from method 1500. In some embodiments, when the total sample time is around 15 to 40 milliseconds, data acquisition unit 110 may be able to accurately determine seismic events of a frequency of approximately between 1 to 10 Hz or 4 to 6 Hz. In some embodiments, the total sample time is selected or increased to conserve power or processing resources in a low power operation. In some embodiments, the lower power operation may be achieved alternatively or additionally by putting the processor 1484 in a sleep mode and/or disconnecting particular electronic components.

Figure 34:
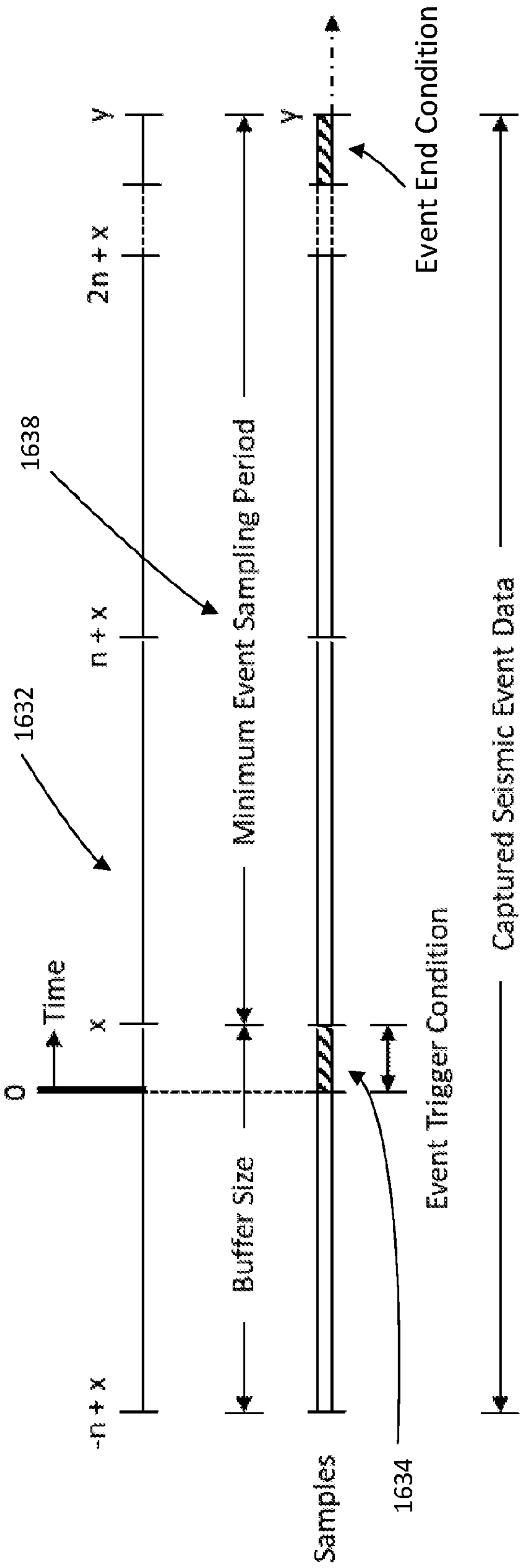
FIG. 34 is a schematic diagram illustrating timing of data capture and buffering of geophone samples.

While processor 1484 is sampling the geophone outputs at step 1520, it stores samples in the sample buffer 2042. In some embodiments, processor 1484 is a microcontroller with the sample buffer 2042. In some embodiments, the sample buffer 2042 stores up to a fixed buffer size of n samples (e.g. 50 samples) from readings of each of geophones 1033, 1035, and 1037, as illustrated in FIG. 34. In some embodiments, processor 1484 additionally collects samples of readings from accelerometer 1950. In some embodiments, processor 1484 additionally collects samples of readings from magnetometer 1960.

In some embodiments, after processor 1484 determines that n (e.g. 50) samples have been collected at step 1522, processor 1484 will then apply a moving average filter window on a predetermined number x of the most recent samples stored in the sample buffer 2042 at step 1524 (see FIG. 34). In some embodiments, the moving average filter window applies to the most recent five samples (i.e. x=5). In some embodiments, the moving average filter is applied only to samples in the z-axis/vertical direction (samples measured from geophone 1033). In some embodiments, processor 1484 continues to sample geophones 1033, 1035, and 1037 after applying the moving average filter window, with the 50 most recent samples being stored in the sample buffer 2042.

In some embodiments, the moving average filter window is a calculation determined by processor 1484 based on a summation of the most recent samples and a subsequent division of the summation of the most recent samples. In some embodiments, the summation of the most recent samples is a weighted summation, wherein samples within the summation are weighted based upon relevant recency of the sample.

In some embodiments, if processor 1484 determines that the moving average filter window yields a magnitude greater than a predetermined event trigger magnitude threshold at step 1526, processor 1484 then samples geophones 1033, 1035, and 1037 and places the samples in the event buffer 2044 at step 1528. In some embodiments, processor 1484 also places samples from accelerometer 1950 into the event buffer 2044 at step 1528. In some embodiments, processor 1484 also places samples from magnetometer 1960 into the event buffer 2044 at step 1528. In some embodiments, the determination of exceeding the predetermined magnitude threshold in step 1526 and commencement of step 1528 may be referred to as an event trigger time or epoch. In some embodiments, the event trigger time may be adjusted by processor 1484 to account for delays in signal transmission and processing.

In some embodiments, the predetermined event trigger magnitude threshold is a number determined by processor 1484 from samples of geophones 1033, 1035, and 1037. In some embodiments, the predetermined event trigger magnitude threshold number is a number determined by samples from geophone 1033. The samples for determining the predetermined event trigger magnitude threshold may be measured in steps 1520 and 1528. The predetermined event trigger magnitude threshold may be determined based on an average of the magnitudes of a number of samples. In some embodiments, the predetermined event trigger magnitude threshold may be an average of the magnitudes of the samples multiplied by a scale factor number. The predetermined event trigger magnitude threshold may be determined from a predetermined number of samples. The predetermined number of samples may be between 30 and 2000 for instance. In some embodiments, the predetermined number of samples may be about 1000 samples.

In some embodiments, processor 1484 automatically and periodically recalculates the predetermined event trigger magnitude threshold after a recalibration period of time. The recalibration period may be between 1 hour and 10 hours. In some embodiments, the recalibration period is about 3 hours or 4 hours.

In some embodiments, the samples in the moving average filter window which yielded a magnitude greater than the predetermined event trigger magnitude threshold, as well as the corresponding samples from geophones 1035 and 1037 which were sampled at the same time, are placed into the event buffer 2044 before subsequent new samples from geophones 1033, 1035 and 1037. In some embodiments, processor 1484 continues to sample the geophones 1033, 1035, and 1037 and place the samples into the event buffer 2044 at step 1528. Processor 1484 may stop step 1528 when a parameter based on a sample of geophone 1033 is below a predetermined threshold. In some embodiments, processor 1484 stops step 1528 when the average of multiple samples of geophone 1033 is below a second predetermined threshold, which may be called a predetermined event end magnitude threshold. In some embodiments, processor 1484 stops step 1528 when a predetermined event duration, such as a minimum event sampling period, has elapsed since sampling into the event buffer begins at step 1528. In some embodiments, the predetermined event duration is between 0.1 and 20 seconds. In some embodiments, the predetermined event duration is between 0.1 and 0.5 seconds, or 1 to 3 seconds, or 5 to 8 seconds. In some embodiments, the predetermined event duration is about 0.3 seconds. In some embodiments, a shorter predetermined event duration is chosen to filter out relatively weaker vibrations, which are likely to occur later than relatively stronger vibrations after commencement of a seismic event, and to reduce utilization of resources for data transmission and storage. In some embodiments, when processor 1484 stops sampling geophones into event buffer 2044 at conclusion of step 1528, processor 1484 continues to sample geophones 1033, 1035, and 1037 at step 1520 in the sample buffer 2042, as it contemporaneously carries out steps 1552 and step 1554 on the captured data in the event buffer 2044.

In some embodiments, once processor 1484 stops step 1528, processor 1484 then records the event trigger time at step 1552. The event trigger time may be a global time when the event was triggered. In some embodiments, the event trigger time is a global Unix time. In some embodiments, the event trigger time at step 1552 may be contemporaneously recorded at the commencement of step 1528, during step 1528, or during step 1526.

Figure 17:
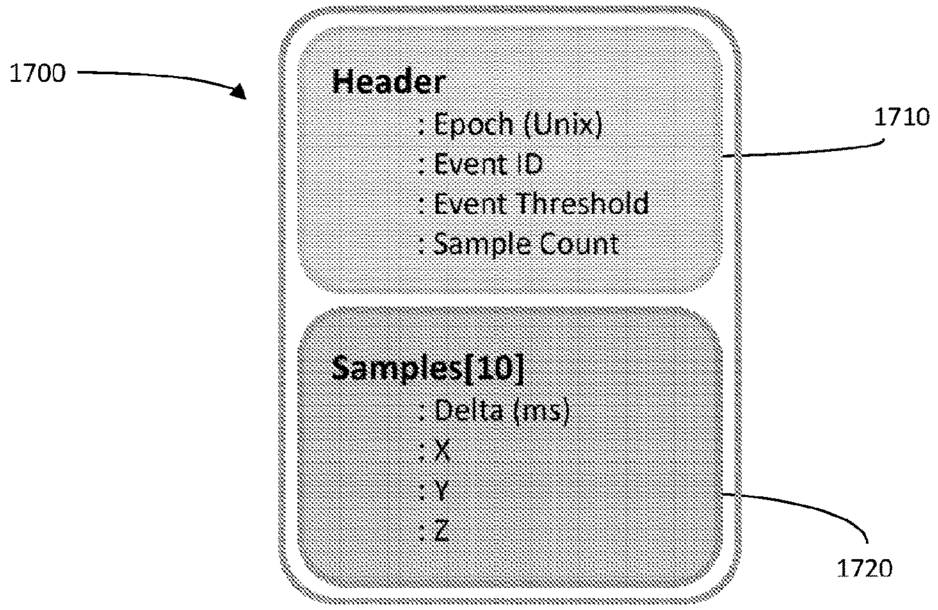
FIG. 17 shows an example LPWAN payload structure 1700 used by processor 1484 according to some embodiments.

In some embodiments, after step 1528 or step 1552, wherein the sampling into event buffer 2044 and recordal of event trigger time has concluded, processor 1484 then batch processes the data in event buffer into LPWAN payloads at step 1554. In some embodiments, the LPWAN payloads may be LoRaWAN payloads 1700 as shown in FIG. 17. At step 1554, processor 1484 places a payload amount of samples into each LoRaWAN payload. In some embodiments, the payload amount of samples is ten samples of each of geophones 1033, 1035, and 1037 sampled at the same time. In some embodiments, processor 1484 also includes samples of accelerometer 1950 from the event buffer. In some embodiments, processor 1484 also includes samples of magnetometer 1960 from the event buffer. In some embodiments, the addition of samples from the accelerometer 1950 and/or magnetometer 1960 reduces the payload amount of samples. In some embodiments, if the event buffer has remaining samples in the event buffer, processor 1484 may repeat step 1554.

FIG. 17 shows a LoRaWAN payload structure 1700 used by processor 1484 according to some embodiments. In some embodiments, processor 1484 processes the LoRaWAN payload 1700 with a payload header 1710 which comprises an epoch field, an event ID field, a threshold field and a sample count field. The epoch field may be the event trigger time recorded at step 1552. The event ID may comprise a number determined based on an event trigger time, or a sequence number which is incremented at event trigger times, or a pseudorandom number. In some embodiments, the event ID may be used by gateway device 120 to differentiate events from a multiplicity of received LoRaWAN payloads. The threshold field is the predetermined magnitude threshold number. The sample count field may be the number of samples sampled into the event buffer at the conclusion of step 1528 and/or the payload amount of samples.

In some embodiments, processor 1484 processes the LoRaWAN payload 1700 with a LoRaWAN payload of samples 1720 which comprises a number of data fields. Samples 1720 comprises one or more delta milliseconds fields (as an indicator of time from a start of the epoch, set as time 0 as shown in FIG. 34), optionally time fields, x fields (for x-axis samples), y fields (for y-axis samples), or z fields (for z-axis samples). In some embodiments, x fields, y fields and z fields are sampled event data from sample buffer 2042 representing measurements of geophones 1037, 1035, and 1033 measured at the same sample time respectively. In some other embodiments, accelerometer data from the event buffer representing measurements from accelerometer 1950 is also placed in the payload samples 1720. In some embodiments, the delta milliseconds field is a difference in time from the sampled measurement of a given entry of x field, y field and z field samples relative to the event trigger time. In some embodiments, entries in the delta milliseconds field may be positive (for example in the case of sampling after the event trigger time) or negative (for example the sampling of the moving average filter window which determined commencement of step 1528 before the event trigger time). In some embodiments, time fields comprise the global time that the given entry of x field, y field and z field samples was measured. In some embodiments, there are ten entries of each field, wherein each entry comprises a delta milliseconds field, time field, x field, y field, and a z field representing samples or time data relating to the sample at a point in time.

At step 1530, of FIG. 15, processor 1484 checks LoRaWAN queue 2046. The LoRaWAN queue 2046 is stored in volatile memory of the data acquisition unit 110. In some embodiments, step 1530 is executed concurrently to other steps of method 1500, or between execution of sequential steps of method 1500. If the processor 1484 determines that the queue is not empty at 1532 from the check at step 1530, the processor 1484 then transmits the oldest payload at step 1534. Processor 1484 may transmit the oldest payload via LPWAN wire 1482 and LPWAN antenna 280 to gateway device 120. In some embodiments, the LoRaWAN payload (i.e. packets containing a seismic data payload from data acquisition unit 110) may be forwarded to server 150 or client device 160 to process the payload.

At step 1540, of FIG. 15, processor 1484 checks the GNSS module 1494. In some embodiments, step 1540 is executed concurrently to other steps of method 1500, or between execution of sequential steps of method 1500. In some embodiments, the processor 1484 periodically initiates synchronization. For example, processor 1484 may initiate synchronization every 15 minutes. The processor 1484 checks the GNSS module 1494 to synchronize the on-board clock (RTC) of the data acquisition unit 110. This is done by extracting the time from the GNSS module 1494, which automatically gets downlink updates from available GNSS satellites. If the processor 1484 determines that the GNSS module 1494 and processor 1484 are ready to synchronize at 1542 from the check at step 1540, the processor 1484 then synchronizes with the GNSS module 1494 at step 1544. In some embodiments, the processor 1484 determines that the GNSS module 1494 and processor 1484 are not ready to synchronize, and the processor 1484 does not synchronize clock 1544. In some embodiments, processor 1484 determines GNSS module 1494 and processor 1484 are ready or not ready to synchronize based on measurements or determinations of their respective clocks and a predetermined time difference threshold.

Figure 16:
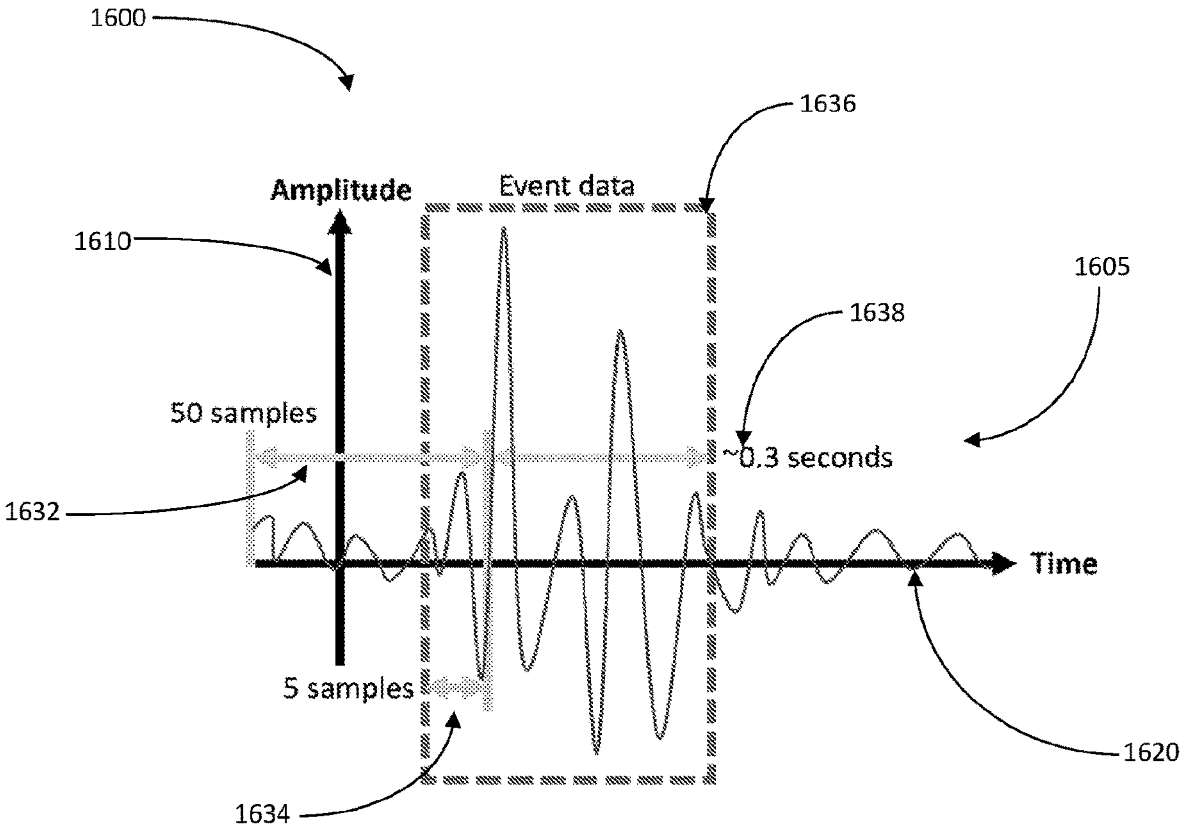
FIG. 16 shows a timing diagram of data acquisition method 1500 according to some embodiments.
Figure 33:
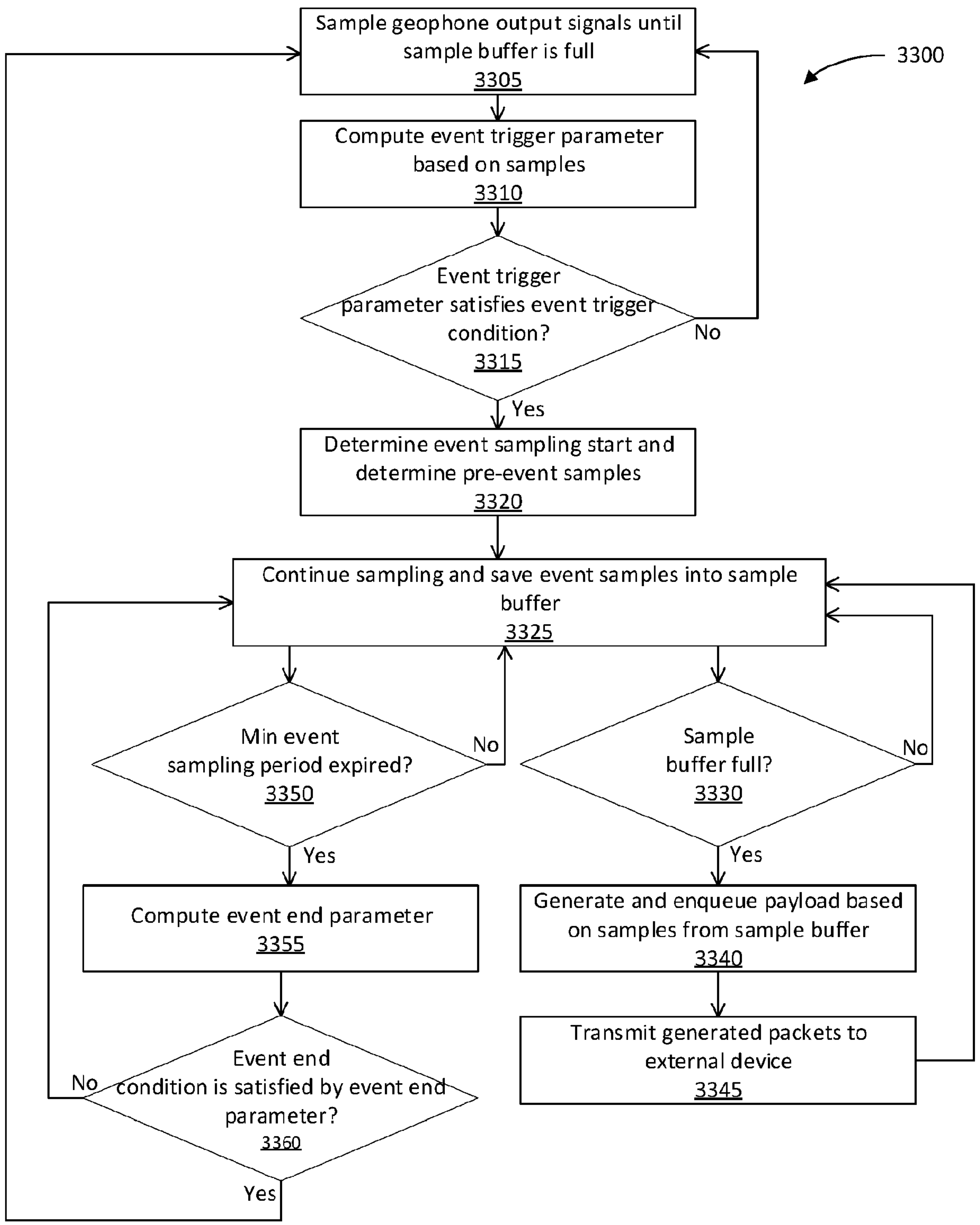
FIG. 33 is a flowchart of a method of processor operation for seismic event detection.

FIG. 16 shows a schematic timing diagram of data acquisition method 1500, and FIG. 33 shows an alternative flow diagram of data acquisition method 1500 according to some embodiments. In some embodiments, an output signal 1605, measured by a geophone 1033, is processed by processor 1484. Output signal 1605 and samples of output signal 1605 may be characterized by amplitude 1610 and time of measurement 1620. Quantifying time of measurement of a sample of output signal 1605 may be a relative determination to the time of measurement of one or more other samples of output signal 1605. Processor 1484 may store data from output signal 1605 in sample buffer 2042. The sample buffer timing window 1632 is shown in FIG. 16.

In some embodiments, and as shown in FIG. 16, there are a predetermined number of samples (e.g., 50 samples) within the sample buffer timing window 1632, the samples of which are stored in, and fill up completely, the sample buffer 2042.

The sample buffer 2042 may store up to the predetermined number of samples. The sample buffer 2042 may store up to 20 to 100 samples from each geophone. The sample buffer 2042 may store 25 to 55 samples, 40 to 65 samples, 50 to 80 samples, or 70 to 100 samples from each geophone, for example. The sample buffer 2042 may store 20, 25, 30, 35, 40, 45, 50, 55, 60, 65, 70, 75, 80, 85, 90, 95, or 100 samples from each geophone, for example. The buffer size of sample buffer 2042 is fixed and selected according to a desired sample buffer processing capacity.

FIG. 33 illustrates an example flow chart of a method 3300 of seismic event data acquisition according to some embodiments. Method 3300 is a continuous method automatically performed by the data acquisition unit 110 while it operates normally after installation. At step 3305 of method 3300, processor 1484 samples each geophones' output signal until sample buffer 2042 is full. For example, the sample buffer 2042 may be full after 50 samples are collected from each geophone.

At step 3310 of method 3300, once the sample buffer 2042 is full, processor 1484 computes an event trigger parameter based on at least some of the samples in the sample buffer 2042 at step 3310. In some embodiments, the event trigger parameter is determined based on an average moving filter window 1634. In some embodiments, a predetermined number of the most recent samples is placed in the average moving filter window 1634. The predetermined number of the most recent samples may be 3, 4, 5, 6, 7, 8, 9, or 10 samples, for example. In some embodiments, the last 5 samples are placed in the average moving filter window 1634. Processor 1484 may determine the average of the magnitude of each sample value in the moving average filter window 1634 is the event trigger parameter. In some other embodiments, processor 1484 may determine the event trigger parameter using another function, such as determining an increasing amplitude gradient of the samples in the average moving filter window 1634. In some embodiments, the event trigger parameter may be determined based on multiple separate functions applied to the samples, and/or multiple separate event trigger parameters may be calculated based on multiple different functions applied to one or multiple sets of samples. For example, the event trigger parameter may be determined based on a first function (e.g. magnitude averaging) applied to a first set of samples and on a second function (e.g. maximum amplitude difference or minimum signal-to-noise ratio) applied to a second set of samples that may be the same as or different from the first set.

At step 3315 as shown in FIG. 33, after the event trigger parameter is computed based on the samples, processor 1484 determines whether the event trigger parameter satisfies an event trigger condition. The event trigger condition may be based on a logical operator, for example processor 1484 may determine whether the event trigger parameter has a greater magnitude than a predetermined number. If processor 1484 determines that the event trigger condition is not satisfied at step 3315, processor 1484 will discard the contents of sample buffer 2042 and will fill sample buffer 2042 again with geophone output signals to refill the sample buffer 2042 until the sample buffer is full at step 3305.

If the processor 1484 determines that the event trigger condition is satisfied at step 3315, processor 1484 will determine event sampling start and determine pre-event samples at step 3320 (i.e. samples between −n+x and 0, as shown in FIG. 34). The pre-event samples in the sample buffer 2042 may include useful information about conditions prior to the start of the seismic event being determined. The determined event sampling start may be the time of the oldest sample in the moving average filter window 1634. In some other embodiments, the determined event sampling start may be the time of the most recent sample in the moving average filter window 1634. The determined pre-event samples may be the samples in the full sample buffer 2042 which are not in the moving average filter window 1634. In some embodiments, processor 1484 will generate and enqueue payloads based on the determined pre-event samples and the moving average filter window 1634 samples. Processor 1484 will then send the payloads containing the pre-event samples and the moving average filter window 1634 samples to an external device, such as gateway device 120 via data communications unit 2020.

Processor 1484 then will check for two conditions while sampling after determining a seismic event. Processor 1484 will check whether the sample buffer 2042 is full, at step 3330 in FIG. 33. If processor 1484 determines that the sample buffer 2042 is not full, processor 1484 will continue sampling and save event samples into the sample buffer 2042, at step 3325. If processor 1484 determines that the sample buffer 2042 is full, processor 1484 will generate and enqueue one or more payloads based on samples from the sample buffer 2042, at step 3340, as shown in FIG. 33. Processor 1484 may then transmit the generated payloads in packets to an external device, such as gateway 120, for example, at step 3345, as shown in FIG. 33. Processor 1484 may then continue sampling and save the event samples into sample buffer 2042 at step 3325.

Contemporaneously to step 3330, processor may determine whether a minimum event sampling period 1638 has expired. The minimum event sampling period 1638 may be referred to as time constraint 1638. The minimum event sampling period 1638 may be about 0.2 seconds to 1.0 seconds. The minimum event sampling period may be about 0.2 to 0.5 seconds, 0.4 to 0.7 seconds, or 0.7 to 1.0 seconds, for example. The minimum event sampling period may be about 0.2, 0.25, 0.3, 0.35, or 0.4 seconds, for example.

If processor 1484 determines that the minimum event sampling period 1638 has not expired, processor 1484 continues sampling and saving event samples into sample buffer 3325.

If processor 1484 determines that the minimum event sampling period 1638 has expired, processor 1484 may then compute event end parameter, at step 3355 as shown in FIG. 33. The event end parameter may be determined based on a similar determination to the event trigger parameter, such as the average moving filter window 1634. Processor 1484 may determine the average of the magnitude of each sample value in the moving average filter window 1634 as the event trigger parameter, for example. In some other embodiments, processor 1484 may determine a different function of the samples contained in the moving average filter window 1634 is the event trigger parameter, such as an average gradient of the samples contained in the moving average filter window 1634. The samples in the moving average filter window 1634 may be a predetermined number y (as shown in FIG. 34) of the most recent samples from the sample buffer 2042. The predetermined number of the most recent samples may be 3, 4, 5, 6, 7, 8, 9, or 10 samples, for example. In some embodiments, the predetermined number of the most recent samples is 5 of the most recent samples in the sample buffer 2042.

The number of samples y for determining the event end condition may be a different number from the number of samples x used for determining the event trigger condition, or they may be the same number. In some embodiments, the event end parameter may be determined based on multiple separate functions applied to the samples, and/or multiple separate event end parameters may be calculated based on multiple different functions applied to one or multiple sets of samples. For example, the event end parameter may be determined based on a first function (e.g. magnitude averaging) applied to a first set of samples and on a second function (e.g. maximum amplitude difference) applied to a second set of samples that may be the same as or different from the first set.

Processor 1484 may then determine whether the event end condition is satisfied by the computed event end parameter, at step 3360, as shown in FIG. 33. The event end condition may be based on a logical operator, for example processor 1484 may determine whether the event end parameter has a greater magnitude than a predetermined number, or is greater than a predetermined number. If the processor 1484 determines event end condition is not satisfied at step 3360, processor 1484 may then continue sampling for a further period that is equal to (or within an order of magnitude of) the minimum sampling period. Processor 1484 saves the event samples from the continued sampling into sample buffer at step 3325. If the processor 1484 determines the event end condition is satisfied at step 3360, processor 1484 may then again sample geophone output signals until the sample buffer is full at step 3305 and repeat the process of seismic event detection. As shown in FIG. 34, for a detected seismic event, the captured seismic event data will typically be a multiple (e.g. 2, 3 or more) of the buffer size n, plus a fraction of the buffer that includes the moving window of size y. All of the captured seismic event data is formatted into payload data and added into packets (with a separate header, such as a LoRa header) to be sent to the gateway device 120.

In some embodiments, the sampling buffer 2042, after determining an event sampling start at step 3320 and then commencing step 3325, may be referred to as the event buffer. In some other embodiments, processor will use event buffer 2044 to carry out step 3325 and its subsequent steps during event capture. In some embodiments, if the magnitude of the average of the sample values in the moving average filter window is greater than a predetermined magnitude threshold, processor 1484 begins to place samples into an event buffer of processor 1484. Processor 1484 continues to place samples into event buffer for a duration that is shown by event measurement window 1636 until a time constraint 1638 has lapsed. The time constraint is a fixed time period starting from when the magnitude threshold was determined by processor 1484 to have been met or exceeded. In some embodiments, time constraint 1636 is about 0.3 seconds. In some embodiments, the time constraint is a number between 0.2 to 1 second. In some other embodiments, the time constraint is another number within an order of magnitude of 0.3 seconds. In some other embodiments, processor 1484 continues to place samples into event buffer until a data point (magnitude of a measured sample) is below a predetermined noise threshold level. In some other embodiments, processor 1484 will continue to place all the samples which are measured in the event measurement window 1636 into the event buffer, and then upon a determination that a second moving average filter window requirement is met, processor 1484 will determine that the seismic event has ended, but will continue to place samples into the event buffer in order to determine the next seismic event. In some other embodiments, processor 1484 determines a calculated noise threshold level, instead of a predetermined noise threshold level, based on measured samples from geophone 1033 and uses the calculated noise threshold level to compare with sample data in the event buffer to determine when to stop sampling into the event buffer.

Figure 18C:
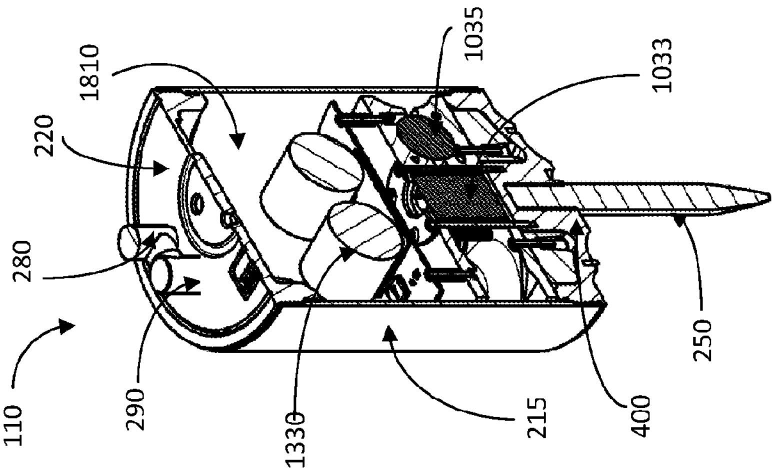
FIG. 18 shows components of the seismic data acquisition unit 110 according to some embodiments.
Figure 18B:
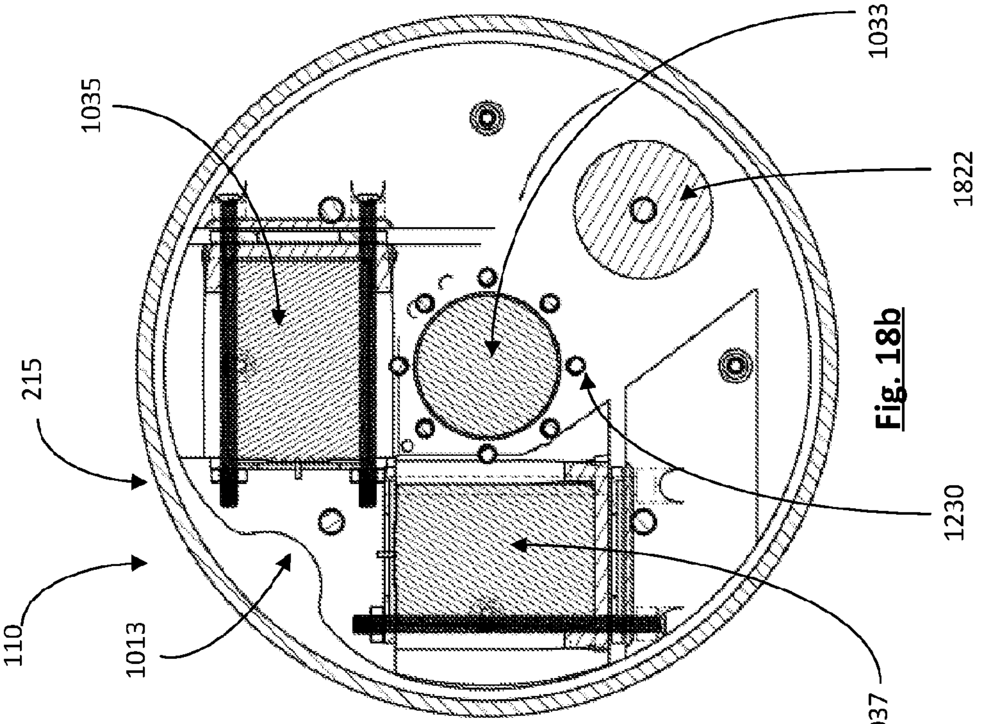
Figure 18A:
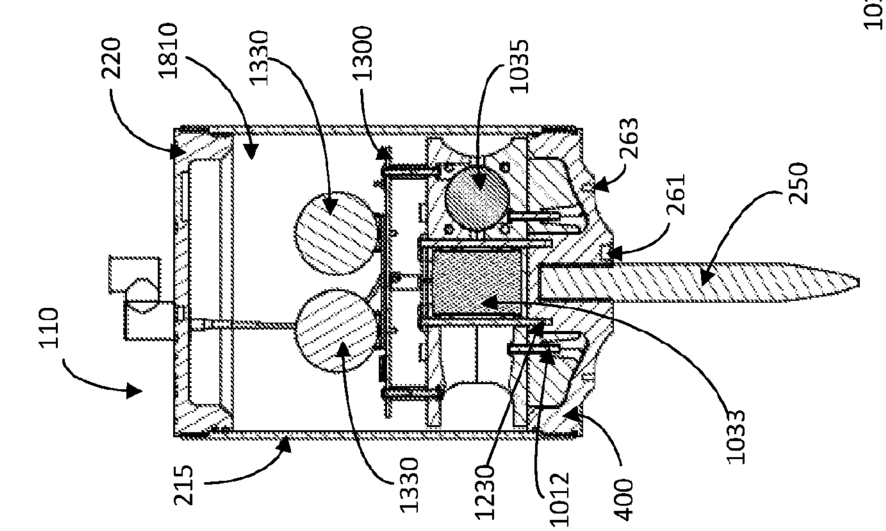

FIG. 18*a* shows a cross sectional view of data acquisition unit 110 according to some embodiments. FIG. 18*a* shows at least enclosure 215, top part 220, bottom part 400, sensing probe 250, bottom part recess holes 261, secondary projection recesses 263, printed circuit board 1300, power source 1330, fasteners 1230, and geophones 1033 and 1035. Power source 1330 may include one or multiple power source components, such as batteries, for example. FIG. 18*a* and FIG. 18*c* also show that there is a an unoccupied headspace 1810 immediately in between the lower face of the top part 220 and the at least one power source 1330 (i.e. batteries). The headspace 1810 is free of internal components of the data acquisition unit 110, except that signal conductors pass through the headspace 1810 between the antenna connectors 1490, 1480 and the GNSS unit 1494 and LPWAN unit 2020. The headspace 1810 being free of internal components allows ready access to the power supply once the top part 220 has been removed, in order to readily allow power source 1330 to be accessed and inspected or replaced, whether in the field or when servicing the data acquisition prior to deployment or re-deployment in the field.

FIG. 18*b* shows a cross sectional view (looking upwards from a plane through the geophones) of data acquisition unit 110 according to some embodiments. FIG. 18*b* shows at least enclosure 215, fasteners 1230, and geophones 1033, 1035, and 1037. FIG. 18*b* also shows a lower part of an upper stabilizing portion 1822 (also see FIG. 32) that extends downward from a base plate portion of the top clamping part 1010. The upper stabilizing portion 1822 connects with and mates with a lower stabilizing portion 1823 (FIG. 32) to connect and stabilize the top and bottom clamping parts 1010, 1020. The lower stabilizing portion 1823 and the upper stabilizing portion 1822 are positioned on an opposite side of the geophone assembly to the x-axis and y-axis geophones 1035, 1037. The lower stabilizing portion 1823 and the upper stabilizing portion 1822 connect to form a stabilizing column for assisting in stable compression of the top and bottom clamping parts 1010, 1020 and in at least partly balancing out the mass of the geophones on the opposite side of the geophone assembly 1030. The lower stabilizing portion 1823 and the upper stabilizing portion 1822 are also positioned on an opposite side of the geophone assembly 1030 from the circumferential recess 1013 in an upper plate section of the top clamping part 1010. The absence of material in the circumferential recess 1013 may also serve to assist in balancing weight in the geophone assembly 1030, since the geophones may tend to bear more weight on the side of the geophone assembly that has the circumferential recess 1013.

FIG. 18*c* shows view exposing a cross section of data acquisition unit 110 according to some embodiments. FIG. 18*c* shows at least enclosure 215, top part 220, bottom part 400, sensing probe 250, printed circuit board 1300, power source 1330, fasteners 1230, and geophones 1033 and 1035.

FIGS. 21*a*, 21*b*, 22*a*, 22*b*, 23*a*, and 23*b* show a seismic data acquisition unit 110 according to some embodiments.

The seismic data acquisition unit 110 shown in FIGS. 21*a*, 21*b*, 22*a*, 22*b*, 23*a*, and 23*b* is identical or quite similar to the embodiments shown and described in relation to FIGS. 1 to 20, except for a modified top part 220 and some variation to parts of the internal component assembly 1357.

Figure 21B:
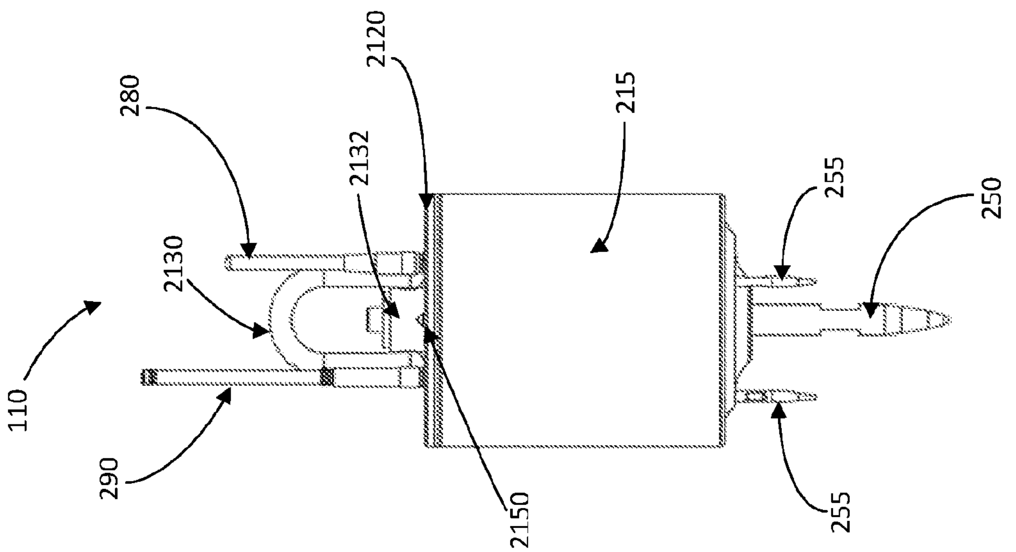
FIG. 21*b* shows a side elevation view of the seismic data acquisition unit according to some other embodiments.
Figure 21A:
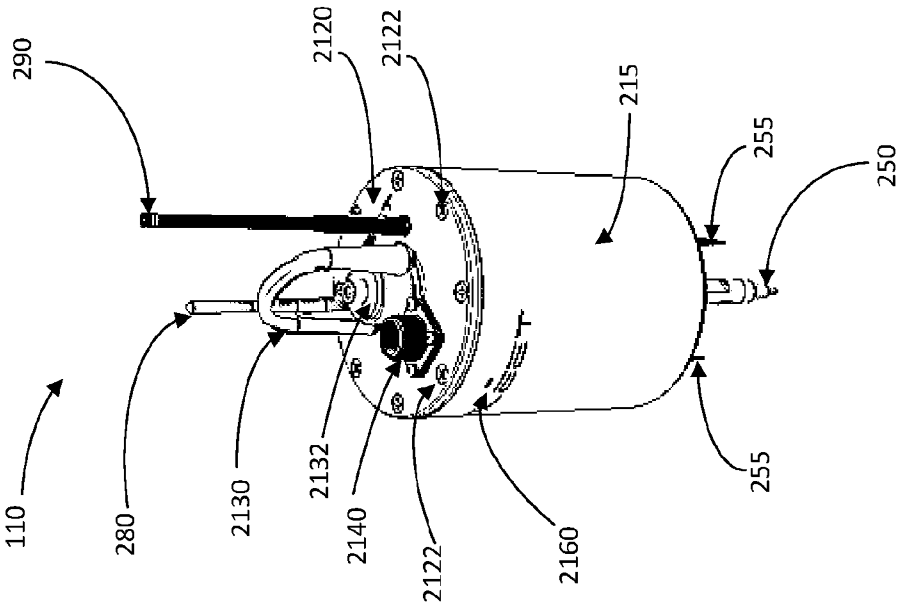
FIG. 21*a* shows a perspective view of a seismic data acquisition unit according to some other embodiments.

According to some embodiments, the seismic data acquisition unit 110 shown in FIGS. 21*a*, 21*b*, 22*a*, 22*b*, 23*a*, and 23*b* may be sealed with a fixed top cover 2120. The fixed top cover 2120 may receive fixed top cover screws 2122 to seal with the enclosure 215 as shown in FIGS. 21*a*, 22*a*, 23*a*, and 23*b*. Each screw in the fixed top cover screws 2122 may be equally spaced from one another, in an annular formation, near the edge of the fixed top cover 2120, as shown in FIG. 21*a*. There may be 4, 5, 6, 7, 8, 9, 10, 11, or 12 fixed top cover screws 2122, for example. As shown in FIG. 21*a*, there may be 8 fixed top cover screws 2120.

Fixed top cover 2120 and/or top part 220 may have a top surface diameter of about 105 mm to 140 mm. Fixed top cover 2120 and/or top part 220 may have a top surface diameter of about 105 mm to 125 mm, 115 mm to 130 mm, or 120 mm to 135 mm, for example. Fixed top cover 2120 and/or top part 220 may have a top surface diameter of 120 mm, 121 mm, 122 mm, 123 mm, 124 mm, 125 mm, 126 mm, 127 mm, 128 mm, 129 mm, or 130 mm, for example.

Fixed top cover 2120 and/or top part 220 may have a bottom surface diameter of about 105 mm to 140 mm. Fixed top cover 2120 and/or top part 220 may have a bottom surface diameter of about 105 mm to 125 mm, 115 mm to 130 mm, or 120 mm to 135 mm, for example. Fixed top cover 2120 and/or top part 220 may have a bottom surface diameter of 118 mm, 119 mm, 120 mm, 121 mm, 122 mm, 123 mm, 124 mm, 125 mm, 126 mm, 127 mm, or 128 mm, for example.

Fixed top cover 2120 and/or top part 220 may have a height of about 21.5 to 26.5 mm. Fixed top cover and/or top part 220 may have a height of about 21 mm to 24 mm, 23 mm to 24.5 mm, or 23.5 mm to 25 mm. Fixed top cover and/or top part 220 may have a height of 23 mm, 23.5 mm, 24 mm, 24.5 mm, or 25 mm, for example.

Figure 22A:
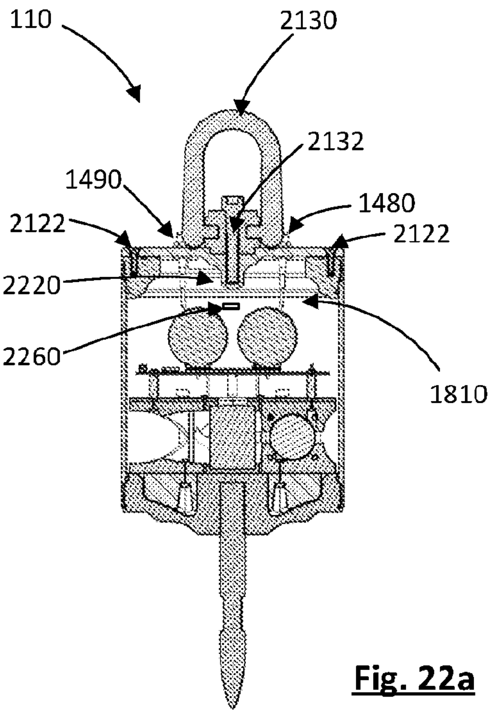
FIGS. 22*a* and 22*b* show vertical and horizontal cross-sectional views to illustrate positioning and arrangement of components of the seismic data acquisition unit according to some other embodiments.

As shown in FIG. 22*a*, the fixed top cover screws 2122 may also be received by an annular portion 2220. The annular portion 2220 may receive the fixed top cover screws, whilst underneath the fixed top cover 2120. The annular portion 2220 may contain fixed top cover screw recesses 2522 to receive the fixed top cover screws 2122. The fixed top cover screw recesses 2522 may have a recess depth within the annular portion 2220 that does not pierce through the underside of the annular portion 2220, so that when the fixed top cover screws 2122 are received by the fixed top cover screw recesses 2522, there is no water or soil ingress into the seismic data acquisition unit 110.

The annular portion 2220 may be made from aluminum. The annular portion 2220 may be ring shaped. The annular portion 2220 may also be referred to as a shelf, an annular shelf, a ring, or an aluminum ring, for example. Housing 205 may comprise annular portion 2220. The annular portion 2220 is male-threaded and serves to engage and seal with an upper internal rim of the enclosure 215 and to act as an anchor to secure the top cover 2120.

Annular portion 2220 may have a top surface diameter of about 105 mm to 140 mm. Annular portion 2220 may have a top surface diameter of about 105 mm to 125 mm, 115 mm to 130 mm, or 120 mm to 135 mm, for example. Annular portion 2220 may have a top surface diameter of 120 mm, 121 mm, 122 mm, 123 mm, 124 mm, 125 mm, 126 mm, 127 mm, 128 mm, 129 mm, or 130 mm, for example.

Annular portion 2220 may have a bottom surface diameter of about 105 mm to 140 mm. Annular portion 2220 may have a bottom surface diameter of about 105 mm to 125 mm, 115 mm to 130 mm, or 120 mm to 135 mm, for example. Annular portion 2220 may have a bottom surface diameter of 115 mm, 116 mm, 117 mm, 118 mm, 119 mm, 120 mm, 121 mm, 122 mm, 123 mm, or 124 mm, for example.

Figure 25B:
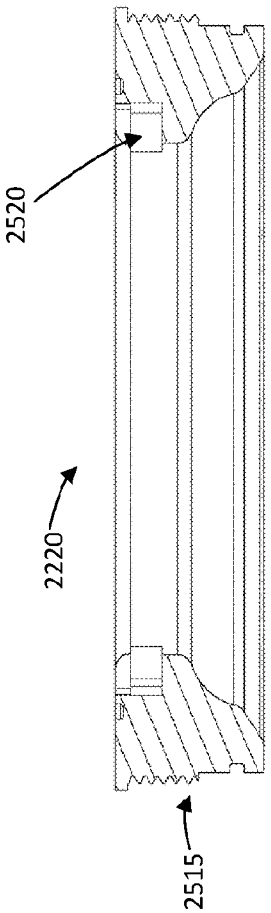
FIGS. 25*a* and 25*b* show an annular portion of a top part of the seismic data acquisition unit according to some other embodiments.
Figure 25A:
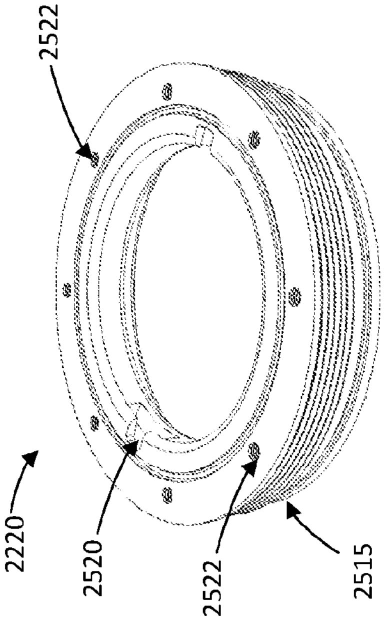

As shown in FIGS. 25*a* and 25*b*, annular portion 2220 may also comprise annular connection recesses 2515. Annular connection recesses 2515 may comprise grooves for attaching and/or sealing the annular portion 2220 to the upper interior of the enclosure 215. The upper interior of the enclosure 215 may also be suitably shaped to allow attachment of the annular portion 2220. The annular connection recesses 2515 may also comprise slots for one or more o-rings, which may assist in sealing the annular portion 2220 to the upper interior of the enclosure 215 and assist in mitigating or preventing water ingress to an interior chamber of the seismic data acquisition unit 110.

Figure 23A:
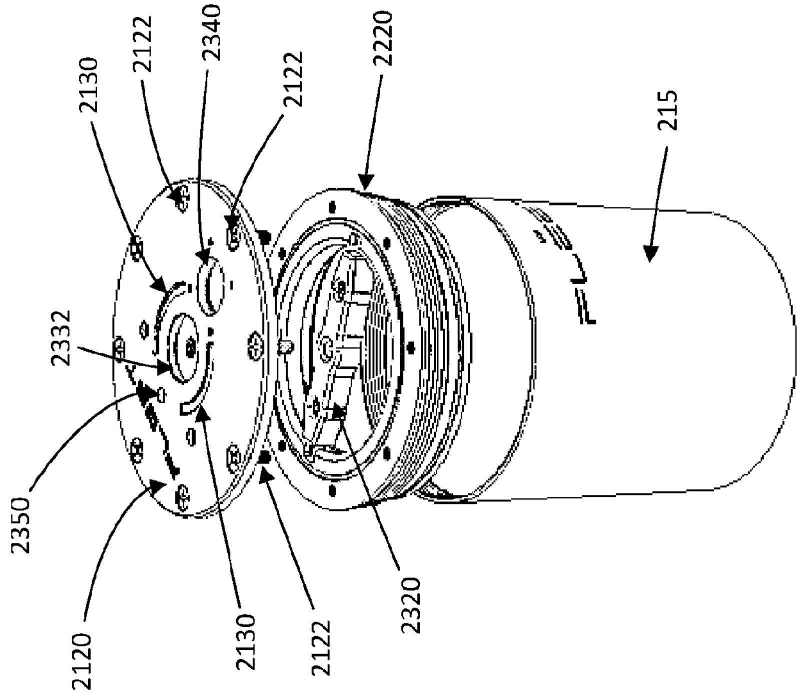
FIGS. 23*a* and 23*b* show external top perspective exploded and assembled views of a housing of the seismic data acquisition unit according to some other embodiments.

The annular portion 2220 may also comprise fastener tool recesses 2520, as shown in FIGS. 25*a* and 25*b*. The fastener tool recesses 2520 may comprise two or more recesses or engagement formations. The fastener tool recesses 2520 may comprise two diametrically opposed recesses within the interior surface of the annular portion 2220. The fastener tool recesses 2520 may receive opposite ends of a fastener tool piece 2320, as shown in FIG. 23*a*. The fastener tool piece 2320 can then be gripped, engaged with fastener tool recesses 2520, and rotated to drive engagement of the outer surface of the annular portion 2220 into the grooves of the upper interior of the enclosure 215. After fastening the annular portion 2220, the fastener tool piece 2320 may be removed before sealing the fixed top cover 2120. In some other embodiments, the fastener tool piece 2320 may not be removed before sealing the fixed top cover 2120 and remain within the seismic data acquisition unit 110 after sealing the fixed top cover 2120. The fastener tool piece 2320 may comprise aluminum.

According to some embodiments, the seismic data acquisition unit may comprise a serial connector 2140, such as a mil-spec (military specification) connector. The serial connector 2140 may be fitted to the fixed top cover 2120. The serial connector 2140 may be circular. The serial connector 2140 may allow power exchange between power source 1330 and other devices external to seismic data acquisition unit 110, such as with a one or more external temperature sensor devices, power sources, or measurement devices, for example. The serial connector may allow output of 3.3V of power to other devices external to seismic data acquisition unit 110, for example.

The serial connector 2140 may allow data transfer between the processor 1484 and other external devices, such as the one or more external temperature sensor devices, power sources, measurement devices, laptops, or other configuration devices, for example.

The serial connector 2140 may allow data connections with other external devices, via the terminal module 1970 and/or USB programmer/debugger unit 1940, to the processor 1484. Other external devices may be able to transfer data to the processor 1484 via the serial connector 2140. The processor 1484 may subsequently process the data received via serial connector 2140 in a new form, and/or create a data payload from the data received and/or processed, and may transmit the data payload to the external gateway device 120 (separately from seismic event data payloads).

According to some embodiments, enclosure 215 may comprise an external orientation indication 2160, as shown in FIG. 21*a*. Orientation indication 2160 may be an external indentation, protrusion, or marking on the outer surface of enclosure 215, for example.

According to some embodiments, enclosure 215 may comprise an internal orientation indication 2260, as shown in FIG. 22*a*.

External orientation indication 2160 and internal orientation indications 2260 may assist an installer of seismic data acquisition unit at a site to cardinally orientate the seismic data acquisition unit 110 and its internal components, such as component assembly 1357, including geophone assembly 1030. In some embodiments, internal components, such as the screw 1012 between the x and y geophones 1035 and 1037, may be used as an internal reference indication for assisting in cardinally orienting the seismic data acquisition unit 110 and its internal components.

In some embodiments, the seismic data acquisition unit 110 may also comprise an LED indicator 2150. LED indicator 2150 may be fitted on the top of the fixed top cover 2120. LED indicator 2150 may comprise one or more LEDs. LED indicator 2150 may be communicably coupled to the processor 1484. The processor 1484 may via an LED driver cause the LEDs to emit light colours and/or particular sequences of light emissions to indicate one of multiple statuses of the seismic data acquisition unit 110. For example, the LED indicator 2150 may indicate a power source 1330 charge level, a communication status of a connection of an external device via the serial connector 2140, an internal component operation failure indication, and/or a communication/operational status of the GNSS unit 1494 or the LPWAN unit 2020, for example.

In some embodiments the seismic data acquisition unit 110 may comprise an upper engagement portion 2130, which in one example includes a swivel handle, as shown in FIGS. 21*a*, 21*b*, and 22*a*. Engagement portion 2130 may also be referred to as a hoist ring, a loop portion or a hook portion. The engagement portion 2130 may be or include a tube formed with two parallel outwardly extending arms connected by a semi annular shape. The engagement portion 2130 may be attached to a central hub 2132 and be rotatable relative to the central hub 2132. The central hub 2132 and attached engagement portion 2130 may be fitted to a central point of the fixed top cover 2120.

The central hub 2132 may offer resistance and/or lock when the swivel handle 2130 is extended vertically. The central hub 2132 may resist extension to prevent extension beyond a vertical axis when the swivel handle is rotated towards the antennae 290 and 280. The engagement portion 2130 may extend to allow the seismic data acquisition unit 110 to be more easily gripped, carried, and/or transported.

The central hub 2132 may offer less resistance when rotating the engagement portion 2130 towards the serial connector 2140. The central hub 2130 may allow the engagement portion swivel handle 2130 to be rotated over to surround the serial connector 2140. The engagement portion 2130 may be rotated about a horizontal axis from an upward position to fold down compact to the fixed top cover 2120 to better allow for storage of the seismic data acquisition unit 110 than a unit with a fixed handle.

Figure 23B:
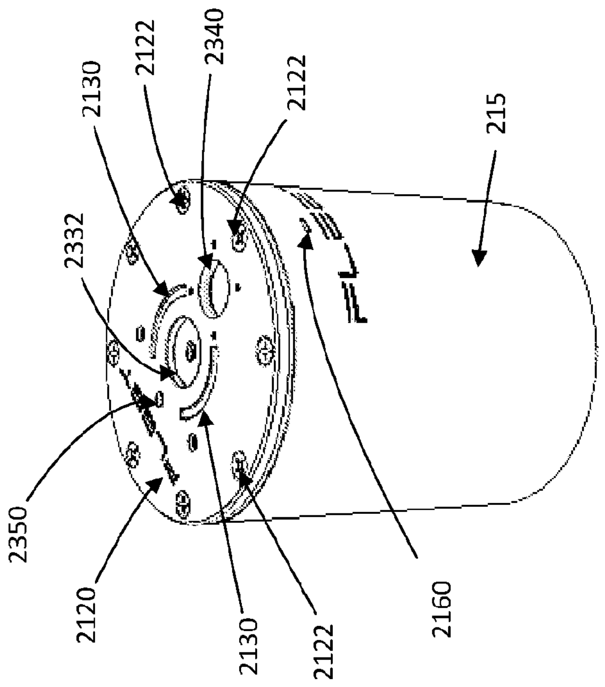

As shown in FIGS. 23*a*, and 23*b*, the fixed top cover 2120 may also comprise swivel grooves 2130. Swivel grooves 2130 may allow the engagement portion 2130 and the central hub 2132 to be twisted. Twisting the engagement portion 2130 may assist inserting or removing the seismic data acquisition unit 110 to or from an earth surface when installing/deploying the seismic data acquisition unit 110.

Figure 24:
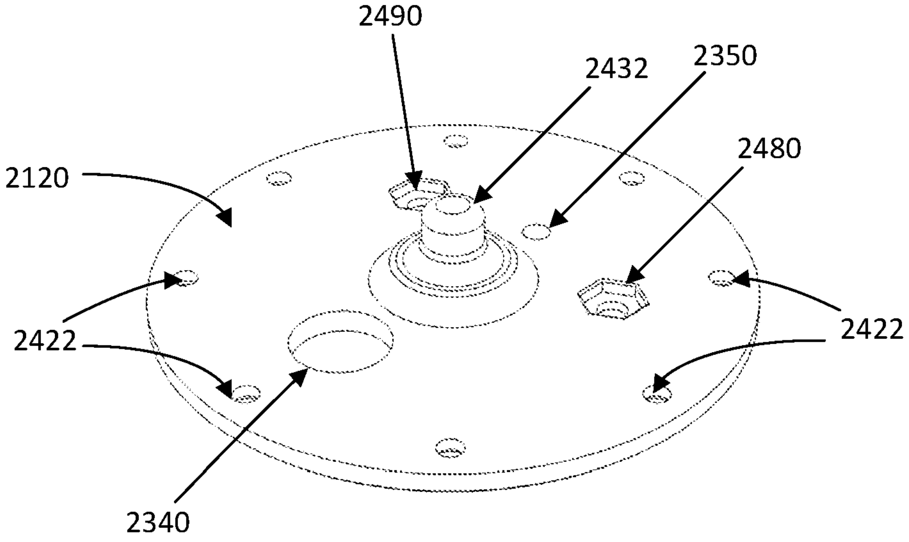
FIG. 24 shows an underside of a fixed top cover of the seismic data acquisition unit according to some other embodiments.

The fixed top cover 2120 may comprise a serial connector recess 2340 and LED indicator recess 2350, as shown in FIGS. 23*a*, 23*b*, and 24.

Figure 22B:
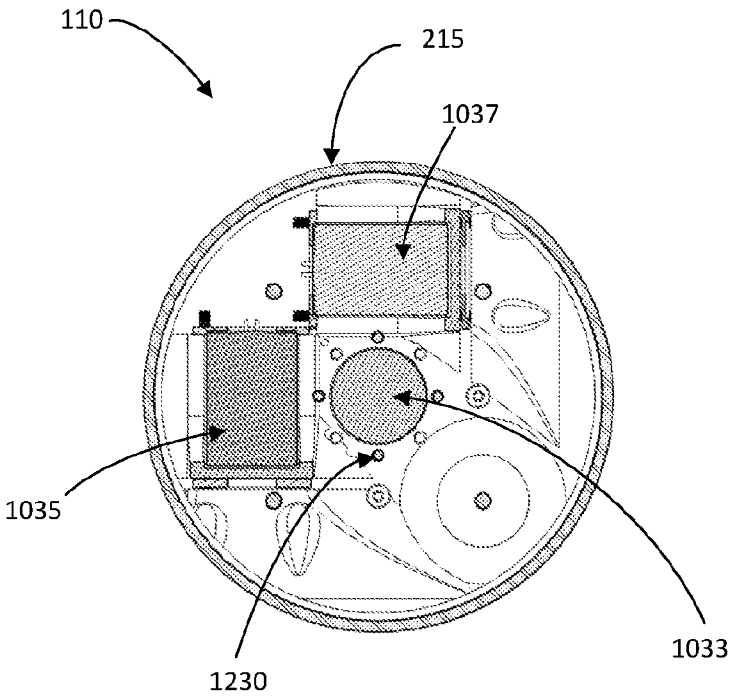

FIG. 22*b* shows at least enclosure 215, fasteners 1230, and geophones 1033, 1035, and 1037 and contours of the inner housing 1000.

FIG. 24 shows the underside of the fixed top cover 2120 according to some embodiments. The fixed top cover 2120 may comprise fixed top cover screw recesses 2422 for receiving fixed top cover screws 2122. The fixed top cover 2120 may comprise geolocation antenna recess 2490, and data communication (LPWAN) antenna recess 2480 for receiving antennae 290 and 280 respectively.

Figure 26:
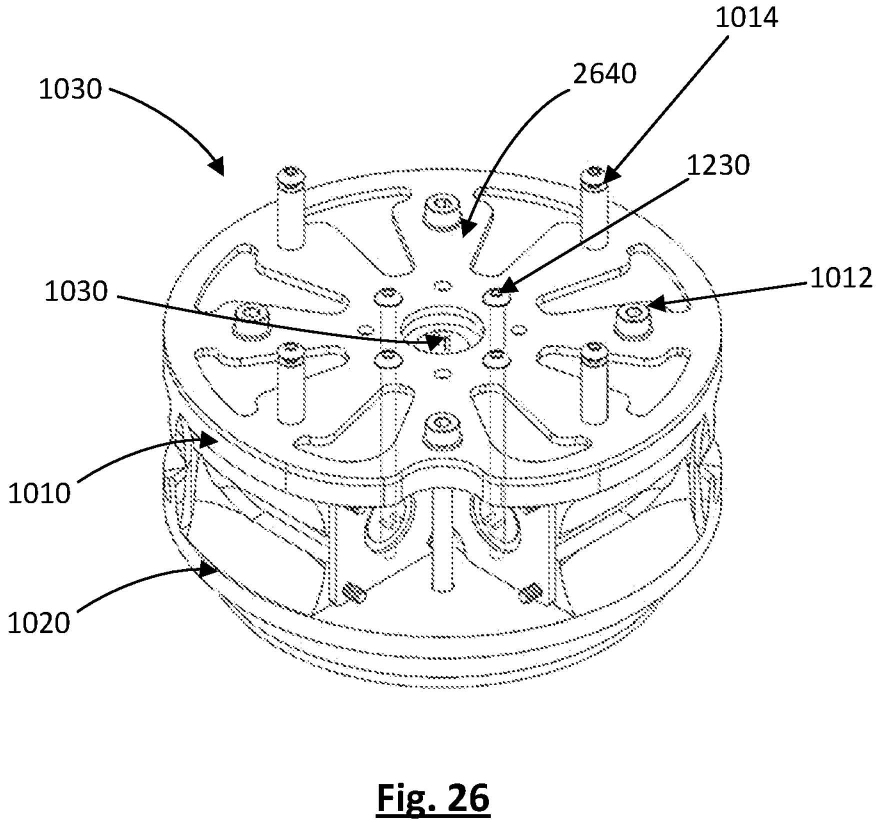
FIG. 26 shows an inner housing assembly of the seismic data acquisition unit according to some other embodiments.

FIG. 26 shows the inner housing 1000 according to some other embodiments. The inner housing 1000 may comprise a top clamping part plate 2640, rather than an annular plate 1240. Top clamping part plate 2640 may be fitted to top clamping part 1010. Top clamping part plate 2640 may extend to the edges of the top clamping part 1010. Top clamping part plate 2640 may have holes/indentations to reduce mass. Top clamping part plate 2640 may receive fasteners 1230. Top clamping part plate 2640 may also receive screws 1012 and spacers 1014. The spacers 1014 may receive fasteners as shown in FIG. 26 to assist in fixing the fasteners to top clamping part 1010, and in fixing the top clamping part 1010 to the bottom clamping part 1020. Such an arrangement may serve to better secure inner housing 1000 bearing geophones 1033, 1035, and 1037 to bottom part 400 and promote efficient mechanical transmission of vibrations from the probe 250 and housing 205 to the geophones 1033, 1035 and 1037. This may reduce or mitigate an effect of dampening of vibration sensing of the geophones 1033, 1035 and 1037 that can occur between parts that are more loosely coupled.

Figure 28:
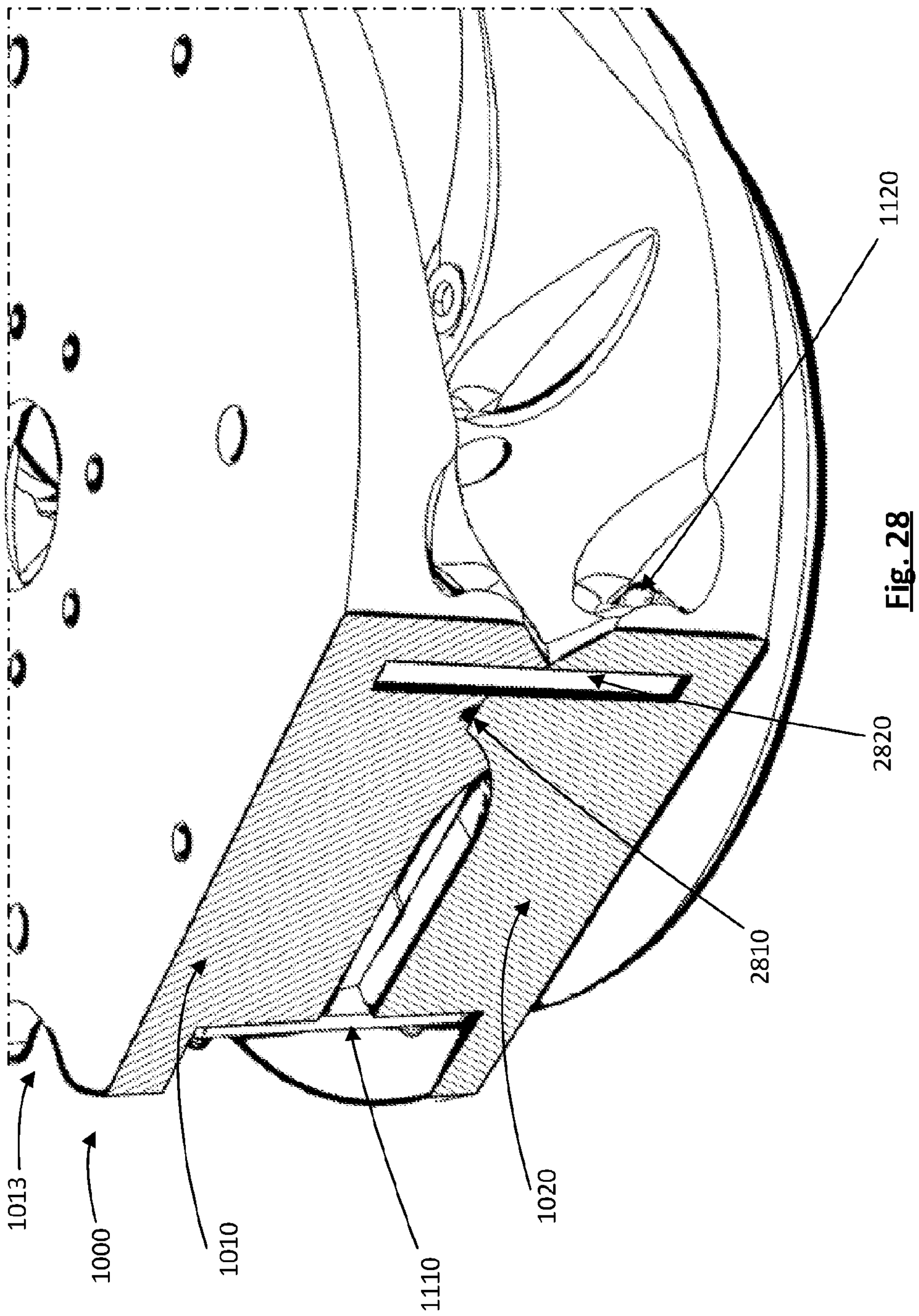
FIG. 28 shows a partial sectional perspective view of a section of the inner housing assembly of the seismic data acquisition unit according to some other embodiments.
Figure 31:
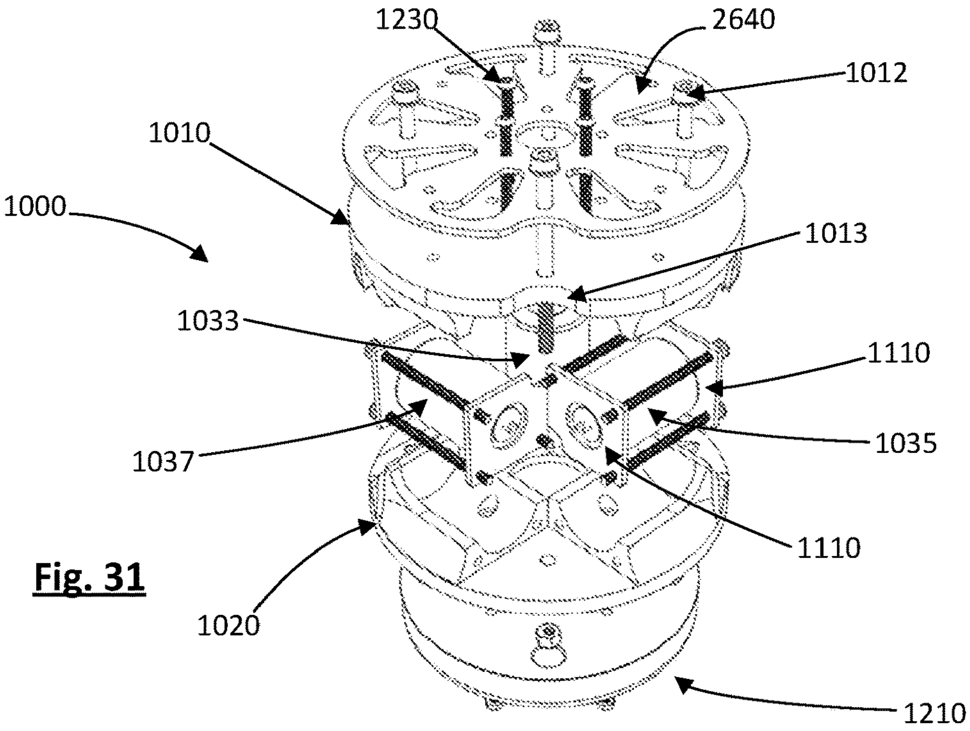
FIGS. 31 and 32 shows exploded perspectives of inner housing assembly of the seismic data acquisition unit according to some other embodiments.
Figure 32:
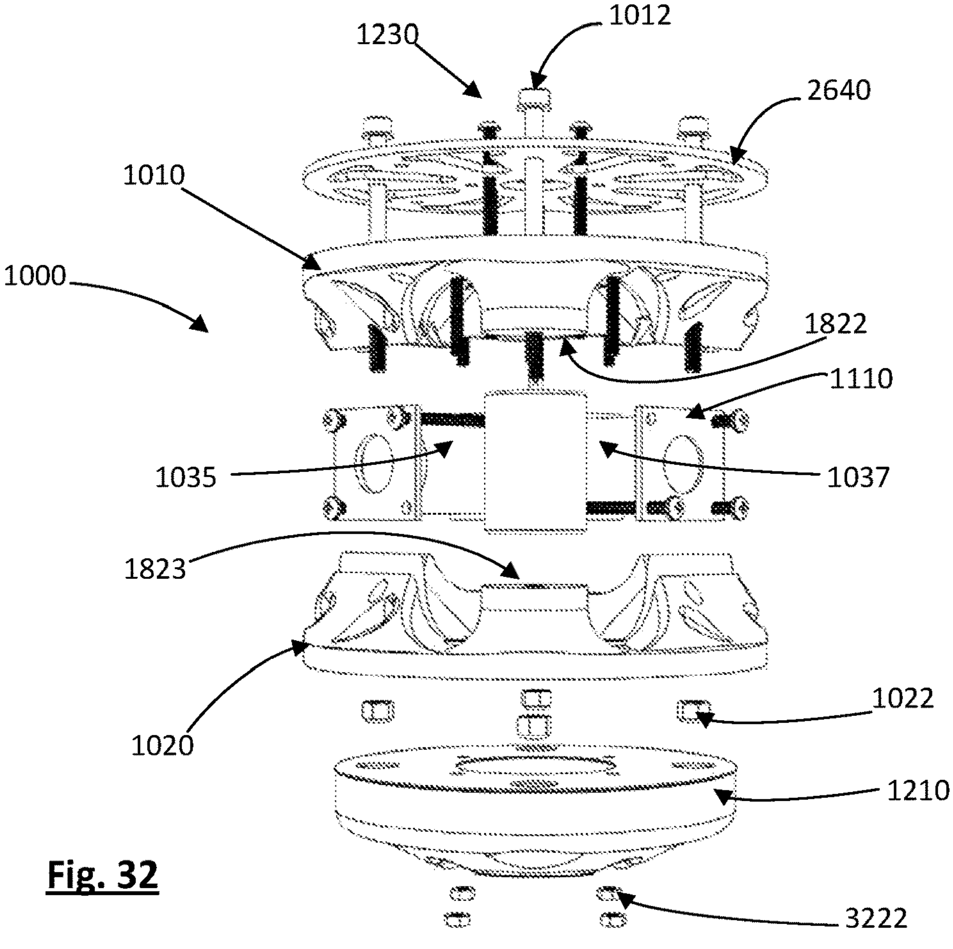

FIGS. 28, 31, and 32 show inner housing 1000 according to some embodiments.

FIG. 28 shows a side perspective of the inner housing according to some embodiments. The top clamping part 1010 and the bottom clamping part 1020 may be better secured with an interlocking connection 2810, as shown in FIG. 28.

Interlocking connection may comprise a groove in the top clamping part 1010 and a protruding segment in the bottom clamping part 1020.

The inner housing 1000 may be further secured through the use of reinforcement plates 1110 and 2820. As shown in FIG. 28, reinforcement plate 2820 may be inserted in a housing recess formed between the joining of bottom clamping part 1020 and top clamping part 1010. Reinforcement plate 2820 may be fixed with one or more bolts or other fasteners to bottom clamping part 1020 and/or top clamping part 1010, including bolts 1120 shown in FIG. 28. Reinforcement plate 1110 may be fixed with bolts 1120 to surfaces of bottom clamping part 1020 and top clamping part 1010. Bottom clamping part 1020 and top clamping part 1010 are formed to define apertures to receive the bolts 1120. Fixing reinforcement plate 2820 and/or reinforcement plate 1110 may better clamp the inner housing 1000 together and secure the geophones 1033, 1035, and 1037.

FIGS. 31 and 32 show exploded views of the inner housing 1000 according to some embodiments. The top clamping portion 1010 and bottom clamping portion 1020 may be shaped with complementary contours and/or recesses to snugly receive and retain geophones 1033, 1035, and 1037 in position when the top clamping portion 1010 and bottom clamping portion 1020 are fixed together. The contours and/or recesses may be fully formed when the top clamping portion 1010 and bottom clamping portion 1020 are fixed together.

Figure 27:
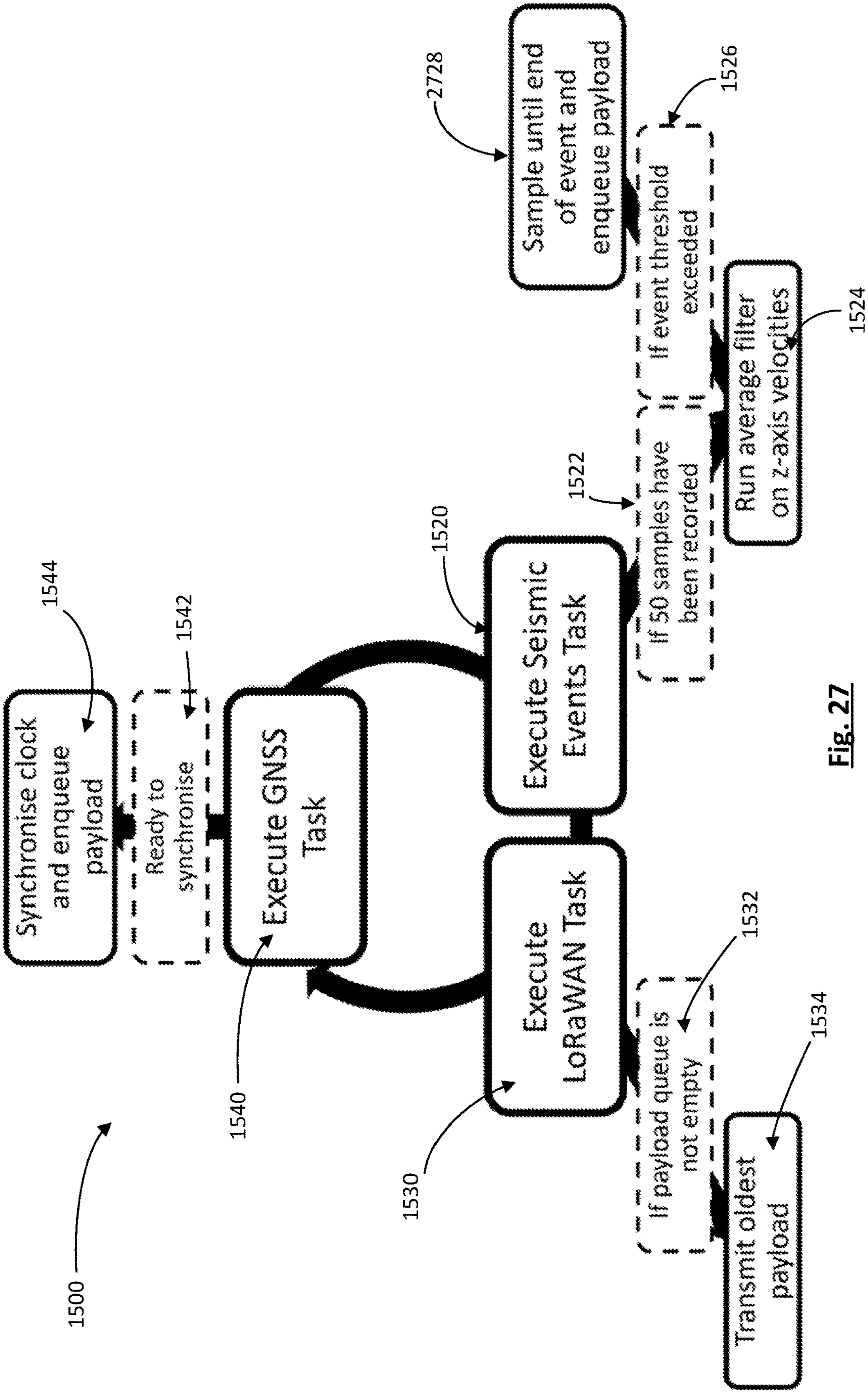
FIG. 27 shows a flow diagram of a method of data acquisition executed by a processor of the data acquisition unit according to some embodiments

FIG. 27 shows a process flow diagram of an operational process or method 1500 according to some embodiments. The process or method 1500 shown in FIG. 27 is similar to that shown in FIG. 15, so the same reference numerals are used in describing it. Process or method 1500 may have multiple sub-processes or loops or threads that are automatically performed repeatedly and cyclically by processor 1484, for example.

As shown in FIG. 27, processor 1484 may execute GNSS task 1540, and its subsequent steps 1542, and 1544, as described above. Then processor 1484 may execute seismic events task 1520, and its subsequent steps 1522, 1524, 1526, and 2728, as described above, to determine whether a seismic event has been detected. Step 2728 may comprise undertaking steps 1528, 1552 and then 1554 as earlier described. Processor 1484 may then execute LoRaWAN task 1530, and its subsequent steps 1532 and 1534, as described above. Processor 1484 may then execute GNSS task 1540 and continue to cycle through tasks 1520, 1530, and 1540, as described above. Execute GNSS task 1540 may also be referred to as a task to "check GNSS module". Execute seismic events task 1520 may also be referred to as a task to "sample all geophones". LoRaWAN task 1530 may be referred to as a task to "check LoRaWAN queue".

Figure 29:
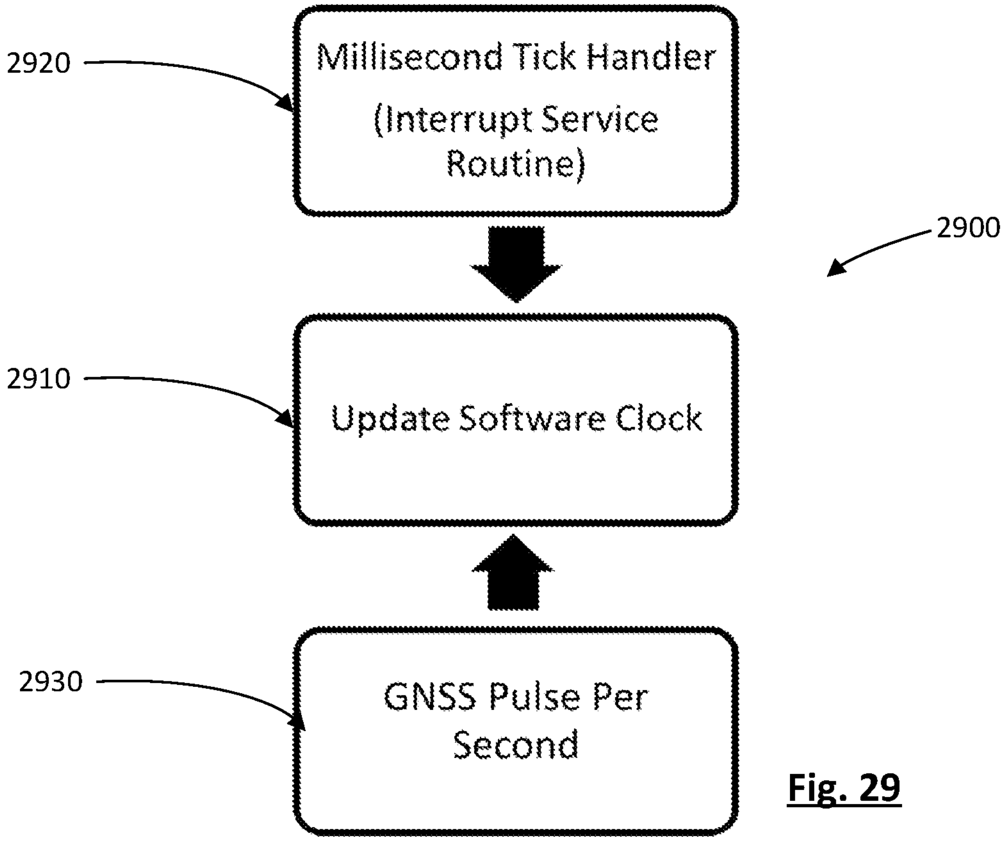
FIG. 29 shows a flow diagram of a method of updating a software clock of the processor according to some embodiments.

FIG. 29 shows an operational process 2900 of updating the software clock of processor 1484 according to some embodiments.

At step 2920, the software clock of processor 1484 may be updated by an interrupt service routine of the system tick handler code 1510 when executed by processor 1484. Step 2920 may occur every millisecond or another small unit of time within an order of magnitude of 1 millisecond, for example.

According to some embodiments, at step 2930, the software clock of processor 1484 may be updated by an external interrupt triggered by GNSS module 1494. Software clock of processor 1484 may be updated by an external interrupt triggered by GNSS module 1494 on a frequent periodic basis, such as every second, for example. Accurate timing and position information for the acquired seismic data from each data acquisition unit 110 enables more meaningful processing and downstream decision-making based on data from multiple data acquisition units 110 distributed and operating over a geographic region of interest.

Figure 30:
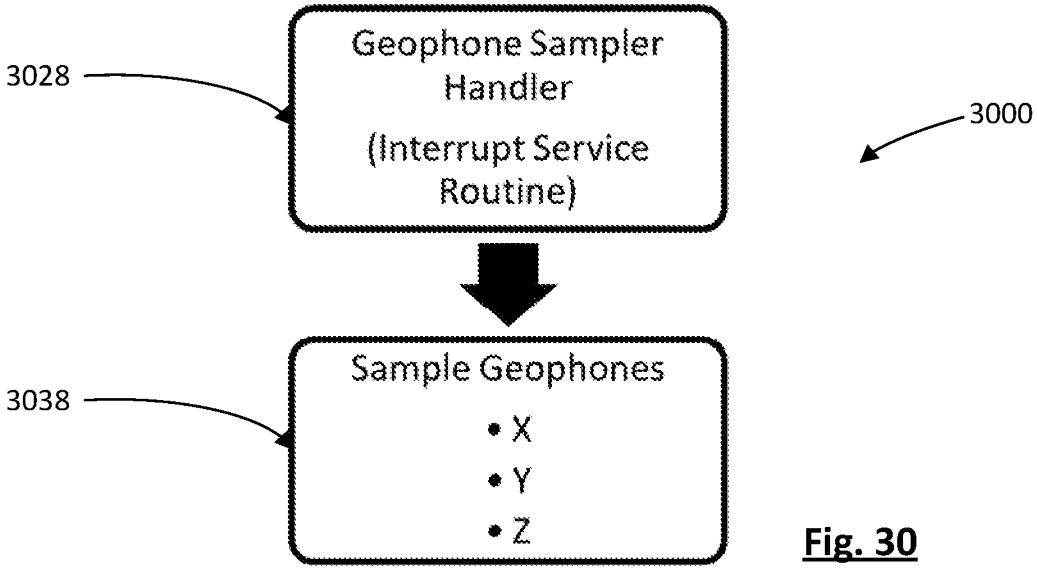
FIG. 30 shows a flow diagram of a method of sampling geophones according to some embodiments.

FIG. 30 shows an operational software process of sampling geophones 3000. The geophones may be sampled by execution of geophone sample handler code 2036 on processor 1484 invoking an interrupt service routine 3028, for example. The interrupt service routine 3028 may sample outputs of all geophones 3033, 3035, and 3037 at step 3038, for example.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data acquisition unit, including:
- a housing including an outer wall, a top part and a bottom part, wherein the outer wall, the top part and the bottom part together define an interior volume of the housing;
- a GPS unit in the housing for processing a time synchronisation signal;
- a GPS antenna communicatively coupled to the GPS unit and extending from the top part of the housing;
- a low power wide area network (LPWAN) unit in the housing for enabling wireless data communication with an external gateway device;
- a LPWAN antenna communicatively coupled to the LPWAN unit and extending from the top part of the housing;
- a sensing probe extending from the bottom part of the housing;
- a processing unit in the housing and communicatively coupled to the GPS unit and the LPWAN unit;
- a power source in the housing to supply power to the GPS unit, the LPWAN unit and the processing unit; and
- a geophone assembly in the housing configured to sense subsurface seismic vibrations received via the sensing probe and/or the housing, and to generate and transmit electrical output signals to the processing unit based on the received subsurface seismic vibrations,
- wherein the processing unit is configured to receive and process the electrical output signals from the geophone assembly to generate data payloads based on the processed electrical output signals for transmission by the LPWAN unit to the external gateway device.

2. The data acquisition unit of claim 1, wherein the processing unit includes:
- non-volatile memory storing program code executable by a processor of the processing unit to control operation of the data acquisition unit; and
- volatile memory to store buffered output signals and output data generated from processed output signals;
- wherein the processing unit is configured to determine an occurrence of a seismic event and generate the data payloads in response to determination of the seismic event.

3. The data acquisition unit of claim 2, wherein the processing unit is configured to provide the generated data payloads to the LPWAN unit for queued transmission to the external gateway device over a long range low data rate transmission link.

4. A data acquisition unit, including:
- a housing including an outer wall, a top part and a bottom part, wherein the outer wall, the top part and the bottom part together define an interior volume of the housing;
- a geolocation unit in the housing for processing a time synchronisation signal;
- a geolocation antenna port to couple a geolocation antenna to the geolocation unit and accessible from the top part of the housing;
- a data communication unit in the housing for enabling wireless data communication with an external gateway device;
- a data communication antenna port to couple a data communication antenna to the data communication unit and accessible from the top part of the housing;
- a sensing probe extending from the bottom part of the housing;
- a processing unit in the housing and communicatively coupled to the geolocation unit and the data communication unit;
- a power source in the housing configured to supply power to the geolocation unit, the data communication unit and the processing unit; and
- a geophone assembly in communication with the sensing probe and the processing unit, the geophone assembly disposed in the housing and configured to sense vibrations from subsurface seismic activity received via the sensing probe and/or the housing, and to generate and transmit electrical output signals to the processing unit based on the received vibrations, wherein the processing unit is configured to receive and process the electrical output signals from the geophone assembly to generate data payloads based on the processed electrical output signals for transmission to the external gateway device.

5. The data acquisition unit of claim 4, wherein the data acquisition unit is self-contained, such that an external power supply is not required to supplement the power source.

6. The data acquisition unit of claim 4, further comprising one secondary projection or a plurality of secondary projections extending from the bottom part and spaced from the sensing probe.

7. The data acquisition unit of claim 4, wherein the outer wall is generally cylindrical.

8. The data acquisition unit of claim 4, wherein the power source is positioned between the processing unit and the top part of the housing.

9. The data acquisition unit of claim 4, wherein the geophone assembly is positioned between the processing unit and the bottom part of the housing.

10. The data acquisition unit of claim 9, wherein the geophone assembly is tightly fastened to the bottom part of the housing to allow vibrations received by the sensing probe to be effectively transmitted to the geophone assembly via the bottom part of the housing.

11. The data acquisition unit of claim 4, wherein the processing unit includes a printed circuit board and the power source is mounted to the printed circuit board.

12. The data acquisition unit of claim 4, wherein a top end of the sensing probe is received in the bottom part of the housing but does not extend through the bottom end of the housing.

13. The data acquisition unit of claim 4, wherein the geophone assembly includes first, second and third geophones to sense vibration in three orthogonal directions.

14. The data acquisition unit of claim 4, wherein the data acquisition unit has a mass of between about 1 kg and about 2 kg.

15. A data acquisition system, including:

a plurality of the data acquisition units of claim 4; and a data gateway device configured to communicate each of the data acquisition units and to communicate with a low earth orbit satellite to transmit data received from the data acquisition units to a remote computing system.

16. The data acquisition unit of claim 4, wherein the top part includes an upper engagement portion extending from an upper surface of the top part to allow the data acquisition unit to be pulled upwardly.

17. The data acquisition unit of claim 4, wherein the processing unit is configured to generate the data payloads for transmission in response to determination of the seismic event.

18. The data acquisition unit of claim 17, wherein determination of a seismic event is based upon a first predetermined number of most recent samples measured from the output signals of a z-axis geophone of the geophone assembly, and a first predetermined threshold.

19. The data acquisition unit of claim 18, wherein the first predetermined threshold is periodically recalibrated based on a predetermined number of samples.

20. The data acquisition unit of claim 17, wherein the processing unit is configured to, after determination of the seismic event, continuously process output signals of the geophone assembly and generate data payloads based on the processed output signals for transmission to the external gateway device, until an event end condition is determined to be satisfied.

21. The data acquisition unit of claim 17, wherein each of the data payloads comprises a header including an event identifier, an event trigger time, and sample measurements of output signals of an x-axis geophone, a y-axis geophone, and a z-axis geophone.

22. The data acquisition unit of claim 21, wherein the processing unit is configured to provide the generated data payloads to the data communication unit for queued transmission to the external gateway device over a long range low data rate transmission link.

23. The data acquisition unit of claim 17, wherein the processing unit is free of data storage for geophone sample measurements other than for buffering for seismic event determination and queued transmission to the external gateway device.

24. The data acquisition unit of claim 4, further including a serial connector positioned in the top part to enable serial data communication between the processing unit and an external device via a serial bus.

25. The data acquisition unit of claim 4, wherein the bottom part includes one or more annular sloped regions surrounding the sensing probe, the sloped regions being configured to promote stable ground coupling and self-centering of the unit during installation.

26. The data acquisition unit of claim 4, wherein internal components of the unit are arranged such that a center of mass of the unit is substantially aligned with a vertical axis of the housing.

27. The data acquisition unit of claim 26, wherein the vertical axis is defined by an axial center line of the sensing probe and a cylindrical outer wall of the housing, the sensing probe centrally located on the bottom part.

28. The data acquisition unit of claim 4, wherein the geophone assembly includes one or more geophones having a natural frequency between about 1 Hz to about 10 Hz.

29. The data acquisition unit of claim 4, wherein the bottom part includes a central holding structure configured to receive and support the sensing probe.

30. The data acquisition unit of claim 29, wherein the central holding structure is cylindrical and protrudes into an internal chamber of the housing.

31. The data acquisition unit of claim 4, the geophone subhousing includes an upper stabilizing portion and a lower stabilizing portion that connect to form a stabilizing column to balance the geophone assembly, the geophone assembly carrying an imbalanced mass of one or more geophones.

32. The data acquisition unit of claim 4, further including a geophone sub-housing to retain one or more geophones in a fixed position within the housing.

33. The data acquisition unit of claim 32, wherein the geophone sub-housing includes clamping parts.

34. The data acquisition unit of claim 32, wherein the geophone sub-housing is formed of material having a low modulus of elasticity.

35. The data acquisition unit of claim 1, wherein the data acquisition unit has a mass of between about 1 kg and about 2 kg.

36. A data acquisition unit, including:

a housing including an outer wall, a top part and a bottom part, wherein the outer wall, the top part and the bottom part together define an interior volume of the housing;

a geolocation unit in the housing for processing a time synchronization signal;

a geolocation antenna port to couple a geolocation antenna to the geolocation unit and accessible from the top part of the housing;

a data communication unit in the housing for enabling wireless data communication with an external gateway device;

a data communication antenna port to couple a data communication antenna to the data communication unit and accessible from the top part of the housing;

a sensing probe extending from the bottom part of the housing;

a processing unit in the housing and communicatively coupled to the sensing probe, the geolocation unit, and the data communication unit;

a power source in the housing configured to supply power to the geolocation unit, the data communication unit and the processing unit;

a geophone assembly in communication with the sensing probe and the processing unit, the geophone assembly disposed in the housing and configured to sense vibrations from subsurface seismic activity received via the sensing probe and/or the housing, and to generate and transmit electrical output signals to the processing unit based on the received vibrations, wherein the processing unit is configured to receive and process the electrical output signals from the geophone assembly to generate data payloads based on the processed electrical output signals for transmission to the external gateway device; and a mass of about 2 kg or less.

* * * * *